US012323947B2

(12) United States Patent
Nguyen et al.

(10) Patent No.: US 12,323,947 B2
(45) Date of Patent: Jun. 3, 2025

(54) RESOURCE RESERVATION FORWARDING PROCEDURE IN NEW RADIO SIDELINK

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US); Gene Wesley Marsh, San Diego, CA (US); Kapil Gulati, Belle Mead, NJ (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 17/580,343

(22) Filed: Jan. 20, 2022

(65) Prior Publication Data

US 2022/0322295 A1    Oct. 6, 2022

Related U.S. Application Data

(60) Provisional application No. 63/171,054, filed on Apr. 5, 2021.

(51) Int. Cl.
*H04W 72/02* (2009.01)
*H04W 28/26* (2009.01)
*H04W 72/0446* (2023.01)
*H04W 72/20* (2023.01)

(52) U.S. Cl.
CPC ........... *H04W 72/02* (2013.01); *H04W 28/26* (2013.01); *H04W 72/0446* (2013.01); *H04W 72/20* (2023.01)

(58) Field of Classification Search
CPC . H04W 72/02; H04W 28/26; H04W 72/0446; H04W 72/20; H04L 5/0092; H04L 5/0037; H04L 5/0044
See application file for complete search history.

(56) References Cited

U.S. PATENT DOCUMENTS

| 2019/0306835 | A1* | 10/2019 | Hoang | H04W 72/53 |
| 2021/0160849 | A1* | 5/2021 | Sun | H04W 72/23 |
| 2021/0392707 | A1* | 12/2021 | Do | H04W 72/02 |
| 2023/0156776 | A1* | 5/2023 | Kupanna Subramani | H04W 4/46 370/329 |

* cited by examiner

*Primary Examiner* — Syed Ali
*Assistant Examiner* — Najeeb Ansari
(74) *Attorney, Agent, or Firm* — Loza & Loza, LLP

(57) ABSTRACT

A first user equipment (UE) receives, via first sidelink resources from a second UE, a reservation message that includes an indication of second sidelink resources via which the first UE will subsequently receive a data packet. The first UE may at least one of: determine if the first UE is an intended recipient of the data packet, or compare a reference signal received power (RSRP) value of the reservation message to a threshold value. The first UE may transmit a first reservation forwarding message, via one or more third sidelink resources, including at least the indication of the second sidelink resources to at least a third UE in response to at least one of: determining that the first UE is the intended recipient of the data packet, or determining that the RSRP value is less than the threshold value. The first UE subsequently receives the data packet.

30 Claims, 20 Drawing Sheets

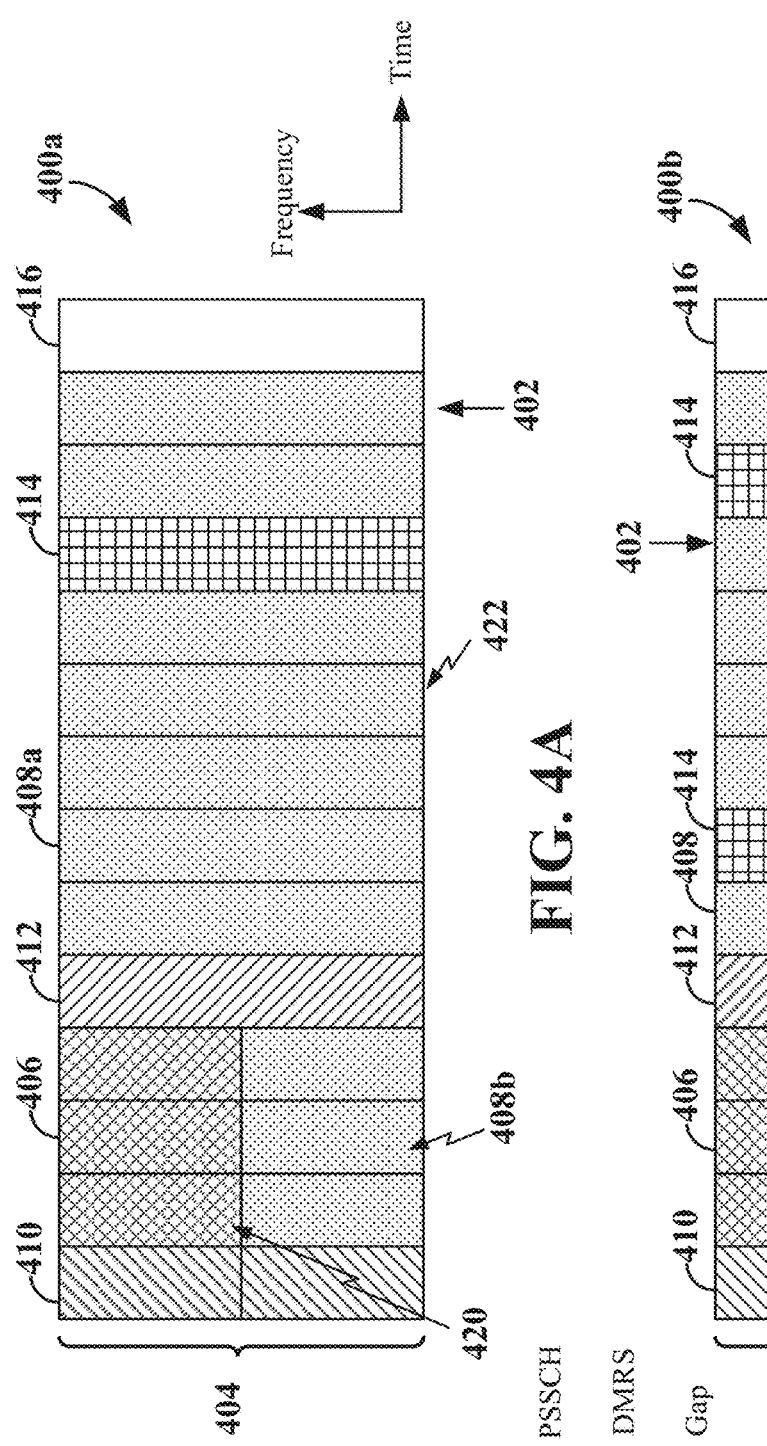
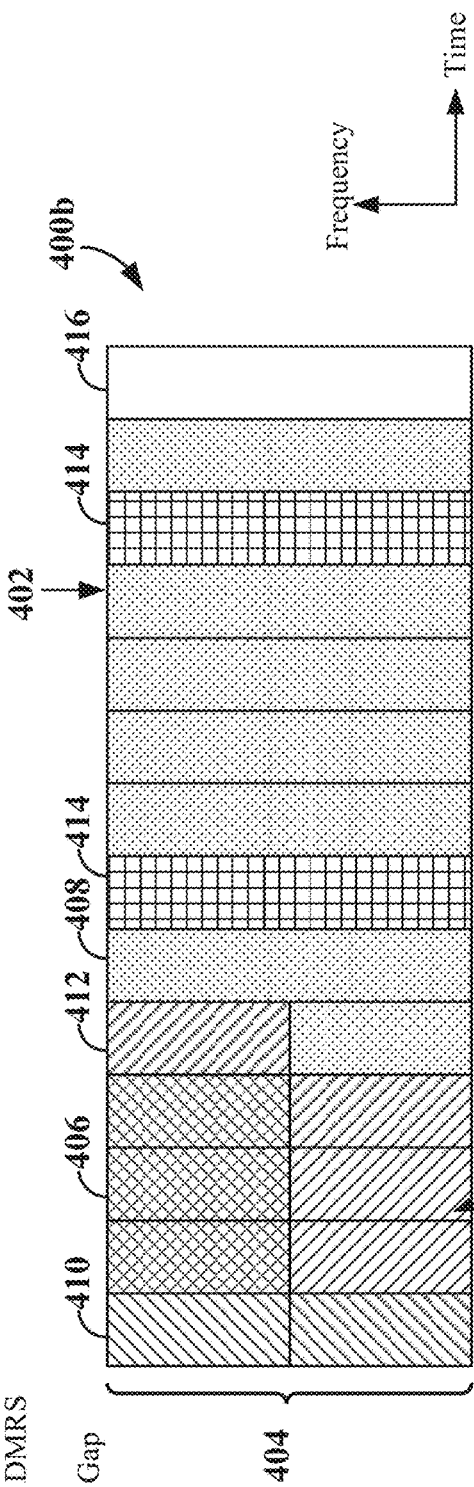
FIG. 4A
FIG. 4B

RESOURCE RESERVATION FORWARDING PROCEDURE IN NEW RADIO SIDELINK

CLAIM OF PRIORITY UNDER 35 U.S.C. § 119

The present application for patent claims priority to application No. 63/171,054 titled "Resource Reservation Forwarding Procedure In New Radio Sidelink" filed in the United States Patent and Trademark Office on Apr. 5, 2021, and assigned to the assignee hereof and hereby expressly incorporated by reference herein as if fully set forth below and for all applicable purposes.

TECHNICAL FIELD

The technology discussed below relates generally to wireless communication networks, and more particularly, to resource reservation forwarding procedures in New Radio sidelink.

BACKGROUND

In sidelink communication networks, a user equipment (UE) may autonomously select one or more resources and then transmit a sidelink transmission on those resources. In some examples, the UE may monitor a control portion of other sidelink transmissions to identify available resources on which the UE may schedule the sidelink transmission. In some examples, the control portion may include a resource reservation message including an indication of an initial resource selected for an initial sidelink transmission and one or more retransmission resources selected for one or more retransmissions of the sidelink transmission. The resource reservation message may thus indicate to other UEs the resources to be utilized by the transmitting UE for the one or more retransmissions. Usage of the resource reservation message may allow other UEs to avoid using the selected one or more retransmission resources and thereby reduce interference during the retransmission. Usage of the resource reservation message may improve the likelihood of success of the retransmission.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A first user equipment (UE) is described. The first UE includes a transceiver for wireless communication, a memory, and a processor coupled to the transceiver and the memory. The processor and the memory are configured to: receive a first reservation message from a second UE via one or more first sidelink resources. The first reservation message includes a first indication of one or more second sidelink resources for subsequently receiving a first data packet from the second UE. The processor and the memory are further configured to transmit a first reservation forwarding message including at least the first indication of the one or more second sidelink resources to at least a third UE via one or more third sidelink resources, and receive a transmission of the first data packet from the second UE via the one or more second sidelink resources.

A method of wireless communication at a first user equipment (UE) is described. The method includes receiving a first reservation message from a second UE via one or more first sidelink resources. The first reservation message includes a first indication of one or more second sidelink resources for subsequently receiving a first data packet from the second UE. The method further includes transmitting a first reservation forwarding message including at least the first indication of the one or more second sidelink resources to at least a third UE via one or more third sidelink resources, and receiving a transmission of the first data packet from the second UE via the one or more second sidelink resources.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

Figure 1:
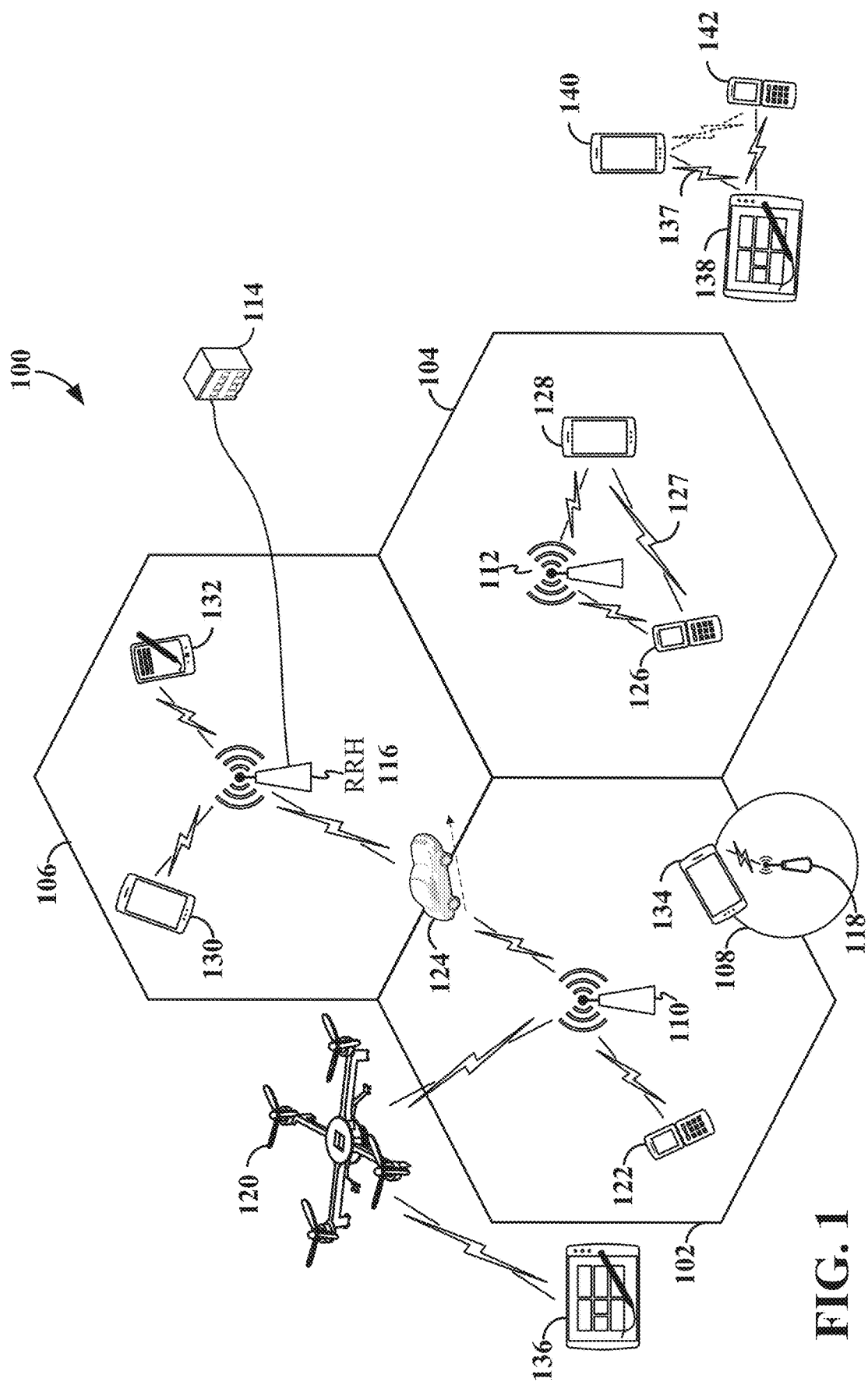
FIG. 1 is a schematic illustration of an example of a radio access network (RAN) according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated arrangements (e.g., UE and/or base station), end-user devices, etc., of varying sizes, shapes, and constitution.

In some examples, a transmitting UE may transmit a sidelink transmission including a reservation message. The reservation message may include an indication of one or more resources selected and reserved for an initial sidelink transmission of a data packet and one or more retransmission resources selected and reserved for one or more retransmissions of the data packet.

In various aspects of the disclosure, when a receiving UE receives a reservation message the receiving UE may forward the reservation message from the transmitting UE to other UEs, thereby extending the reservation range. For example, the receiving UE may transmit a reservation forwarding message including the reservation message to one or more other UEs (remote UEs). The reservation forwarding message may be transmitted via, for example, a radio resource control (RRC) message or a medium access control (MAC) control element (MAC-CE). A remote UE receiving the reservation forwarding message may abstain from using the resources indicated in the reservation forwarding message for other sidelink transmissions.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
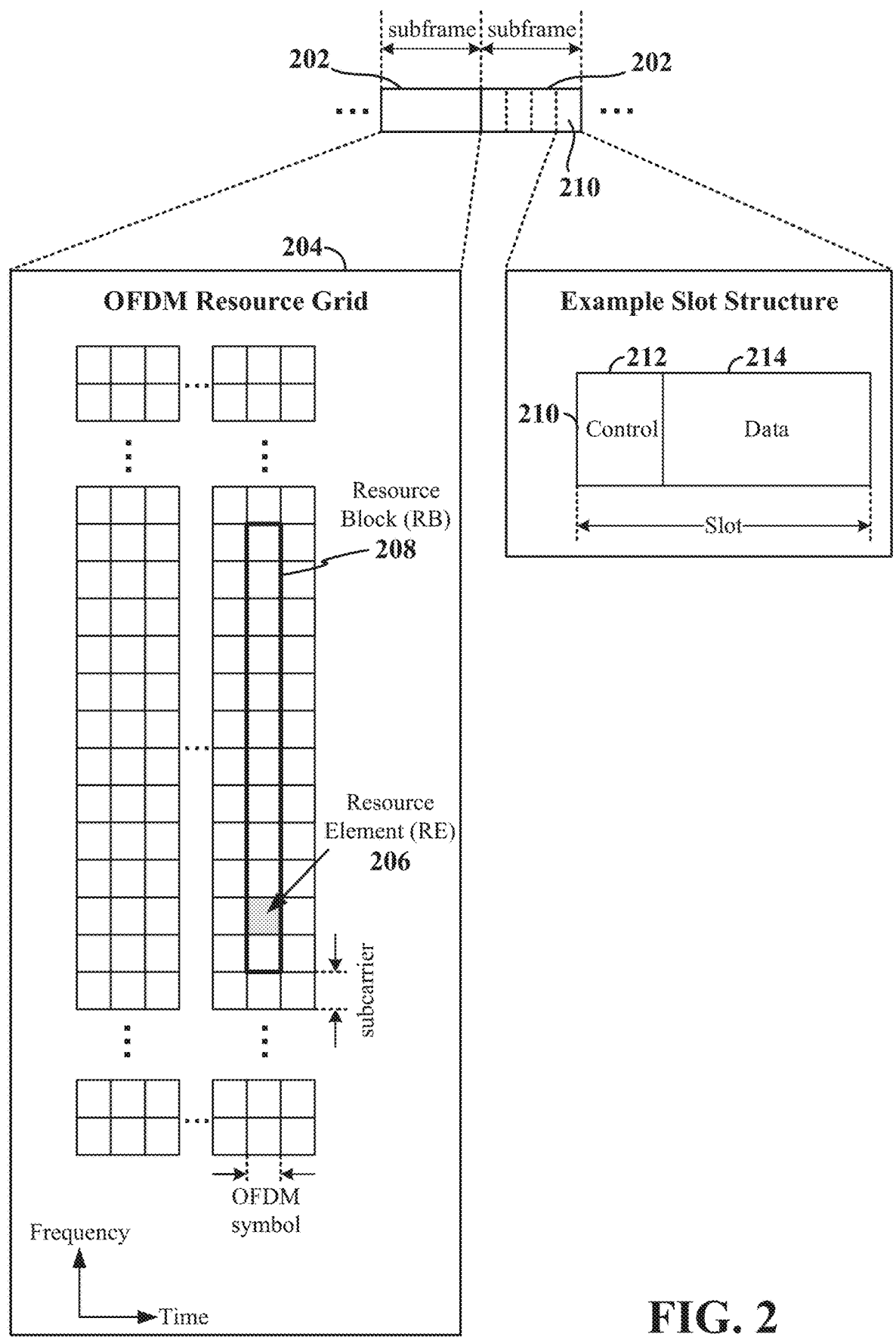
FIG. 2 is a schematic illustration of wireless resources in an air interface utilizing orthogonal frequency division multiplexing (OFDM) according to some aspects.

Referring now to FIG. 2, an expanded view of an exemplary subframe 202 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
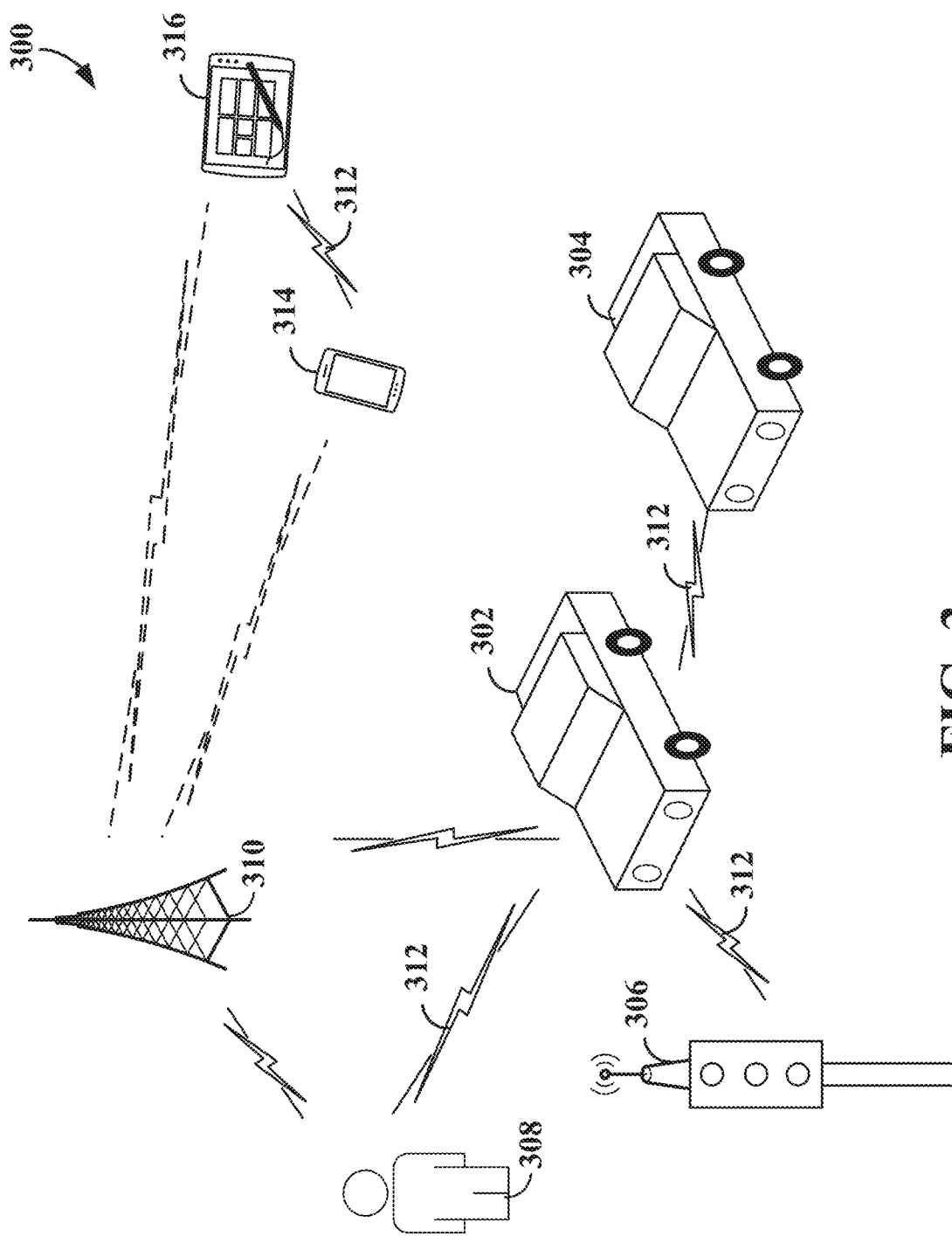
FIG. 3 is a schematic illustration of an example of a wireless communication network configured to support device-to-device (D2D) or sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource siz of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects. SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

Each of FIGS. 4A and 4B illustrate an example of a respective slot 400*a* or 400*b* including fourteen symbols 402 that may be used for sidelink communication. However, it should be understood that sidelink communication can be configured to occupy fewer than fourteen symbols in a slot 400*a* or 400*b*, and the disclosure is not limited to any particular number of symbols 402. Each sidelink slot 400*a* and 400*b* includes a physical sidelink control channel (PSCCH) 406 occupying a control region 418 of the slot 400*a* and 400*b* and a physical sidelink shared channel (PSSCH) 408 occupying a data region 420 of the slot 400*a* and 400*b*. The PSCCH 406 and PSSCH 408 are each transmitted on one or more symbols 402 of the slot 400*a*. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400*a* and 400*b*. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400*a* or 400*b* and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408*a* that is TDMed with the PSCCH 406 and a second portion 408*b* that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., quadrature phase shift keying (QPSK), 16-QAM, 64-QAM and 256-QAM). In addition, the PSSCH 408 may include DMRSs 414 configured in a two, three, or four symbol DMRS pattern. For example, slot 400*a* shown in FIG. 4A illustrates a two symbol DMRS pattern, while slot 400*b* shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400*a* or 400*b*. In addition, a gap symbol 416 is present after the PSSCH 408 in each slot 400*a* and 400*b*.

Each slot 400*a* and 400*b* further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408 may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
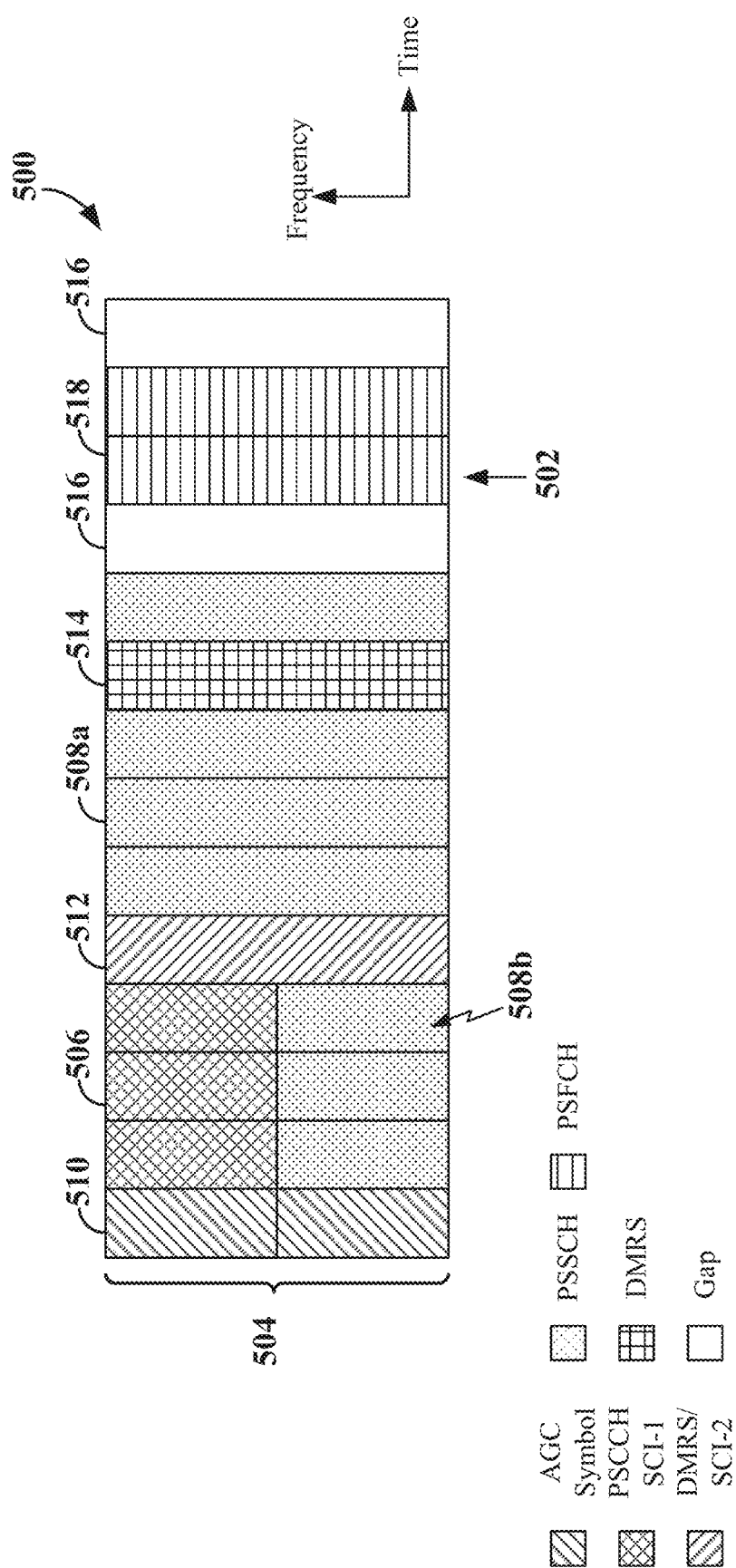
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include a DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508 may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500c. A gap symbol 516 may further be placed after the PSFCH 518 symbols.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

In some examples, the SCI (e.g., SCI-1 and/or SCI-2) may further identify one or more additional resources (e.g., retransmission resources) reserved for one or more retransmissions of the sidelink transmission (sidelink data). Thus, the SCI may include a respective PSSCH resource reservation and assignment for one or more retransmissions of the PSSCH. For example, the SCI may include a reservation message indicating the PSSCH resource reservation for the initial sidelink transmission (initial PSSCH) and one or more additional PSSCH resource reservations for one or more retransmissions of the PSSCH.

In some examples, instead of transmitting the reservation message for a sidelink transmission together with the sidelink transmission, a UE may schedule resources ahead of time for a subsequent sidelink transmission and transmit the reservation message prior to the sidelink transmission. For example, a UE may schedule resources in slot N for a sidelink transmission and transmit the reservation message reserving the resources for the sidelink transmission in slot N-K (where N>K). By reserving resources for a subsequent sidelink transmission, interference between the sidelink transmission and other sidelink transmissions may be reduced or avoided.

For example, if the packet to be transmitted in sidelink utilizes a bandwidth of 10 MHz, and there is a collision between the sidelink transmission and another transmission, the 10 MHz bandwidth may be wasted. To avoid this, the transmitting UE may transmit the reservation message with robust coding and fewer resources than the sidelink transmission (e.g., 1 MHz or 2 MHz for the reservation message vs. 10 MHz for the sidelink transmission) to reserve the resource for the 10 MHz transmission. Thus, if there is a collision during the transmission of the reservation message, only 1 MHz of bandwidth is lost. Further, even if there is a collision between the reservation message and another message, the robust coding of the reservation message may increase the likelihood that the reservation message could still be received and decoded by a recipient UE.

However, another UE more distant from the transmitting UE than the recipient UE may not receive any reservation message from the transmitting UE. Thus, the other UE may schedule its sidelink transmission on the same resources indicated in the reservation message, which may cause interference during the sidelink transmission (e.g., initial transmission and/or retransmission) from the transmitting UE.

Therefore, in various aspects of the disclosure, a receiving UE may forward a reservation message from the transmitting UE to other UEs, thereby extending the range of the reservation message. In some examples, the receiving UE may transmit a reservation forwarding message, which may include the reservation message or an indication of reserved resources in the reservation message, to one or more other UEs (remote UEs relative to the receiving UE). The reservation forwarding message may be transmitted via, for example, a sidelink radio resource control (RRC) message or a sidelink medium access control (MAC) control element (MAC-CE). A remote UE receiving the reservation forwarding message may abstain from using the resources indicated in the reservation forwarding message for its sidelink transmission(s).

Figure 6:
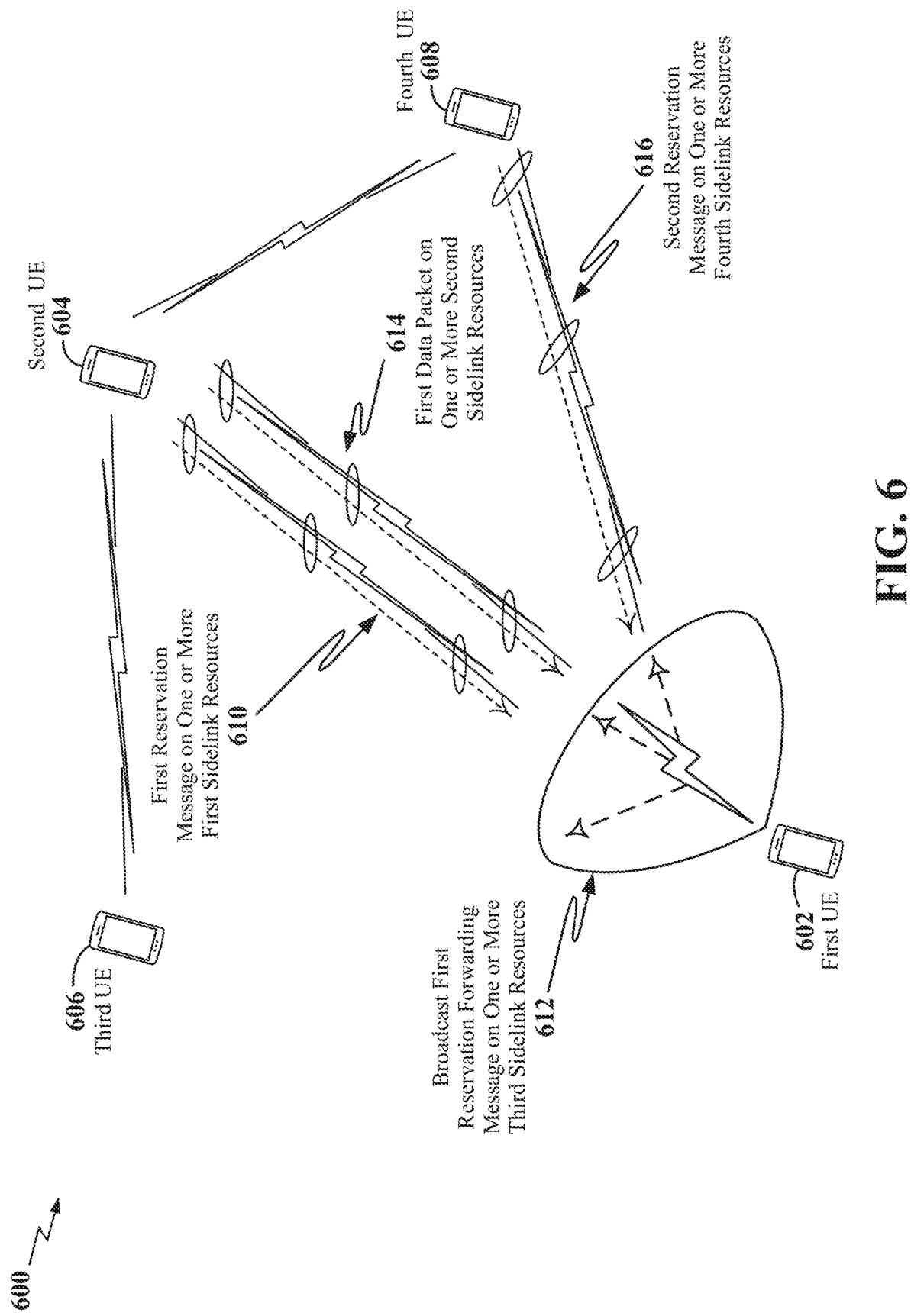
FIG. 6 is a schematic diagram illustrating an example of forwarding a resource reservation message according to some aspects.

FIG. 6 is a schematic diagram illustrating an example 600 of a transmission of a first reservation forwarding message according to some aspects. In the example shown in FIG. 6, a first user equipment (UE) 602 (e.g., a first wireless communication device) may be in wireless communication with a second UE 604 (e.g., a second wireless communication device) via sidelink. Also, in the example shown in FIG. 6, the first UE 602 may be in wireless communication with a third UE 606 (e.g., a third wireless communication device) via sidelink. In some aspects, the first UE 602 may still further be in wireless communication with a fourth UE 608 (e.g., a fourth wireless communication device) via sidelink. Each of the first UE 602, the second UE 604, the third UE 606, and the fourth UE 608 may correspond to any UE (e.g., wireless communication devices) as shown and described in connection with FIGS. 1 and/or 3, for example.

The second UE 604 may schedule an initial transmission of a first data packet on one or more second sidelink resources. The second UE 604 may generate a first reservation message, including an indication of the one or more second sidelink resources reserved for the initial transmission of the first data packet. As exemplified in FIG. 6, at 610, the second UE 604 may transmit, and the first UE 602 may receive the first reservation message on the one or more first sidelink resources. A sidelink transmission may include a SCI-1 and/or SCI-2 (e.g., carried in the control portion) and a data portion or payload (e.g., carried in the PSSCH). The first reservation message may be included, for example, in a control portion of a sidelink transmission. In some examples, the first reservation message may not include any data. In this example, the one or more first sidelink resources may include the control portion (e.g., SCI-1 and/or SCI-2) and/or the data portion (or payload) in a PSSCH utilized for the reservation message. It is noted that a control portion may include SCI-1 and SCI-2, but SCI-2 is carried in the PSSCH. For example, the one or more first sidelink resources may include a small number of resources (e.g., one or two subchannels).

In some aspects, the first reservation message may indicate the reservation of the one or more second sidelink resources for the initial transmission of the first data packet by the second UE 604 but may also include other reservation information. For example, the first reservation message may also include an indication of the one or more other sidelink resources for retransmission(s) of the first data packet and/or other reservations of still other sidelink resources made by other UEs (e.g., the fourth UE 608) for transmissions and/or retransmissions of their own. The selection of the one or more first sidelink resources, one or more second sidelink resources, and/or one or more other sidelink resources may be based on, for example, availability of sidelink resources, a signal strength of the one or more sidelink resources, a signal quality of the one or more sidelink resources, a combination thereof, or the like.

The first reservation message may be transmitted from the second UE 604 to the third UE 606; however, the third UE 606 may not be within the reception range of the transmission of the first reservation message transmitted by the second UE 604. Accordingly, at 612, in response to receiving the first reservation message directly from the second UE 604, the first UE 602 may broadcast (e.g., to all UEs in the system, including the second UE 604, the third UE 606, and the fourth UE 608) a first reservation forwarding message on one or more third sidelink resources. The first reservation forwarding message may include multiple reservation messages from multiple UEs (including the first reservation message from the second UE 604, the second reservation message from the fourth UE, and/or a second reservation forwarding message(s) (not shown) from any UE). In some examples, the first reservation forwarding message may include indications of the sidelink resources reserved in multiple sidelink resource reservations made by multiple UEs (including the one or more second sidelink resources reserved in the first reservation message of the second UE 604). In other words, the second UE 604 may have obtained other reservation messages from other UEs and may include those other reservation messages, or indications of the sidelink resources reserved in the other reservation messages, in the first reservation message (at 610) from the second UE 604 to at least the first UE 602.

In some examples, the first reservation message may include an indication of one or more sidelink resources that are to be used for a retransmission of the first data packet if a collision occurs when initially transmitting the first data packet at 614, or other conditions (e.g., interference) preventing the first UE 602 from receiving and decoding the first data packet at 614. The one or more sidelink resources indicated for retransmission may include one or more different sidelink resources (e.g., different from one or more second sidelink resources used for initially transmitting the first data packet at 614).

The first reservation message may have a transmission bandwidth (e.g., 1 MHz to 2 MHz) that is smaller than the transmission bandwidth (e.g., 10 MHz) that may be used to transmit the data packet. In addition, the second UE 604 may transmit the first reservation message with robust coding. A relatively larger transmission bandwidth (of the first data packet) than a relatively smaller transmission bandwidth (of the first reservation message) may have a higher modulation order and higher coding rate, thereby decreasing transmission reliability. The relatively smaller transmission bandwidth of the first reservation message, in combination with the robust coding of the first reservation message, may increase the likelihood of the first UE 602 receiving and decoding the first reservation message while minimizing the potential for wasting relatively larger amounts of bandwidth during an occurrence of a collision. For example, the one or more first sidelink resources used to transmit the first reservation message from the second UE 604 to the first UE 602 may include fewer resources than the one or more second sidelink resources used to transmit the first data packet from the second UE 604 to the first UE 602.

In some aspects, in response to the first UE 602 receiving the first reservation message (at 610), the first UE 602 may measure a reference signal received power (RSRP) of the first reservation message (i.e., measure an RSRP associated with the first reservation message). In some aspects, the first UE 602 may include the RSRP of the first reservation message in the first reservation forwarding message (at 612). In some aspects, the first UE 602 may further include an identification (identifier) of the first UE 602 and/or the second UE 604 in the first reservation forwarding message. The identification (identifier) of the first UE 602 and/or the second UE 604 may be obtained from the SCI (e.g., SCI-2) or a sidelink MAC header if data is also received with the first reservation message, from a sidelink MAC-CE, or a sidelink RRC messaging, for example.

The first UE 602 may generate the first reservation forwarding message. The first reservation forwarding message may include an indication of the one or more second sidelink resources reserved by the first reservation message or include a copy of the first reservation message. The first UE 602 may transmit the first reservation forwarding message to at least the third UE 606 (or may broadcast the first reservation forwarding message to all UEs in a system, including the second UE 604, the third UE 606, and the fourth UE 608) to inform at least the third UE 606 (or, if broadcast, to inform all UEs in the system) of the reservation of the one or more second sidelink resources. The third UE 606 may then utilize the first reservation forwarding message to determine whether to abstain from using the one or more second sidelink resources indicated in the first reservation message for a sidelink transmission.

In some aspects, the first reservation forwarding message may be included a data portion and/or a control portion of a sidelink transmission. In some aspects, the first reservation forwarding message may be included in a sidelink medium access control (MAC) control element (MAC-CE) and included in the data portion of the sidelink transmission. In some aspects, the first reservation forwarding message may be included in a sidelink radio resource control (RRC) message and included in the data portion of the sidelink transmission. In some aspects, the first reservation forwarding message may be included in a second stage sidelink control information (SCI-2) and included in a control portion of the sidelink transmission.

In some aspects, the first UE 602 may include a single bit in the first reservation forwarding message indicating to the third UE 606 that the first UE 602 is the intended recipient of the first data packet on the one or more second sidelink resources. The single bit (Rx bit) may provide an indication to the third UE 606 that the third UE 606 is to abstain from transmitting (or more broadly, communicating) using the one or more second sidelink resources to not interfere with the reception of the first data packet at the first UE 602. By the third UE 606 abstaining from transmitting on the one or more second sidelink resources, the first UE 602 may receive the first data packet on the one or more second sidelink resources from the second UE 604 while minimizing interference (and/or other conditions) and the potential for a collision with a transmission from the third UE 606.

In some aspects, the first UE 602 may identify a prospective collision associated with transmitting the first data packet from the second UE 604 and transmitting a second data packet by a fourth UE. According to such aspects, the first UE 602 may include an indication of the prospective collision in the first reservation forwarding message. The first reservation forwarding message may then be broadcast to all UEs in the system, including, for example, the second UE 604, the third UE 606, and the fourth UE 608. In response to receiving the indication, the second UE 604 and the third UE 606 may either negotiate to avoid the collision or follow a predetermined course of action to avoid the collision.

In some examples, a single bit may indicate the prospective collision. Including the indication of the prospective collision may entail including the single bit in the second stage sidelink control information (SCI-2) or in a payload of the first reservation forwarding message in a physical sidelink shared channel (PSSCH).

In some aspects, the first UE 602 may detect a collision of the first reservation message with the second reservation message by comparing a first RSRP value of the received first reservation message with a second RSRP value of the received second reservation message. For example, in a state where the first RSRP value exceeds the second RSRP value by a predetermined amount (e.g., the first RSRP value is relatively larger than the second RSRP value), the first UE 602 may determine that a collision may have occurred. However, the first UE 602 would still be able to decode the first reservation message. Therefore, the first UE 602 may determine to forward the first reservation message (or an indication of its contents) in the first reservation forwarding message (even if the first data packet is not intended for the first UE 602). For example, the first UE 602 may determine to transmit the first reservation forwarding message, including the first reservation message, in response to detecting the first collision to ensure other UEs can receive and decode the first reservation message.

Similarly, in some aspects, the first UE 602 may identify a prospective collision between the first data packet to be transmitted by the second UE 604 and a second data packet to be transmitted by the fourth UE 608. For example, at 616, the first UE 602 may receive a second reservation message on one or more fourth sidelink resources from the fourth UE 608. The second reservation message may indicate that the one or more second sidelink resources, or some portion thereof, are reserved by the fourth UE for an initial transmission or retransmission of the second data packet. For example, the first UE 602 may determine that the one or more second sidelink resources reserved by the second UE 604 for transmission of the first data packet overlap in time and/or frequency with the one or more other sidelink resources reserved by the fourth UE 608 for transmission of the second data packet.

As stated, the first UE 602 may include an indication of an actual or prospective collision in the first reservation forwarding message. In some aspects, the indication of the actual or prospective collision may be a single bit included in an SCI-2 or the PSSCH of the first reservation forwarding message. In some aspects, the second UE 604 may transmit the first reservation forwarding message as a broadcast message reaching a plurality of UEs, including the second UE 604, the third UE 606, and the fourth UE 608. In this example, the first reservation forwarding message may further include an identifier (ID) of at least one of the second UE 604 or the fourth UE 608 (e.g., the UE's involved in the prospective collision), requesting that at least one of the second UE 604 or the fourth UE 608 avoid the potential second collision (e.g., by changing the one or more sidelink resources associated with the subsequent transmission of their respective data packets).

In addition to the first reservation message, as described herein, the first UE 602 may receive the second reservation message from the fourth UE 608. As indicated above, the second reservation message may include an indication of the one or more second sidelink resources for a subsequent transmission of a second data packet from the fourth UE 608. In response to receiving the second reservation message, the first UE 602 may include an indication of the second reservation message in the first reservation forwarding message. In some examples, the first UE 602 may include the indication of the second reservation message in the first reservation forwarding message in response to detecting a collision, as described above. In some aspects, in response to receiving the first reservation message from the second UE 604 and the second reservation message from the fourth UE 608, the first UE 602 may include in the first reservation forwarding message at least one bit indicating that the first UE 602 is an intended recipient of the transmission of the first data packet and that the first UE 602 is not the intended recipient of the transmission of the second data packet.

The first UE 602 may broadcast the first reservation forwarding message to the second UE 604, the third UE 606, and/or the fourth UE 608 using one or more third sidelink resources. For example, the first UE 602 may broadcast the first reservation forwarding message to inform the second UE 604, the third UE 606, and/or the fourth UE 608 that the second UE 604 is the intended recipient of the first data packet on the one or more second sidelink resources reserved by the second UE 604. In some aspects, the first UE 602 may broadcast the first reservation forwarding message in a sidelink MAC-CE via a PSSCH. In some aspects, the first UE 602 may transmit the first reservation forwarding message to only the third UE 606 in a sidelink RRC message through a unicast transmission on a PSSCH. In some aspects, the first UE 602 may transmit the first reservation forwarding message to at least the third UE 606 in an SCI-2 on a physical sidelink control channel (PSCCH).

In some aspects, the first UE 602 may broadcast the first reservation forwarding message using a first transmission bandwidth (e.g., 1 MHz to 2 MHz) smaller than a second transmission bandwidth (e.g., 10 MHz) of the first data packet. The first reservation forwarding message may be transmitted with robust coding. A relatively larger transmission bandwidth compared to a relatively smaller transmission bandwidth may have a higher modulation order and higher coding and decoding rates, thereby decreasing transmission reliability. The smaller transmission bandwidth of the first reservation message and the first reservation forwarding message, in combination with robust coding, may increase the likelihood of UE receiving and decoding the first reservation message and the first reservation forwarding message while minimizing the potential for wasting relatively larger amounts of the bandwidth during the occurrence of a collision. For example, the one or more third sidelink resources used to broadcast the first reservation forwarding message from the first UE 602 may include fewer resources than the one or more second sidelink resources sued for transmitting the first data packet from the second UE 604 to the first UE 602.

As described herein, in some examples, in response to the first UE 602 receiving the first reservation message, the first UE 602 may determine if the first UE 602 is an intended recipient of the first data packet. In some examples, in response to the first UE 602 receiving the first reservation message, the first UE 602 may obtain an RSRP value of the first reservation message. In other examples, the first UE 602 may determine if the first UE 602 is the intended recipient of the first data packet and obtain the RSRP value of the first reservation message. In some aspects, the first UE 602 may obtain the RSRP value by measurement. For example, the first UE 602 may measure the RSRP value of the first reservation message. In some aspects, the first UE 602 may include the RSRP of the first reservation message in the first reservation forwarding message. According to some aspects, in response to obtaining an RSRP value of the first reservation message, the first UE 602 may compare the RSRP value of the first reservation message received on the one or more first sidelink resources to a threshold value. In one example, the threshold value of the RSRP may be obtained or determined by a priority value indicated by an SCI associated with the first UE 602. Other ways of determining the threshold RSRP value are within the scope of the disclosure. According to some examples, the first UE 602 may transmit the first reservation forwarding message, including the indication of the first reservation message, to the third UE 606 in response to at least one of: determining that the first UE 602 is the intended recipient of the first data packet, or determining that the RSRP value is less than the threshold value. Conversely, in response to at least one of: a determination that the first UE 602 is not the intended recipient of the first data packet or determining that the RSRP value is greater than a threshold value, the first UE 602 may abstain from transmitting the first reservation forwarding message, including the indication of the first reservation message to the third UE 606.

In some aspects, the first UE 602 may transmit the first reservation forwarding message to at least the third UE 606 based on whether the first UE 602 receives a second reservation message or a second reservation forwarding message. For example, the second UE 604 may have transmitted the first reservation message to a plurality of UEs, including the first UE 602. In response to receiving the first reservation message from the second UE 604, the first UE 602 may monitor for a second reservation message or a reservation forwarding message from any UE. In response to receiving the first reservation message from the second UE 604, the first UE 602 may initiate a timer. If the first UE 602 fails to receive the second reservation message or the reservation forwarding message from any UE before the expiry of the timer, the first UE 602 may determine to transmit the first reservation forwarding message to the third UE 606 (e.g., broadcast the first reservation forwarding message to all UEs in the system including the third UE 606). Conversely, if the first UE 602 receives the second reservation message or the reservation forwarding message from any UE before the expiry of the timer, the first UE 602 may determine not to transmit the first reservation forwarding message to the third UE 606.

In some aspects, the first UE 602 may insert the indication of the first reservation message into a bit map and transmit the bit map in the first reservation forwarding message to at least the third UE 606. In some aspects, the bit map may include a plurality of locations, each corresponding to a respective subchannel in a respective slot. The first UE 602 may insert the indication of the first reservation message into the bit map by inserting the indication of the first reservation message in at least one location of the plurality of locations of the bit map corresponding to the one or more sidelink resources. Subsequently, the first UE 602 may transmit the bit map to at least the third UE 606 via the one or more forwarding sidelink resources. In some aspects, a bit of "0" in a location of the plurality of locations of the bit map may indicate that no resource reservation is allocated to the respective subchannel of the respective slot and a bit of "1" in the location of the bit map may indicate that at least one resource reservation is allocated to the respective subchannel in the respective slot. In some aspects, a size of the bit map may be preconfigured so that the bit map and/or the size of the bit map does not have to be signaled each time.

In some aspects, each location of the plurality of locations of the bit map may include a multi-bit value representing a resource reservation occupation level of the respective subchannel in the respective slot. The resource reservation occupation level may be determined based on a reference signal received power (RSRP) associated with zero or more resource reservations of the respective subchannel in the respective slot. In some aspects, the zero or more resource reservations may include a plurality of resource reservations from a plurality of UEs. The resource reservation occupation level of the respective subchannel in the respective slot may be determined, for example, to be given by at least one of: a sum of each RSRP for each resource reservation of the plurality of resource reservations, or a maximum RSRP among the plurality of resource reservations from the plurality of UEs. For example, in response to receiving overlapping forwarded resources from two UEs, the third UE 606 may avoid using the reserved resources in response to a maximum RSRP associated with the received overlapped forwarded resources being greater an RSRP threshold value (e.g., greater than a maximum RSRP threshold value). In some aspects, the bit map may include a width corresponding to a number of subchannels and a length corresponding to a number of slots.

In response to receiving the first reservation forwarding message, the third UE 606 may abstain from using the one or more sidelink resources identified in the first reservation forwarding message for communication thereon. For example, the third UE 606 may receive the first reservation forwarding message from the first UE 602. Based on the indication of the one or more sidelink resources reserved by the second UE 604 any other UEs, the third UE 606 may determine to abstain from transmitting (or more broadly, communicating) using the one or more sidelink resources. In some aspects, the third UE 606 may abstain from using the one or more sidelink resources based on the first reservation forwarding message, including an indication of a collision or prospective collision between reservation messages and/or data packets. With the third UE 606 abstaining from transmitting (or more broadly, communicating) on the one or more sidelink resources indicated in the first reservation forwarding message, the second UE 604 may transmit the first data packet to the first UE 602 with a reduced risk of a collision between transmissions.

In some aspects, the third UE 606 may mark the one or more sidelink resources as reserved with the corresponding priority of the first data packet in response to receiving the first reservation forwarding message. In response to receiving the first reservation forwarding message from the first UE 602 and abstaining from transmitting (or, more broadly, communication) using the one or more sidelink resources, the third UE 606 may select one or more different sidelink resources for transmitting data packets. For example, the third UE 606 may select one or more different sidelink resources for communication with the first UE 602.

In some aspects, the third UE 606 may obtain a reference signal received power (RSRP) value of the first reservation forwarding message. In examples in which the first reservation forwarding message indicates that the first UE 602 is the intended recipient of the first data packet scheduled by the first reservation message (e.g., Rx bit=true), the third UE 606 may either abstain from using the one or more sidelink resources regardless of the RSRP value or in response to the RSRP value being greater than a threshold. In some aspects, the third UE 606 may receive the first reservation forwarding message that includes an identifier (ID) of the second UE 604. In response to receiving the first reservation forwarding message that includes the ID of the second UE 604, the third UE 606 may identify a stored reference signal received power (RSRP) value obtained from a previous transmission from the second UE 604 and may abstain from transmitting on the one or more sidelink resources in response to the RSRP value being greater than a threshold value.

In some aspects, the third UE 606 may receive the first reservation forwarding message from the first UE 602, including a first RSRP value associated with the first reservation message from the second UE 604. In some examples, the third UE 606 may normalize the first RSRP value based on a difference between a first number of subchannels utilized for the first reservation message and a second number of subchannels associated with the one or more sidelink resources to produce a normalized RSRP value. In addition, the third UE 606 may further obtain a second RSRP value of the first reservation forwarding message. In examples in which the first reservation forwarding message does not indicate that the first UE 602 is the intended recipient of the first data packet scheduled by the first reservation message, the third UE 606 may abstain from using the one or more sidelink resources based on determining that the first UE 602 is a potential recipient of the first data packet to be transmitted by the second UE 604 and abstaining from using the one or more sidelink resources regardless of the first RSRP value or the second RSRP value or in response to the second RSRP value being greater than a threshold value. In some aspects, the third UE 606 may further abstain from using the one or more sidelink resources in response to a minimum RSRP value between the first RSRP value (or normalized RSRP value) and the second RSRP value being greater than the threshold regardless of whether the first UE 602 is a potential receiver. In some aspects, the third UE 606 may receive the first reservation forwarding message from the first UE 602, including an identifier (ID) of the second UE 604. The third UE 606 may identify a stored RSRP value obtained from the first UE 602 from a previous transmission from the second UE 604 and abstain from using the one or more sidelink resources in response to the stored RSRP value being greater than a threshold value.

In some aspects, the first reservation forwarding message may include a bit map having a plurality of locations, each corresponding to a respective subchannel in a respective slot. The indication of the first reservation message may be included in at least one location of the plurality of locations of the bit map corresponding to the one or more sidelink resources. In some aspects, the indication of the first reservation message may include a respective single bit in each of the at least one location in the bit map. In some aspects, each location of the plurality of locations may include a respective multi-bit value representing a resource reservation occupation level of the respective subchannel in the respective slot. The third UE 606 may convert a multi-bit value of the multi-bit values in the at least one location to a corresponding RSRP value and abstain from using the one or more sidelink resources based on the corresponding RSRP value. For example, the third UE 606 may abstain from using the one or more sidelink resources when the corresponding multi-bit RSRP value is greater than a threshold value or based on the minimum of the multi-bit RSRP value and the RSRP value of the first reservation forwarding message being above a threshold value.

In some aspects, the third UE 606 may receive at least one additional reservation forwarding message that includes the first reservation message (or includes the indication of the reserved resources in the first reservation message) from at least one additional UE via one or more additional forwarding sidelink resources. In this example, the third UE 606 may abstain from using the one or more sidelink resources based on whether a respective measured reference signal received power (RSRP) value associated with a respective one of the first reservation forwarding message and the at least one additional reservation forwarding message is greater than a given RSRP value (e.g., a maximum RSRP threshold value). In one example, the third UE 606 may avoid using the resource identified in the first reservation forwarding message and the at least one additional reservation forwarding message if the measured RSRP associated with any one of the first reservation forwarding message or any one of the at least one additional reservation forwarding message exceeded the given RSRP value. In another example, the third UE 606 may abstain from using the reserved resources regardless of a measured RSRP value or values.

In some aspects, the second UE 604 may transmit the first data packet to at least the first UE 602 using the one or more second sidelink resources. For example, the second UE 604 may transmit the first data packet to the first UE 602 using the one or more second sidelink resources, while the third UE 606 abstains from communication using the one or more second sidelink resources. In some aspects, the second UE 604 may transmit the first data packet to the first UE 602 and the third UE 606 using the one or more second sidelink resources.

Figure 7:
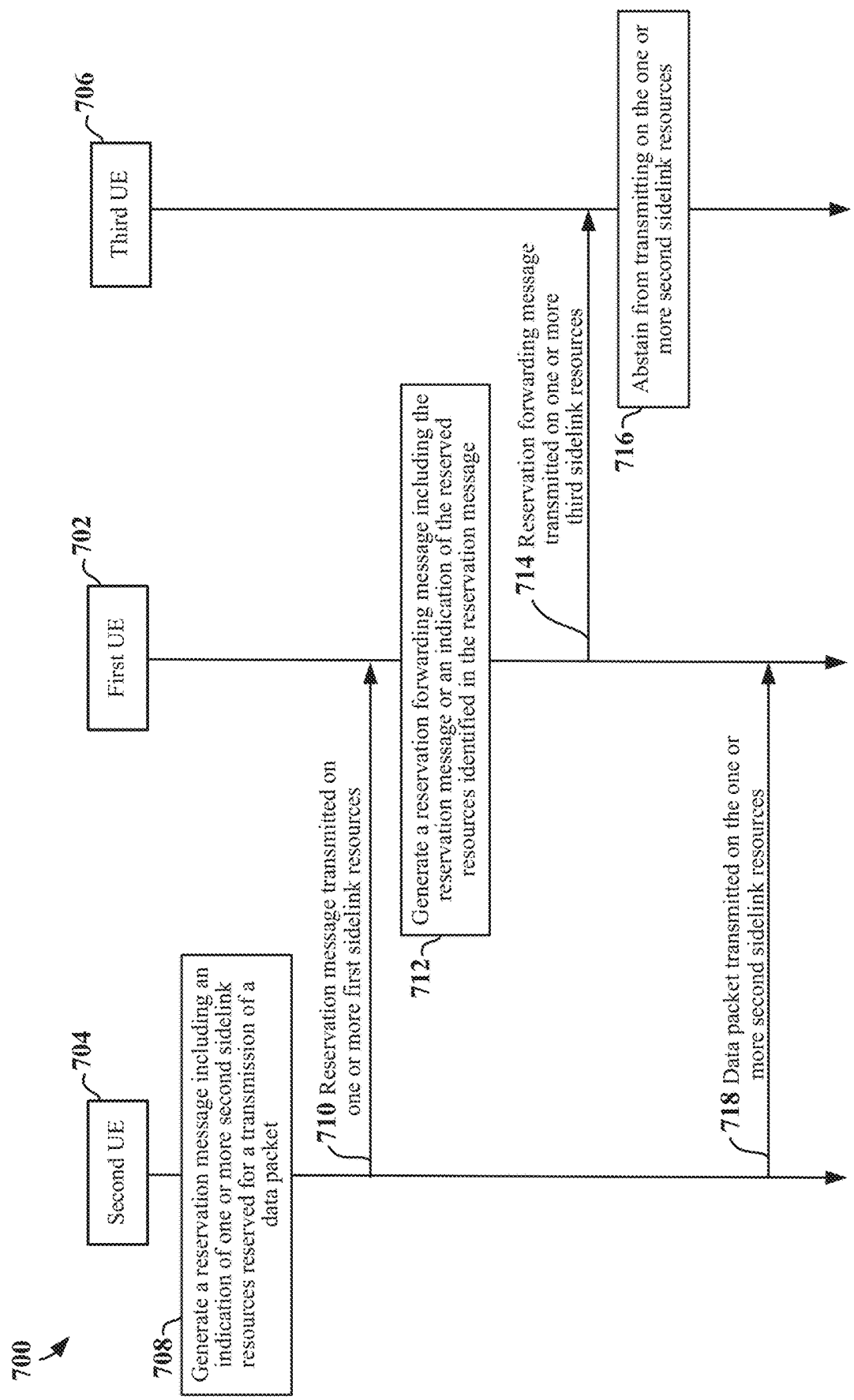
FIG. 7 is a signaling diagram illustrating an example of use of a resource reservation according to some aspects.

FIG. 7 is a signaling diagram 700 illustrating an example of forwarding a resource reservation according to some aspects. In the example shown in FIG. 7, a first user equipment (UE) 702 (e.g., a wireless communication device) may be in wireless communication with a second UE 704 (e.g., another wireless communication device) over a sidelink. Also, in the example shown in FIG. 7, the first UE 702 may be in wireless communication with a third UE 706 (e.g., another wireless communication device) over a sidelink. The first UE 702, the second UE 704, and the third UE 706 may correspond to any of the UEs as shown and described in connection with FIGS. 1, 3, and/or 6. In particular, the first UE 702 may correspond to the first UE 602 as shown and described in connection with FIG. 6. The second UE 704 may correspond to the second UE 604 as shown and described in connection with FIG. 6, and 6. The third UE 706 may correspond to the third UE 606, as shown and described in connection with FIG. 6.

At 708, the second UE 704 may generate a reservation message, including a first indication of one or more second sidelink resources reserved for transmission of a data packet (e.g., an initial transmission and/or retransmission of the first data packet). For example, the second UE 704 may select the one or more sidelink resources to transmit the data packet. The selection of the one or more sidelink resources for transmission of the data packet may be based on, for example, availability of sidelink resources, a signal strength of the one or more sidelink resource, a signal quality of the one or more resources, a combination thereof, or the like. In some aspects, the first reservation message may be included in a second stage sidelink control information (SCI-2) and included in a control portion of the signal. The first reservation message may be included, for example, in a control portion of a sidelink transmission. In some aspects, the first reservation message may have a portion transmitted using SCI-2 and another portion transmitted using a MAC-CE.

At 710, the second UE 704 may transmit the first reservation message to the first UE 702 on one or more first sidelink resources. In some examples, the first reservation message may inform the first UE 702 that it is the intended recipient of the data packet on the one or more second sidelink resources. As described herein, the first reservation message or an indication of the one or more second sidelink resources identified in the first reservation message may be transmitted from the first UE 702 to the third UE 706 to, for example, inform the third UE 706 to abstain from using (e.g., transmitting) on the one or more second sidelink resources to, for example, reduce the probability of a packet collision when the second UE 704 transmits the data packet to the first UE 702 on the one or more second sidelink resources.

In some examples, the first reservation message may include a retransmission resource message. A retransmission resource message may include an indication of one or more other sidelink resources that may be used for a retransmission of the data packet. The one or more other sidelink resources indicated in the retransmission resource message may be different from the one or more second sidelink resources reserved for an initial transmission of the data packet.

In some examples, the sidelink transmission of the first reservation message may not include any data. In such an example, the one or more first sidelink resources may include the control portion (SCI-1 and/or SCI-2) and an empty or nearly empty data portion utilized for the reservation message on the one or more first sidelink resources. For example, the one or more first sidelink resources may include a small number of resources (e.g., one or two subchannels). Thus, the first reservation message may have a transmission bandwidth (e.g., 1 MHz to 2 MHz) that is smaller than the transmission bandwidth (e.g., 10 MHz) that may be used to transmit the data packet. In addition, the second UE 704 may transmit the first reservation message with robust coding.

At 712, the first UE 702 may generate a reservation forwarding message including the first reservation message, or including an indication of the reserved resources identified in the first reservation message. In some aspects, in response to the first UE 702 receiving the first reservation message, the first UE 702 may measure a reference signal received power (RSRP) of the first reservation message. In some aspects, the first UE 702 may include the RSRP of the first reservation message in a reservation forwarding message. In some aspects, the first UE 702 may include an identification (identifier) of the second UE 704 in the first reservation forwarding message. The identification of the second UE 704 may be obtained from the SCI (e.g., SCI-2) or a MAC header if data is also transmitted with the first reservation message.

In some aspects, the first UE 702 may include a single bit in the first reservation forwarding message indicating to the third UE 706 that the first UE 702 is the intended recipient of the data packet (that may be transmitted on the one or more second sidelink resources). The single bit (Rx bit) may provide an indication to the third UE 706 that the third UE 706 is to abstain from transmitting (or more broadly, communicating) using the one or more second sidelink resources so that the first UE 702 may receive the data packet on the one or more second sidelink resources from the second UE 704. Abstaining from transmission on the one or more second sidelink resources by the third UE 706 may aid in minimizing adverse conditions (e.g., interference) with reception of the data packet at the first UE 702 and may reduce the potential for a collision between transmissions of the second UE 704 and the third UE 706. In some aspect, the first reservation message or the indication of the reserved resources in the first reservation message may be expressed as a single bit (e.g., in a bit map). Thus, a reservation forwarding message may include many reservation messages or many indications of the reserved resources in the many reservation messages, representing the reservations of many UEs.

In some aspects, the first UE 702 may identify a first collision associated with transmitting the first reservation message. For example, the first UE 702 may detect a collision when attempting to receive the first reservation message from the second UE 704 on the one or more first sidelink resources. The first UE 702 may detect a collision by comparing the RSRP value of the transmission of the first reservation message from the second UE 704 on the one or more first sidelink resources with a reference signal received quality (RSRQ) value of the transmission of the first reservation message from the second UE 704 on the one or more first sidelink resources. When the RSRP value is relatively high while the RSRQ value is relatively low, the first UE 702 may determine that a collision occurred during the transmission of the first reservation message from the second UE 704 to the first UE 702 on the one or more first sidelink resources. In this example, if the second UE 704 can still decode the first reservation message, the second UE 704 may determine to forward the first reservation message in a reservation forwarding message even when the data packet is not intended for the second UE 704. For example, the second UE 704 may determine to transmit the first reservation forwarding message, including the first reservation message in response to detecting the first collision to ensure other UEs can receive and decode the first reservation message.

Similarly, in some aspects, the first UE 702 may identify a potential second collision associated with a second reservation message. For example, the first UE 702 may receive a second reservation message on one or more second sidelink resources from a fourth UE (e.g., a fourth UE 608) indicating one or more second sidelink resources for transmitting a second data packet. In response to receiving the second reservation message from the fourth UE, the first UE 702 may detect a potential second collision between subsequent transmissions of the data packet and the second data packet. For example, the first UE 702 may determine that the one or more sidelink resources to be utilized for transmission of the data packet overlap in time and/or frequency with the one or more second sidelink resources to be utilized for transmission of the second data packet. In some examples, the first UE 702 may detect whether the potential second collision may occur at the first UE 702 by comparing the RSRP value of the second reservation message with the RSRP value of the first reservation message. In examples where the difference in RSRP values is high (e.g., above a threshold), the first UE 702 may determine that even if a collision occurs, the first UE 702 will still be able to decode the data packet from the second UE 704. Therefore, the first UE 702 may not consider the potential second collision when forwarding the first reservation message.

In response to identifying the potential second collision, the first UE 702 may include an indication of the second collision in the first reservation forwarding message for reception by at least the third UE 706. In some aspects, the indication of the second collision may be a single bit included in an SCI-2 or the PSSCH of the first reservation forwarding message. In some aspects, the first UE 702 may transmit the first reservation forwarding message as a broadcast message reaching a plurality of UEs including the second UE 704, the third UE 706, and the fourth UE. In this example, the first reservation forwarding message may further include an identifier (ID) of at least one of the second UE 704 or the fourth UE 708, requesting that at least one of the second UE 704 or the fourth UE avoid the potential second collision (e.g., by changing the one or more sidelink resources for transmitting their respective data packets).

In addition to the first reservation message, as described herein, the first UE 702 may receive the second reservation message from the fourth UE 708. As indicated above, the second reservation message may include an indication of the one or more second sidelink resources for a subsequent transmission of a second data packet from the fourth UE 708. In the example, the first UE 702 may not be the intended recipient of the second data packet. In response to receiving the second reservation message, the first UE 702 may include an indication of the second reservation message in the first reservation forwarding message. In some examples, the first UE 702 may include the indication of the second reservation message in the first reservation forwarding message in response to detecting a collision, as described above. In other examples, the first UE 702 may include the indication of the second reservation message in the first reservation forwarding message for reception by at least the third UE 706. In the example, in response to receiving the first reservation message from the second UE 704 and the second reservation message from the fourth UE 708, the first UE 702 may include in the first reservation forwarding message a first at least one bit indicating that the first UE 702 is an intended recipient of the first data packet and a second at least one bit indicating that the first UE 702 is not the intended recipient of the second data packet.

The first reservation forwarding message may inform the third UE 706 of the reservation of the one or more second sidelink resources. The third UE 706 may utilize the first reservation forwarding message to determine, for example, whether to abstain from using the one or more second sidelink resources indicated in the first reservation message for a sidelink transmission. In some aspects, the first reservation forwarding message may be included in a data portion and/or a control portion of a sidelink transmission. In some aspects, the first reservation forwarding message may be included in a sidelink medium access control (MAC) control element (MAC-CE) and included in the data portion of the sidelink transmission. In some aspects, the first reservation forwarding message may be included in a second stage sidelink control information (SCI-2) and included in a control portion of the sidelink transmission. In some aspects, the first reservation forwarding message may be included in a sidelink radio resource control (RRC) message and included in the data portion of the sidelink transmission.

At 714, the first UE 702 may transmit the first reservation forwarding message to the third UE 706 (or broadcast the first reservation forwarding message to all UEs in the system including the second UE 704 and the third UE 706). The first reservation forwarding message transmission may occur on one or more third sidelink resources. The first reservation forwarding message may inform the third UE 706 (and any other UEs receiving the first reservation forwarding message) that the first UE 702 is the intended recipient of the data packet on one or more second sidelink resources (transmitted by the second UE 704). In some aspects, the first UE 702 may transmit the first reservation forwarding message in a sidelink MAC-CE through a broadcast transmission on a physical sidelink shared channel (PSSCH). In some aspects, the first UE 702 may transmit the first reservation forwarding message to only the third UE 706 in a sidelink RRC message through a unicast transmission on a PSSCH. In some aspects, the first UE 702 may transmit the first reservation forwarding message to at least the third UE 706 in SCI-2 on a physical sidelink control channel (PSCCH).

In some aspects, the first UE 702 may transmit the first reservation forwarding message to at least the third UE 706 using a relatively small transmission bandwidth (e.g., 1 MHz to 2 MHz) compared to the relatively larger transmission bandwidth of the data packet (e.g., about 10 MHz). In addition, the first UE 702 may transmit the first reservation forwarding message with robust coding.

As described herein, in response to the first UE 702 receiving the first reservation message, the first UE 702 may determine if the first UE 702 is an intended recipient of the first data packet. In some examples, in response to the first UE 702 receiving the first reservation message, the first UE 702 may obtain an RSRP value of the first reservation message. In other examples, the first UE 702 may determine if the first UE 702 is the intended recipient of the first data packet and obtain the RSRP value of the first reservation message. In some aspects, the first UE 702 may obtain the RSRP value by measurement. For example, the first UE 702 may measure a reference signal received power (RSRP) of the first reservation message. According to some examples, the first UE 702 may transmit the first reservation forwarding message, including the indication of the first reservation message, to the third UE 706 in response to at least one of: determining that the first UE 702 is the intended recipient of the first data packet, or determining that the RSRP value is less than the threshold value. Conversely, in response to at least one of: a determination that the first UE 702 is not the intended recipient of the first data packet or determining that the RSRP value is greater than a threshold value, the first UE 702 may abstain from transmitting the first reservation forwarding message, including the indication of the first reservation message to the third UE 706.

In some aspects, the first UE 702 may transmit the first reservation forwarding message to at least the third UE 706 based on whether the first UE 702 receives a second reservation message or a second reservation forwarding message. For example, the second UE 704 may have transmitted the first reservation message to a plurality of UEs including the first UE 702. In response to receiving the first reservation message from the second UE 704, the first UE 702 may monitor for a second reservation message and/or a second reservation forwarding message from another UE. In response to receiving the first reservation message from the second UE 704, the first UE 702 may initiate a timer. If the first UE 702 fails to receive the second reservation message and/or the second reservation forwarding message from another UE before the expiry of the timer, the first UE 702 may determine to transmit the first reservation forwarding message to at least the third UE 706. Conversely, if the first UE 702 receives the second reservation message and/or the second reservation forwarding message from another UE before the expiry of the timer, the first UE 702 may determine not to transmit the first reservation forwarding message to the third UE 706.

In some aspects, the first UE 702 may insert the indication of the first reservation message into a bit map and transmit the bit map in the first reservation forwarding message to at least the third UE 706. In some aspects, the bit map may include a plurality of locations, each corresponding to a respective subchannel in a respective slot. The first UE 702 may insert the indication of the first reservation message into the bit map by inserting the indication of the first reservation message in at least one location of the plurality of locations of the bit map corresponding to the one or more sidelink resources. Subsequently, the first UE 702 may transmit the bit map to at least the third UE 706 via the one or more forwarding sidelink resources. In some aspects, a bit of "0" in a location of the plurality of locations of the bit map may indicate that no resource reservation is allocated to the respective subchannel of the respective slot and a bit of "1" in the location of the bit map may indicate that at least one resource reservation is allocated to the respective subchannel in the respective slot.

In some aspects, each location of the plurality of locations of the bit map may include a multi-bit value representing a resource reservation occupation level of the respective subchannel in the respective slot. The resource reservation occupation level may be determined based on a reference signal received power (RSRP) associated with zero or more resource reservations of the respective subchannel in the respective slot. In some aspects, the zero or more resource reservations may include a plurality of resource reservations. The resource reservation occupation level of the respective subchannel in the respective slot may be determined, for example, to be given by at least one of: a sum of each RSRP for each resource reservation of the plurality of resource reservations or a maximum RSRP among the plurality of resource reservations. In some aspects, the bit map may include a width corresponding to a number of subchannels and a length corresponding to a number of slots.

At 716, in response to receiving the first reservation forwarding message, the third UE 706 may abstain from using the one or more second sidelink resources. For example, the third UE 706 may receive the first reservation forwarding message from the first UE 702 and, based on the indication of the one or more second sidelink resources in the first reservation forwarding message, determine to abstain from transmitting (or more broadly, communicating) using the one or more second sidelink resources. In some aspects, the third UE 706 may abstain from using the one or more second sidelink resources based on the first reservation forwarding message including an indication of a collision between the transmission of the first reservation message and a transmission of a second reservation message. With the third UE 706 abstain from transmitting (or more broadly, communicating) on the one or more second sidelink resources indicated in the first reservation forwarding message, the second UE 704 may transmit the data packet to the first UE 702 with a reduced risk of a collision between transmissions.

In some aspects, the third UE 706 may mark the one or more sidelink resources as reserved with the corresponding priority of the data packet in response to receiving the first reservation forwarding message. In response to receiving the first reservation forwarding message from the first UE 702 and abstaining from transmitting using the one or more sidelink resources, the third UE 706 may select one or more different sidelink resources for transmitting data packets. For example, the third UE 706 may select one or more different sidelink resources for communication with the first UE 702.

In some aspects, the third UE 706 may obtain a reference signal received power (RSRP) value of the first reservation forwarding message. In examples in which the first reservation forwarding message indicates that the first UE 702 intends to receive the data packet scheduled by the first reservation message (e.g., Rx bit=true), the third UE 706 may either abstain from using the one or more sidelink resources regardless of the RSRP value or in response to the RSRP value being greater than a threshold. In some aspects, the third UE 706 may receive the first reservation forwarding message that includes an identifier (ID) of the second UE 704. In response to receiving the first reservation forwarding message that includes the ID of the second UE 704, the third UE 706 may identify a stored reference signal received power (RSRP) value obtained for the second UE 704 from a previous transmission by the second UE 704. The third UE 706 may abstain from transmitting on the one or more sidelink resources in response to the RSRP value being greater than a threshold value.

In some aspects, the third UE 706 may receive the first reservation forwarding message from the first UE 702 including a first RSRP value associated with the first reservation message from the second UE 704. The third UE 706 may normalize the first RSRP value based on a difference between a first number of subchannels utilized for the first reservation message and a second number of subchannels associated with the one or more sidelink resources to produce a normalized RSRP value. In addition, the third UE 706 may further obtain a second RSRP value of the first reservation forwarding message. In examples in which the first reservation forwarding message does not indicate that the first UE 702 is the intended recipient of the data packet scheduled by the first reservation message, the third UE 706 may abstain from using the one or more sidelink resources based on determining that the second UE is a potential receiver of the first UE and abstaining from using the one or more sidelink resources regardless of the first RSRP value or the second RSRP value or in response to the second RSRP value being greater than a threshold. In some aspects, the third UE 706 may further abstain from using the one or more sidelink resources in response to a minimum RSRP value between the first RSRP value (or normalized RSRP value) and the second RSRP value being greater than the threshold regardless of whether the second UE is a potential receiver. In some aspects, the third UE 706 may receive the first reservation forwarding message from the first UE 702 including an identifier (ID) of the first UE. The third UE 706 may identify a stored RSRP value obtained for the second UE 704 from a previous transmission by the second UE 704. The third UE 706 may abstain from transmitting on the one or more sidelink resources in response to the stored RSRP value being greater than a threshold value.

In some aspects, the first reservation forwarding message may include a bit map having a plurality of locations, each corresponding to a respective subchannel in a respective slot. The indication of the first reservation message may be included in at least one location of the plurality of locations of the bit map corresponding to the one or more sidelink resources. In some aspects, the indication of the first reservation message may include a respective single bit in each of the at least one location in the bit map. In some aspects, each location of the plurality of locations may include a respective multi-bit value representing a resource reservation occupation level of the respective subchannel in the respective slot. The third UE 706 may convert a multi-bit value of the multi-bit values in the at least one location to a corresponding RSRP value and may abstain from transmitting on the one or more sidelink resources based on the corresponding RSRP value. For example, the third UE 706 may abstain from using the one or more sidelink resources when the corresponding multi-bit RSRP value is greater than a threshold value or based on the minimum of the multi-bit RSRP value and the RSRP value of the first reservation forwarding message being above a threshold value.

In some aspects, the third UE 706 may receive at least one additional reservation forwarding message including the first reservation message, or the indication of the reserved resources in the first reservation message, from at least one additional UE via one or more additional forwarding sidelink resources. In this example, the third UE 706 may abstain from using the one or more sidelink resources based on a maximum reference signal received power (RSRP) value from a respective RSRP value associated with each of the first reservation forwarding message and the at least one additional reservation forwarding message. In one example, the third UE 706 may avoid using the resource identified in the first reservation forwarding message and the at least one additional reservation forwarding message if a given RSRP associated with any one of the first reservation forwarding message or any one of the at least one additional reservation forwarding message exceeded the minimum RSRP value.

At 718, the second UE 704 may transmit the data packet to at least the first UE 702 using the one or more second sidelink resources. For example, the second UE 704 may transmit the data packet to the first UE 702 using the one or more second sidelink resources, while the third UE 706 abstains from communication using the one or more second sidelink resources. In some aspects, the second UE 704 may transmit the data packet to the first UE 702 and the third UE 706 using the one or more second sidelink resources.

Figure 8:
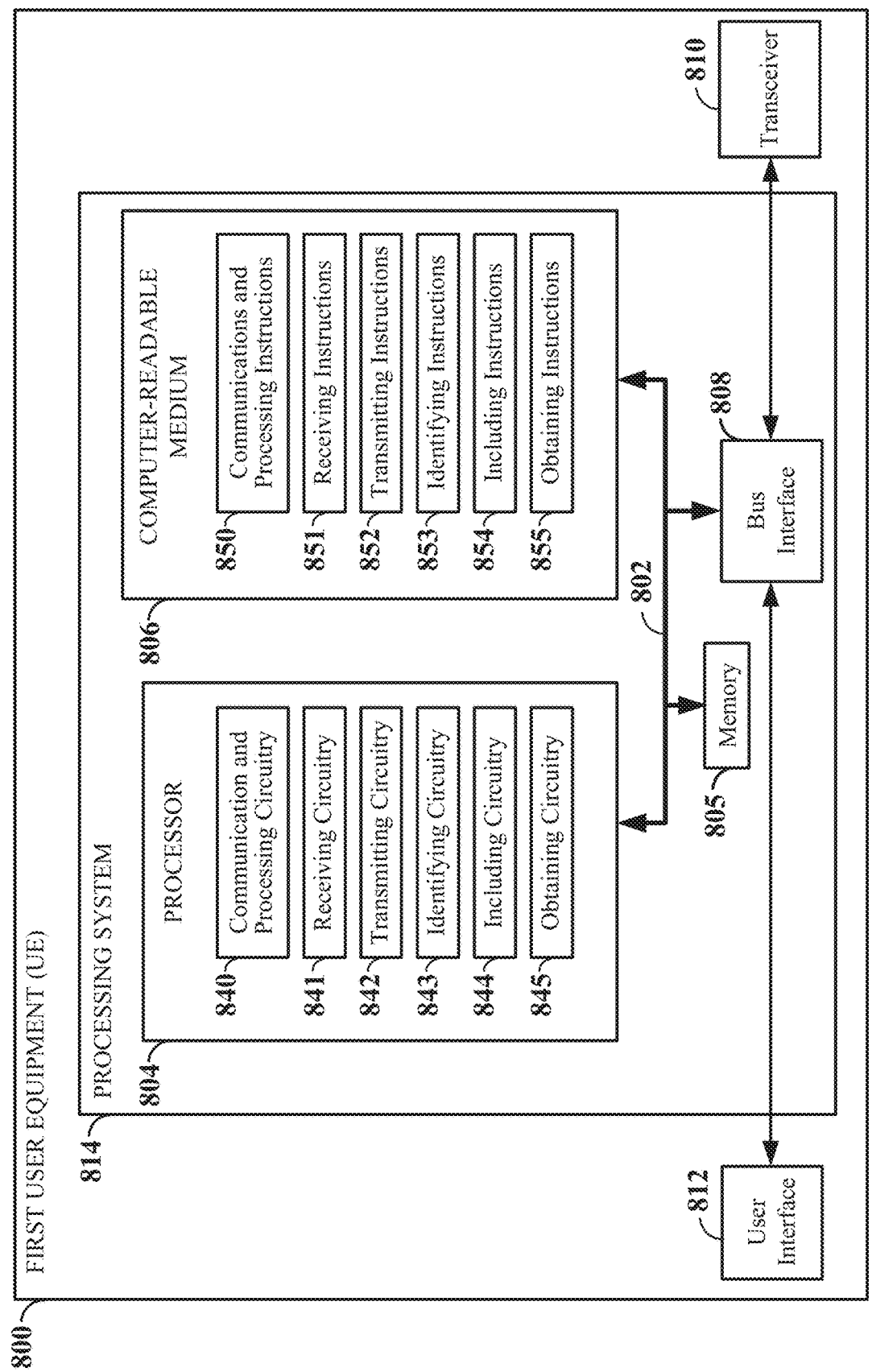
FIG. 8 is a block diagram illustrating an example of a hardware implementation of a first user equipment (UE) employing a processing system according to some aspects.

FIG. 8 is a block diagram illustrating an example of a hardware implementation of a first user equipment (UE) 800 (e.g., a first wireless communication device) employing a processing system 814 according to some aspects. For example, the first UE 800 may be any UE illustrated in any one or more of FIGS. 1, 3, 6, and/or 7. More particularly, the first UE 800 may be exemplified by the first UE 602 as shown and described in connection with FIG. 6, or the first UE 702 as shown and described in connection with FIG. 7.

In accordance with various aspects of the disclosure, an element, or any portion of an element, or any combination of elements may be implemented with a processing system 814 that includes one or more processors, such as processor 804. Examples of processor 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the first UE 800 may be configured to perform any one or more of the functions described herein. That is, the processor 804, as utilized in the first UE 800, may be used to implement any one or more of the methods or processes described and illustrated, for example, in FIGS. 6, 7, and/or 9-13.

The processor 804 may in some instances be implemented via a baseband or modem chip and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804) and computer-readable media (represented generally by the computer-readable medium 806). The bus 802 may also link various other circuits such as timing sources, peripherals, voltage regulators, and power management circuits, which are well known in the art, and therefore, are not described any further.

A bus interface 808 provides an interface between the bus 802 and a transceiver 810. The transceiver 810 may be, for example, a wireless transceiver. The transceiver 810 may provide a means for communicating with various other apparatus over a transmission medium (e.g., air interface). The transceiver 810 may further be coupled to one or more antennas/antenna arrays (not shown). The bus interface 808 further provides an interface between the bus 802 and a user interface 812 (e.g., keypad, display, touch screen, speaker, microphone, control features, etc.). Of course, such a user interface 812 may be omitted in some examples. In addition, the bus interface 808 further provides an interface between the bus 802 and a power source (not shown).

One or more processors, such as processor 804, may be responsible for managing the bus 802 and general processing, including the execution of software stored on the computer-readable medium 806. Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise. The software may reside on the computer-readable medium 806. The software, when executed by the processor 804, causes the processing system 814 to perform the various processes and functions described herein for any particular apparatus.

The computer-readable medium 806 may be a non-transitory computer-readable medium and may be referred to as a computer-readable storage medium or a non-transitory computer-readable medium herein. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities, including the processing system 814. The computer-readable medium 806 may be embodied in a computer program product or article of manufacture. By way of example, a computer program product or article of manufacture may include a computer-readable medium in packaging materials. In some examples, the computer-readable medium 806 may be part of the memory 805. Those skilled in the art will recognize how best to implement the described functionality presented throughout this disclosure depending on the particular application and the overall design constraints imposed on the overall system. The computer-readable medium 806 and/or the memory 805 may also be used for storing data that may be manipulated by the processor 804 when executing software.

In some aspects of the disclosure, the processor 804 may include communication and processing circuitry 840 configured for various functions, including, for example, communicating with a network core (e.g., a 5G core network), one or more scheduling entities, scheduled entities, one or more TRPs (such as the first TRP 821, the second TRP 822, and/or the third TRP 823 through nth TRP 824), and/or any other entity, such as, for example, local infrastructure or an entity communicating with the first UE 800 via the Internet, such as a network provider. According to some aspects, the various functions of the communication and processing circuitry 840 may be utilized to implement beam-specific timing precompensation as described herein.

In some examples, the communication and processing circuitry 840 may include one or more hardware components that provide the physical structure that performs processes related to wireless communication (e.g., signal reception and/or signal transmission) and signal processing (e.g., processing a received signal and/or processing a signal for transmission), as well as performs processes related to beam-specific timing precompensation processes as described herein. In addition, the communication and processing circuitry 840 may be configured to receive and process sidelink traffic and sidelink control. The communication and processing circuitry 840 may further be configured to execute communication and processing software 850 stored on the computer-readable medium 806 to implement one or more functions described herein.

The processor 804 may also include receiving circuitry 841 configured to receive a first reservation message from a second UE (e.g., second UE 604 of FIG. 6, second UE 704 of FIG. 7) via one or more first sidelink resources, the first reservation message may include a first indication of one or more second sidelink resources for subsequently receiving a first data packet from the second UE. The receiving circuitry 841 may further be configured to receive a transmission of the first data packet from the second UE via the one or more second sidelink resources. In some examples, the first reservation message may include at least one reservation of one or more other sidelink resources (different from the one or more first sidelink resources and the one or more second sidelink resources) for at least one retransmission of the first data packet, where the receiving the first data packet further includes receiving the at least one retransmission of the first data packet via the one or more other sidelink resources. In some examples, the receiving circuitry 841 may further be configured to receive a second reservation message from a fourth UE (e.g., the fourth UE 608 of FIG. 6), where the second reservation message includes an indication of one or more fifth sidelink resources reserved by the fourth UE for receiving a second data packet from the fourth UE, and including the second reservation message or an indication of the one or more fifth sidelink resources reserved in the second reservation message in the first reservation forwarding message.

The first UE 800 may identify or determine that it is an intended recipient of the transmission of the first data packet, and may compare the RSRP associated with the first reservation message to a threshold value to determine if the first reservation message, or the resources indicated in the first reservation message, should be included in the first reservation forwarding message. If the first UE 800 is the intended recipient, the first UE may, according to some aspects, set a first at least one bit in the first reservation forwarding message to indicate that the first UE 800 is the intended recipient of the transmission of the first data packet.

The first reservation forwarding message may also include a second reservation message reserving resources for transmission of a second packet from another UE (or include an indication of the resources indicated in the second reservation message). The first UE 800 may set a second at least one bit in the first reservation forwarding message to indicate that the first UE 800 is also the intended recipient of second packet. For example, the second at least one bit may be set high if the second packet is intended for the first UE 800 or may be set low if the second packet is not intended for the first UE 800. In some examples, the first at least one bit and the second at least one bit may not be included with the first reservation forwarding message. For example, the first at least one bit and the second at least one bit may not be included in the first reservation forwarding message if a network entity configures the first UE 800 to only transmit a reservation forwarding message if the first UE 800 is the intended recipient of a given data packet to be sent to the first UE 800 from any other UE (e.g., from the second UE). Additional parameters that may or may not be configured by the network entity to facilitate a decision, made at the first UE 800, regarding whether to transmit the reservation forwarding message may include, for example, an RSRP value threshold.

According to some aspects, the first UE 800 may receive a first reservation message from a second UE via one or more first sidelink resources. The first reservation message may include a first indication of one or more second sidelink resources over which the first UE 800 may subsequently receive a first data packet from the second UE. In some examples, the first UE 800 may transmit a first reservation forwarding message including at least the first indication of the one or more second sidelink resources to at least a third UE via one or more third sidelink resources if the first reservation forwarding message is transmitted in response to the first UE being an intended recipient of the first data packet. In some examples, the first UE 800 may transmit the first reservation forwarding message including at least the first indication of the one or more second sidelink resources to at least the third UE via one or more third sidelink resources if the first reservation forwarding message is transmitted in response to an RSRP value being less than the threshold value. In still other examples, the first UE 800 may transmit the first reservation forwarding message including at least the first indication of the one or more second sidelink resources to at least the third UE via one or more third sidelink resources if both the first UE 800 is the intended recipient of the packet and the RSRP value is less than the threshold value. The receiving circuitry 841 may be configured to execute receiving instructions 851 stored in the computer-readable medium 806 to implement any of the one or more of the functions described herein.

The processor 804 may also include transmitting circuitry 842 configured to transmit a first reservation forwarding message comprising at least a first indication of the one or more second sidelink resources to at least a third UE via one or more third sidelink resources. In some examples, the one or more first sidelink resources and the one or more third sidelink resources may be fewer than the one or more second sidelink resources. According to some examples, the transmitting circuitry 842 may also be configured to transmit the first reservation forwarding message in response to the first UE 800 being an intended recipient of the first data packet. In some examples, the first reservation forwarding message may include a single bit having a value indicating that the first UE is an intended recipient of the first data packet. The transmitting circuitry 842 may further be configured to transmit the first reservation message via a sidelink control information (SCI) (e.g., an SCI-1 or SCI-2), sidelink medium access control (MAC) control element (MAC-CE), or a sidelink radio resource control (RRC) message. According to some examples, the transmitting circuitry 842 may be further configured to monitor, for a predetermined period of time following the receiving of the first reservation message, for at least one of: a second reservation message or a second reservation forwarding message including an indication of a reservation by another UE different from the second UE, of at least the one or more second sidelink resources, and configured to transmit the first reservation forwarding message in response to the expiry of the predetermined period of time in the absence of receiving the at least one of: the second reservation message or the second reservation forwarding message.

According to some aspects, transmitting the first reservation forwarding message to the at least the third UE (e.g., third UE 606 of FIG. 6, third UE 706 of FIG. 7) via the one or more third sidelink resources further include representing the indication of the one or more second sidelink resources in a bit map and transmitting the bit map to the at least the third UE via the one or more third sidelink resources. In some examples, the bit map may include a plurality of locations, each corresponding to a respective subchannel in a respective slot, and the representing the indication of the one or more second sidelink resources in the bit map may further include representing the indication of the one or more second sidelink resources in at least one location of the plurality of locations corresponding to the one or more second sidelink resources. In some examples, each location of the plurality of locations may include a multi-bit value representing a resource reservation occupation level of the respective subchannel in the respective slot. In some aspects, the resource reservation occupation level of the respective subchannel in the respective slot may be determined based on a reference signal received power (RSRP) obtained from the respective subchannel in the respective slot. In some aspects, the bit map may include a width corresponding to a quantity of subchannels and a length corresponding to a quantity of slots.

According to some aspects, the transmitting the first reservation forwarding message to at least the third UE via the one or more third sidelink resources may further include transmitting the first reservation forwarding message via a second stage sidelink control information (SCI-2) to at least the third UE via the one or more third sidelink resources. The transmitting circuitry 842 may be configured to execute transmitting instructions 852 stored in the computer-readable medium 806 to implement any of the one or more of the functions described herein.

The processor 804 may further include identifying circuitry 844 configured to identify a collision associated with the transmitting of the first data packet from the second UE and a transmission of a second data packet by another UE (e.g., by the fourth UE, such as the fourth UE 608 of FIG. 6). The identifying circuitry 844 may also be configured to execute identifying instructions 854 stored in the computer-readable medium 806 to implement any of the one or more of the functions described herein.

In addition, the processor 804 may include including circuitry 846 configured to include an indication of a prospective collision, or of an actual collision, in the first reservation forwarding message. The including circuitry 846 may also be configured to include in the reservation forwarding message identification (e.g., an identifier, an ID) of at least one of a second UE or a third UE to request the at least one of the second UE or the third UE to avoid the collision or to enable the at least one of the second UE or the third UE to avoid the collision by negotiation or by activation of a predetermined process for avoiding the collision. The including circuitry 846 may further be configured to include an indication of the second reservation message in the first reservation forwarding message. In addition, the including circuitry 846 may be configured to include the RSRP value(s) of the first reservation message and/or the second reservation message in the first reservation forwarding message. The including circuitry 846 may be configured to execute including instructions 856 stored in the computer-readable medium 806 to implement any of the one or more of the functions described herein.

The processor 804 may also include obtaining circuitry 848 configured to obtain a first RSRP value of the first reservation message received on the one or more first sidelink resources and/or a second RSRP value of the second reservation message received on the one or more fourth sidelink resources. The obtaining circuitry 848 may be configured to execute obtaining instructions 858 stored in the computer-readable medium 806 to implement any of the one or more of the functions described herein.

Figure 9:
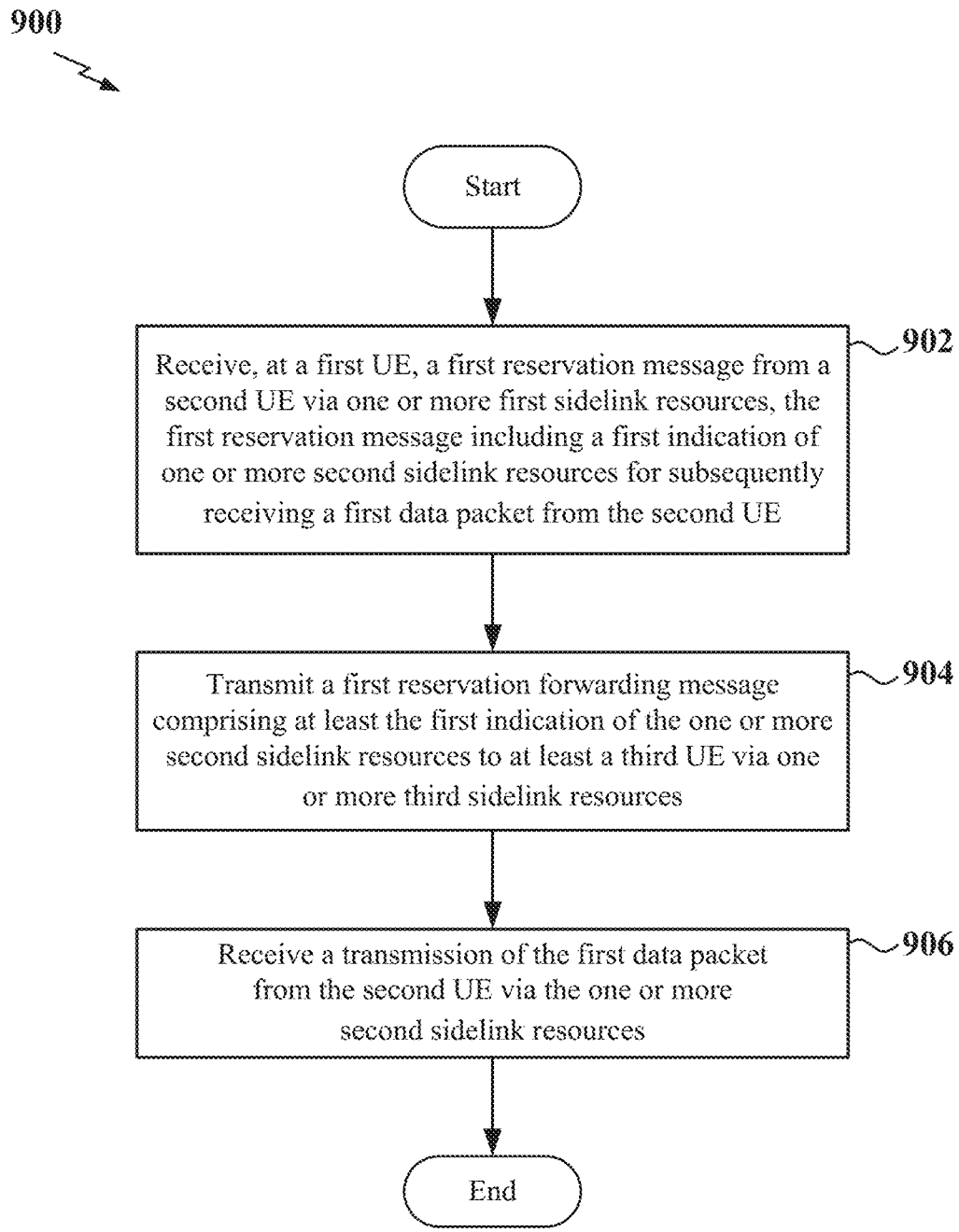
FIG. 9 is a flow chart of a method for forwarding a resource reservation according to some aspects.

FIG. 9 is a flow chart 900 of a method for forwarding a resource reservation according to some aspects. As described below, some or all illustrated features may be omitted in a particular implementation within the scope of the present disclosure, and some illustrated features may not be required for implementation of all aspects. In some examples, the method may be performed by the first UE 800, as shown and described in connection with FIG. 8, by a processor or processing system, or by any suitable means for carrying out the described functions.

At block 902, the first UE may receive a first reservation message from a second UE via one or more first sidelink resources. The first reservation message may include a first indication of one or more second sidelink resources for subsequently receiving a first data packet from the second UE. For example, the receiving circuitry 841, as shown and described in connection with FIG. 8, may provide a means for receiving a first reservation message from a second UE via one or more first sidelink resources, the first reservation message including a first indication of one or more second sidelink resources for subsequently receiving a first data packet from the second UE. The first reservation message may be included, for example, in a control portion of a sidelink transmission. In some aspects, the first reservation message may be included in a second stage sidelink control information (SCI-2) and included in a control portion of the sidelink signal.

In some aspects, the first reservation message may indicate the one or more second sidelink resources that may have been selected by the second UE to transmit the first data packet. Therefore, the first reservation message may indicate to the first UE of the one or more second sidelink resources on which the first UE may receive the first data packet. For example, the indication may be expressed as a time and frequency location. For example, the time location may be expressed as a slot identifier (e.g., a slot ID) and the frequency location may be expressed as a resource block identifier (e.g., a resource block ID). Other ways to indicate (e.g., locate in the time and frequency domains) the one or more or more second sidelink resources are within the scope of the disclosure.

At block 904, the first UE may transmit a first reservation forwarding message comprising at least a first indication of the one or more second sidelink resources to at least a third UE via one or more third sidelink resources. For example, the transmitting circuitry 842, as shown and described in connection with FIG. 8, may provide a means for transmitting a first reservation forwarding message comprising at least an indication of the one or more second sidelink resources to at least a third UE via one or more third sidelink resources. As described herein, the first reservation message or an indication of the resources reserved in the first reservation message may be included in a first sidelink resource forwarding message transmitted from the first UE to the third UE to inform the third UE to abstain from transmitting (or more broadly, communicating) on the one or more second sidelink resources indicated in the first reservation message to reduce the probability of a collision when the second UE transmits the first data packet to the first UE.

In some examples, the first reservation message may include a retransmission resource message. A retransmission resource message may include an indication of one or more sidelink resources that are to be used for a retransmission of the data packet if a collision occurs when initially transmitting the data packet or other conditions (e.g., interference) preventing the second UE from receiving and decoding the data packet. The one or more sidelink resources indicated in the retransmission resource message may include one or more different sidelink resources that are different from one or more sidelink resources used for initially transmitting the data packet.

The first UE may transmit the first reservation message to the second UE using one or more first sidelink resources. For example, the first UE may transmit the first reservation message to the second UE using one or more first sidelink resources to inform the second UE that the second UE is to receive a data packet on one or more sidelink resources from the first UE. In some examples, the first reservation message may be transmitted in SCI (e.g., SCI-1 and/or SCI-2) of a sidelink transmission. The one or more first sidelink resources may include a small number of resources (e.g., one or two subchannels).

At block 906, the first UE may receive a transmission of the first data packet from the second UE via the one or more second sidelink resources. The first UE may decode the first data packet. For example, the receiving circuitry 841 may provide a means for receiving a transmission of the first data packet from the second UE via the one or more second sidelink resources.

Figure 10:
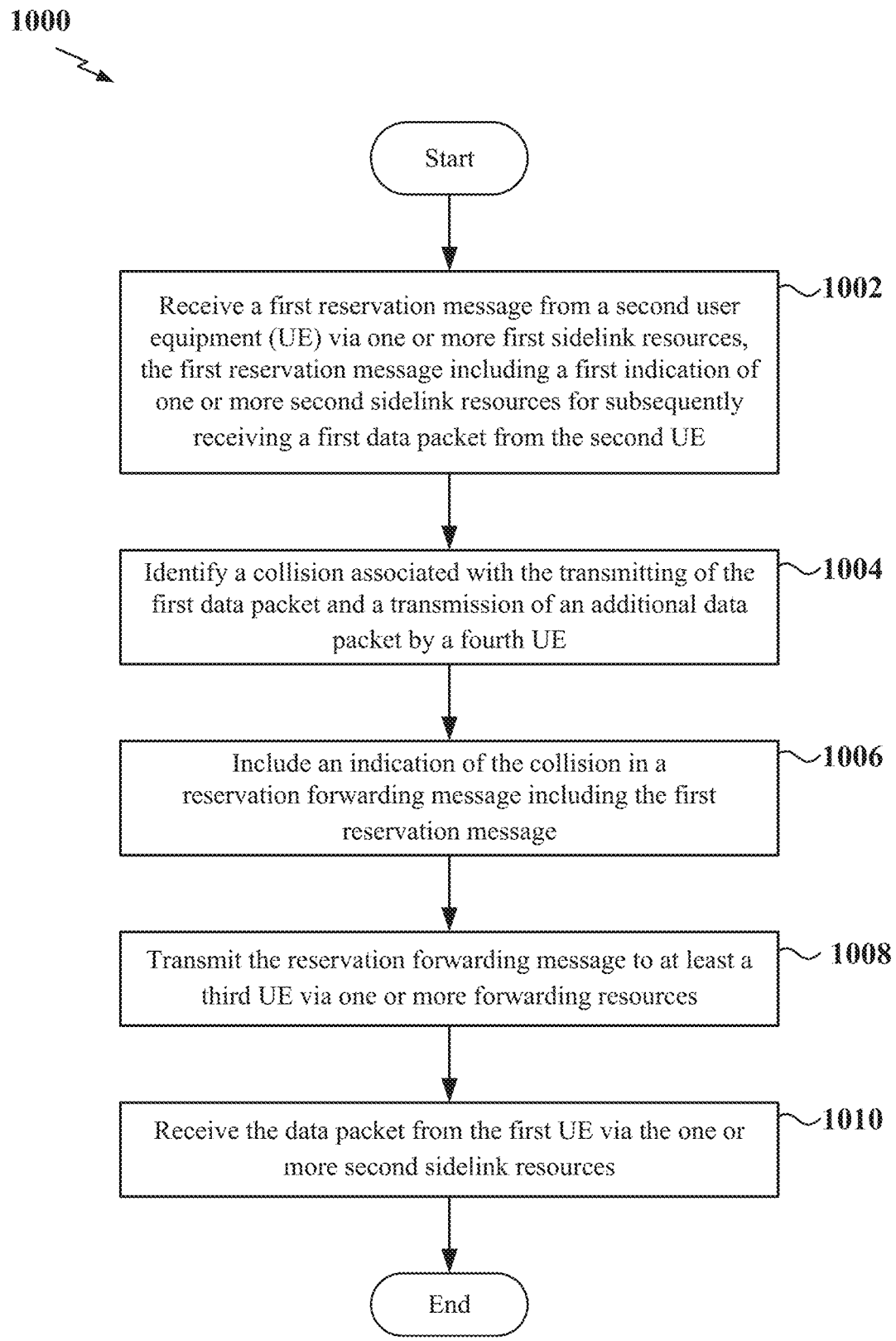
FIG. 10 is a block diagram illustrating an example of a hardware implementation of a second UE employing a processing system according to some aspects.

FIG. 10 is a flow chart 1000 of a method for forwarding a resource reservation according to some aspects. As described below, some or all illustrated features may be omitted in a particular implementation within the scope of the present disclosure, and some illustrated features may not be required for implementation of all aspects. In some examples, the method may be performed by the first UE, as shown and described in connection with FIG. 8, by a processor or processing system, or by any suitable means for carrying out the described functions.

At block 1002, the first UE may receive a first reservation message from a second UE via one or more first sidelink resources. The first reservation message may include a first indication of one or more second sidelink resources for subsequently receiving a first data packet from the second UE. For example, the receiving circuitry 841 as shown and described in connection with FIG. 8 may provide a means for receiving a first reservation message from a second UE via one or more first sidelink resources, the first reservation message including a first indication of one or more second sidelink resources for subsequently receiving a first data packet from the second UE. The second UE may generate a first reservation message including a first indication of one or more second sidelink resources for subsequently transmitting a first data packet (e.g., retransmission or a subsequent transmission). For example, the second UE may select one or more second sidelink resources to transmit the first packet. The selection of the one or more second sidelink resources for transmitting the first data packet may be based on, for example, availability of sidelink resources, a signal strength of the one or more sidelink resource, a signal quality of the one or more resources, a combination thereof, or the like. The first reservation message may be included, for example, in a control portion of a sidelink transmission. In some aspects, the first reservation message may be included in a second stage sidelink control information (SCI-2) and included in a control portion of the signal.

In some aspects, the first reservation message may indicate one or more second sidelink resources that are reserved by the second UE for subsequently transmitting the first data packet to one or more other UEs. For example, the second UE may transmit a first reservation message to the first UE to inform the first UE that the first UE is to receive a data packet in a subsequent transmission on one or more second sidelink resources. As described herein, the one or more second sidelink resources may be transmitted from the first UE to the third UE in a first reservation forwarding message to inform the third UE to abstain from transmitting (or more broadly, communicating) on the one or more second sidelink resources indicated in the reservation message to reduce the probability of a collision when the second UE transmits the first data packet to the first UE.

In some examples, the first reservation message may indicate a retransmission resource message. A retransmission resource message may include an indication of one or more sidelink resources that are to be used for a retransmission of the first data packet if a collision occurs when initially transmitting the first data packet or other conditions (e.g., interference) preventing the first UE from receiving and decoding the first data packet. The one or more sidelink resources indicated in the retransmission resource message may include one or more different sidelink resources that are different from one or more second sidelink resources used for initially transmitting the first data packet.

The second UE may transmit the first reservation message to the first UE using one or more first sidelink resources. For example, the second UE may transmit the first reservation message to the first UE using one or more first sidelink resources to inform the first UE that the first UE is to receive a data packet on one or more second sidelink resources from the second UE. In some examples, the first reservation message may be transmitted in an SCI (e.g., SCI-1 and/or SCI-2) of a sidelink transmission. The sidelink transmission may be, for example, the initial transmission of the first data packet when the first reservation message is a retransmission resource message. In this example, the one or more first sidelink resources may include the control portion (SCI-1 and/or SCI-2) and the data portion (PSSCH) utilized for the initial transmission. In this example, the one or more sidelink resources include the resources reserved and allocated to the one or more retransmissions. In some examples, the one or more first sidelink resources may include the control portion (SCI-1 and/or SCI-2) and the empty data portion utilized for the reservation message. For example, the one or more first sidelink resources may include a small number of resources (e.g., one or two subchannels).

At block 1004, the first UE may identify a collision associated with transmitting the first data packet and an additional data packet by a fourth UE. For example, the identifying circuitry 843 may provide a means for identifying a collision associated with transmitting the first data packet and transmitting an additional data packet by a fourth UE. For example, the first UE may detect a collision when attempting to receive the first reservation message from the second UE on the one or more first sidelink resources. The first UE may detect a collision by comparing the RSRP value of the transmission of the first reservation message from the second UE on the one or more first sidelink resources with a reference signal received quality (RSRQ) value of the transmission of the first reservation message from the second UE on the one or more first sidelink resources. When the RSRP value is relatively high while the RSRQ value is relatively low, the first UE may determine that a collision occurred during the transmission of the first reservation message from the second UE to the first UE on the one or more first sidelink resources. In this example, if the second UE can still decode the first reservation message, the second UE may determine to forward the first reservation message in a reservation forwarding message even when the data packet is not intended for the second UE. For example, the second UE may determine to transmit the reservation forwarding message including the first reservation message in response to detecting the first collision to ensure other UEs can receive and decode the first reservation message.

Similarly, in some aspects, the first UE may identify a potential second collision associated with a second reservation message. For example, the first UE may receive a second reservation message on one or more second sidelink resources from a fourth UE indicating one or more second sidelink resources for transmitting a second data packet. In response to the first UE receiving the second reservation message from the fourth UE, the first UE may detect a potential second collision between subsequent transmissions of the data packet and the second data packet. For example, the first UE may determine that the one or more sidelink resources to be utilized for transmission of the data packet overlap in time and/or frequency with the one or more second sidelink resources to be utilized for transmission of the second data packet. In some examples, the first UE may detect whether the potential second collision may occur at the first UE by comparing the RSRP value of the second reservation message with the RSRP value of the first reservation message. In examples where the difference in RSRP values is high (e.g., above a threshold), the first UE may determine that even if a collision occurs, the first UE will still be able to decode the data packet from the second UE.

Therefore, the first UE may not consider the potential second collision when forwarding the first reservation message.

At block 1006, the first UE may include an indication of the collision in a reservation forwarding message that includes the first reservation message. For example, the including circuitry 844 may provide a means for including an indication of the collision in a reservation forwarding message that includes the first reservation message. For example, in response to identifying the potential second collision, the first UE may include an indication of the second collision in the reservation forwarding message for reception by at least the third UE. In some aspects, the indication of the second collision may be a single bit included in an (SCI-2) or the PSSCH of the reservation forwarding message. In some aspects, the first UE may transmit the reservation forwarding message as a broadcast message reaching a plurality of UEs including the second UE, the third UE, and the fourth UE. In this example, the reservation forwarding message may further include an identifier (ID) of at least one of the second UE or the fourth UE, requesting that at least one of the second UE or the fourth UE avoid the potential second collision (e.g., by changing the one or more sidelink resources for transmitting their respective data packets).

In addition to the first reservation message, as described herein, the first UE may receive the second reservation message from the fourth UE. As indicated above, the second reservation message may include an indication of the one or more second sidelink resources for a subsequent transmission of a second data packet from the fourth UE. In response to receiving the second reservation message, the first UE may include an indication of the second reservation message in the reservation forwarding message. In some examples, the first UE may include the indication of the second reservation message in the reservation forwarding message in response to detecting a collision, as described above. In other examples, the first UE may include the indication of the second reservation message in the reservation forwarding message for reception by at least the third UE. In some aspects, in response to receiving the first reservation message from the second UE and the second reservation message from the fourth UE, the first UE may include in the reservation forwarding message a first bit indicating that the first UE intends to receive the first data packet and that the first UE does not intend to receive the second data packet.

At block 1008, the first UE may transmit the reservation forwarding message to at least a third UE via one or more forwarding sidelink resources. For example, the transmitting circuitry 842, as shown and described in connection with FIG. 8, may provide a means for transmitting the reservation forwarding message to at least a third UE via one or more forwarding sidelink resources. For example, the first UE may transmit the reservation forwarding message to the third UE and/or the fourth UE using one or more forwarding sidelink resources. For example, the first UE may transmit the reservation forwarding message to the third UE and/or the fourth UE using one or more forwarding sidelink resources to inform the third UE and/or the fourth UE that the first UE is to receive a data packet on one or more sidelink resources from the second UE. In some aspects, the first UE may transmit the reservation forwarding message to the third UE and one or more other UEs (e.g., the fourth UE) in a MAC-CE through a broadcast transmission on a physical sidelink shared channel (PSSCH). In some aspects, the first UE may transmit the reservation forwarding message to only the third UE in an RRC message through a unicast transmission on a PSSCH. In some aspects, the first UE may transmit the reservation forwarding message to at least the third UE in SCI-2 on a physical sidelink control channel (PSCCH).

In some aspects, the first UE may transmit the reservation forwarding message to at least the third UE based on whether the first UE receives a reservation forwarding message. For example, the second UE may have transmitted the first reservation message to a plurality of UEs including the first UE. In response to receiving the first reservation message from the second UE, the first UE may monitor for another reservation forwarding message from another UE of the plurality of UEs including the indication of the first reservation message. The first UE may initiate a timer in response to receiving the first reservation message from the second UE. If the first UE fails to receive the other reservation forwarding message from another UE of the plurality of UEs before the timer expires, the first UE may determine to transmit the reservation forwarding message to the third UE. Conversely, if the first UE receives the other reservation forwarding message from another UE of the plurality of UEs before the timer expires, the first UE may determine not to transmit the reservation forwarding message to the third UE.

In some aspects, the first UE may insert the indication of the first reservation message into a bit map and transmit the bit map in the reservation forwarding message to at least the third UE. In some aspects, the bit map may include a plurality of locations, each corresponding to a respective subchannel in a respective slot. The first UE may insert the indication of the first reservation message into the bit map by inserting the indication of the first reservation message in at least one location of the plurality of locations of the bit map corresponding to the one or more sidelink resources. Subsequently, the first UE may transmit the bit map to at least the third UE via the one or more forwarding sidelink resources. In some aspects, a bit of "0" in a location of the plurality of locations of the bit map may indicate that no resource reservation is allocated to the respective subchannel of the respective slot and a bit of "1" in the location of the bit map may indicate that at least one resource reservation is allocated to the respective subchannel in the respective slot.

In some aspects, each location of the plurality of locations of the bit map may include a multi-bit value representing a resource reservation occupation level of the respective subchannel in the respective slot. The resource reservation occupation level may be determined based on a reference signal received power (RSRP) associated with zero or more resource reservations of the respective subchannel in the respective slot. In some aspects, the zero or more resource reservations may include a plurality of resource reservations. The resource reservation occupation level of the respective subchannel in the respective slot may be determined, for example, to be given by at least one of: a sum of each RSRP for each resource reservation of the plurality of resource reservations or a maximum RSRP among the plurality of resource reservations. In some aspects, the bit map may include a width corresponding to a number of subchannels and a length corresponding to a number of slots.

In response to receiving the reservation forwarding message, the third UE may abstain from using the one or more sidelink resources for communication thereon. For example, the third UE may receive the reservation forwarding message from the first UE and, based on the indication of the one or more sidelink resources in the first reservation message contained in the reservation forwarding message, the third UE may determine to abstain from transmitting (or more broadly, communicating) using the one or more sidelink resources. In some aspects, the third UE may abstain from using the one or more sidelink resources based on the reservation forwarding message including an indication of a collision between the transmission of the first reservation message and a transmission of a second reservation message. With the third UE abstaining from transmitting (or more broadly, communicating) of the one or more sidelink resources indicated in the reservation forwarding message, the second UE may transmit the data packet to the first UE with a reduced risk of a collision between transmissions.

In some aspects, the third UE may mark the one or more sidelink resources as reserved with the corresponding priority of the data packet in response to receiving the reservation forwarding message. In response to receiving the reservation forwarding message from the first UE and abstaining from communication using the one or more sidelink resources, the third UE may select one or more different sidelink resources for transmitting data packets. For example, the third UE may select one or more different sidelink resources for communication with the first UE.

In some aspects, the third UE may obtain a reference signal received power (RSRP) value of the reservation forwarding message. In examples in which the reservation forwarding message indicates that the first UE intends to receive the data packet scheduled by the first reservation message (e.g., Rx bit=true), the third UE may either abstain from using the one or more sidelink resources regardless of the RSRP value or in response to the RSRP value being greater than a threshold. In some aspects, the third UE may receive the reservation forwarding message that includes an identifier (ID) of the second UE. In response to receiving the reservation forwarding message that includes the ID of the second UE, the third UE may identify a stored reference signal received power (RSRP) value obtained for the second UE from a previous transmission from the second UE, and abstain from using the one or more sidelink resources in response to the RSRP value being greater than a threshold.

In some aspects, the third UE may receive the reservation forwarding message from the first UE including a first RSRP value associated with the first reservation message from the second UE. The third UE may normalize the first RSRP value based on a difference between a first number of subchannels utilized for the first reservation message and a second number of subchannels associated with the one or more sidelink resources to produce a normalized RSRP value. In addition, the third UE may further obtain a second RSRP value of the reservation forwarding message. In examples in which the reservation forwarding message does not indicate that the first UE intends to receive (e.g., is the intended recipient of) the data packet scheduled by the first reservation message, the third UE may abstain from using the one or more sidelink resources based on determining that the first UE is a potential receiver of the second UE and abstaining from using the one or more sidelink resources regardless of the first RSRP value or the second RSRP value or in response to the second RSRP value being greater than a threshold. In some aspects, the third UE may further abstain from using the one or more sidelink resources in response to a minimum RSRP value between the first RSRP value (or normalized RSRP value) and the second RSRP value being greater than the threshold regardless of whether the first UE is a potential receiver. In some aspects, the third UE may receive the reservation forwarding message from the first UE including an identifier (ID) of the second UE. The third UE may identify a stored RSRP value obtained from a previous transmission from the second UE and may abstain from transmitting on one or more sidelink resources in response to the stored RSRP value being greater than a threshold value.

In some aspects, the reservation forwarding message may include a bit map having a plurality of locations, each corresponding to a respective subchannel in a respective slot. The indication of the first reservation message may be included in at least one location of the plurality of locations of the bit map corresponding to the one or more sidelink resources. In some aspects, the indication of the first reservation message may include a respective single bit in each of the at least one location in the bit map. In some aspects, each location of the plurality of locations may include a respective multi-bit value representing a resource reservation occupation level of the respective subchannel in the respective slot. The third UE may convert a multi-bit value of the multi-bit values in the at least one location to a corresponding RSRP value and abstain from transmitting on the one or more sidelink resources based on the corresponding RSRP value. For example, the third UE may abstain from using the one or more sidelink resources when the corresponding multi-bit RSRP value is greater than a threshold value or based on the minimum of the multi-bit RSRP value and the RSRP value of the reservation forwarding message being above a threshold value.

In some aspects, the third UE may receive at least one additional reservation forwarding message including the first reservation message, or an indication of the resources reserved by the first reservation message, from at least one additional UE via one or more additional forwarding sidelink resources. In this example, the third UE may abstain from using the one or more sidelink resources based on a maximum reference signal received power (RSRP) value in the same or similar way that the third UE 606 of FIG. 6 abstained from using the one or more sidelink resources.

At block 1010, the first UE may receive the first data packet from the second UE via the one or more second sidelink resources. For example, the receiving circuitry 841 as shown and described in connection with FIG. 8, may provide a means for receiving the first data packet from the second UE via the one or more second sidelink resources. For example, the second UE may transmit the data packet to the first UE using the one or more sidelink resources, while the third UE abstains from transmitting on the one or more sidelink resources. In some aspects, the second UE may transmit the data packet to the first UE and the third UE using the one or more second sidelink resources.

Figure 11:
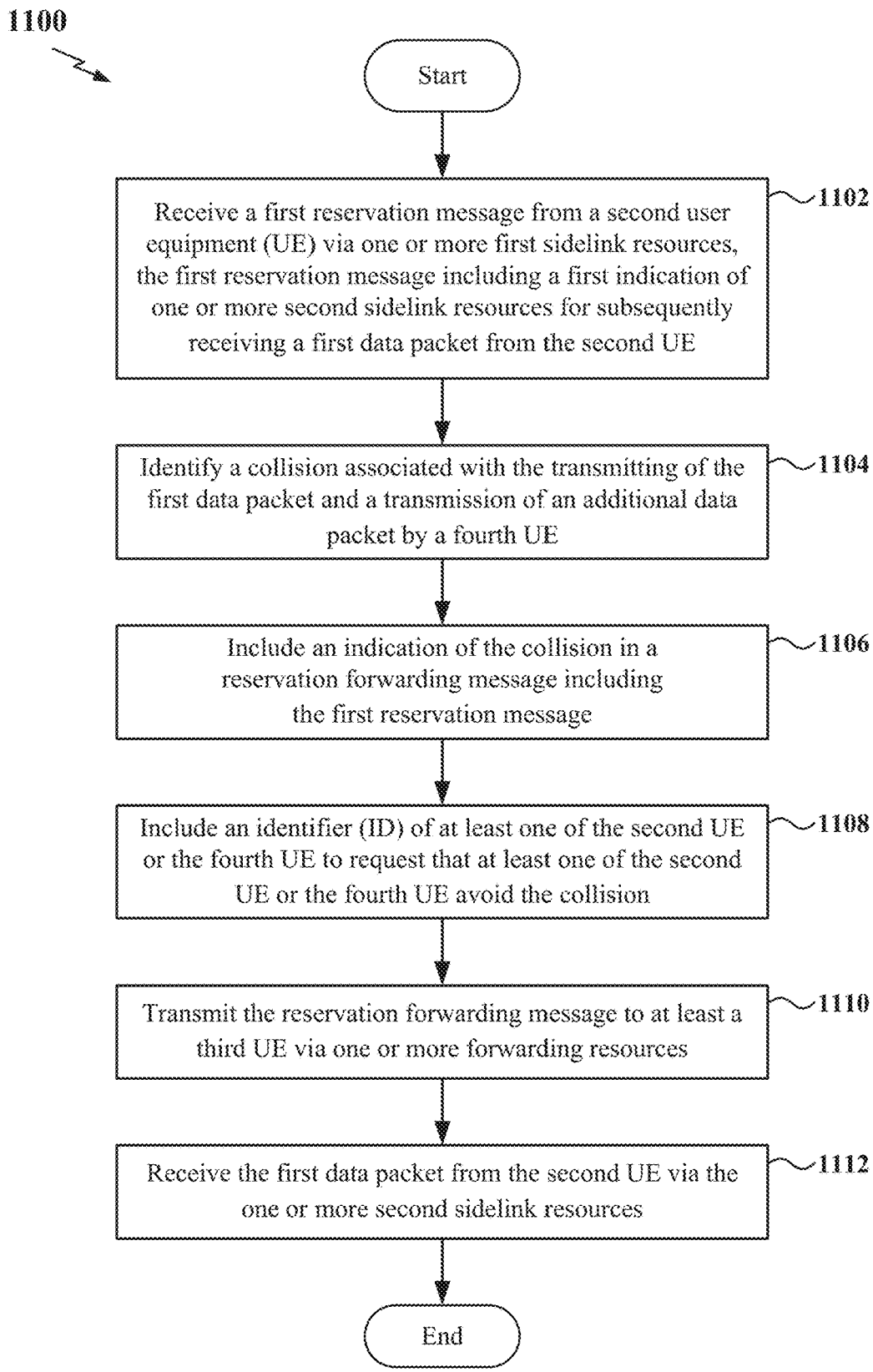
FIG. 11 is a flow chart of a method of forwarding a resource reservation according to some aspects.

FIG. 11 is a flow chart 1100 of a method for forwarding a resource reservation according to some aspects. As described below, some or all illustrated features may be omitted in a particular implementation within the scope of the present disclosure, and some illustrated features may not be required for implementation of all aspects. In some examples, the method may be performed by the first UE, as described above, and illustrated in FIG. 8, by a processor or processing system, or by any suitable means for carrying out the described functions.

At block 1102, the first UE may receive a first reservation message from a second UE via one or more first sidelink resources. The first reservation message may include an indication of one or more sidelink resources for subsequently receiving a data packet from the second UE. For example, the receiving circuitry 841 as shown and described in connection with FIG. 8 may provide a means for receiving a first reservation message from a first user equipment (UE) via one or more first sidelink resources, the first reservation message including an indication of one or more sidelink resources for subsequently receiving a data packet from the first UE. For example, the second UE may select one or more sidelink resources for transmitting the data packet. The selection of the one or more sidelink resources for transmitting the data packet may be based on, for example, availability of sidelink resources, a signal strength of the one or more sidelink resource, a signal quality of the one or more resources, a combination thereof, or the like. The first reservation message may be included, for example, in a control portion of a sidelink transmission. In some aspects, the first reservation message may be included in a second stage sidelink control information (SCI-2) and included in a control portion of the signal.

The first reservation message may include a retransmission resource message. A retransmission resource message may include an indication of one or more sidelink resources that are to be used for a retransmission of the data packet if a collision occurs when initially transmitting the data packet or other conditions (e.g., interference) occur that prevent the first UE from receiving and decoding the data packet. The one or more sidelink resources indicated in the retransmission resource message may include one or more different sidelink resources that are different from one or more sidelink resources used for initially transmitting the data packet.

The first UE may generate a reservation forwarding message including the first reservation message, or an indication of the resources reserved by the first reservation message. For example, the first UE may generate a reservation forwarding message including the first reservation message, or an indication of the resources indicated in the first reservation message, for transmission to the third UE to inform the third UE of the subsequent sidelink transmission. The third UE may then utilize the reservation forwarding message to determine whether to abstain from using the one or more sidelink resources indicated in the first reservation message for a sidelink transmission. In some aspects, the reservation forwarding message may be included a data portion and/or a control portion of a sidelink transmission. In some aspects, the reservation forwarding message may be included in a medium access control (MAC) control element (MAC-CE) and included in the data portion of the sidelink transmission. In some aspects, the reservation forwarding message may be included in a radio resource control (RRC) message and included in the data portion of the sidelink transmission. In some aspects, the reservation forwarding message may be included in a second stage sidelink control information (SCI-2) and included in a control portion of the sidelink transmission.

In some aspects, the first UE may include a single bit in the reservation forwarding message indicating to the third UE that the first UE intends to receive the data packet using the one or more sidelink resources. The single bit (Rx bit) may provide an indication to the third UE that the third UE is to abstain from transmitting (or more broadly, communicating) using the one or more sidelink resources so that the first UE may receive the data packet on the one or more sidelink resources from the second UE while minimizing interference and the potential for a collision from a transmission conducted by the third UE.

At block 1104, the first UE may identify a collision associated with the transmitting of the data packet and a transmission of an additional data packet by a fourth UE. For example, the identifying circuitry 843 may provide a means for identifying a collision associated with the transmitting of the data packet and a transmission of an additional data packet by a fourth UE. For example, the first UE may detect a collision when attempting to receive the first reservation message from the second UE on the one or more first sidelink resources. The first UE may detect a collision by comparing the RSRP value of the transmission of the first reservation message from the second UE on the one or more first sidelink resources with a reference signal received quality (RSRQ) value of the transmission of the first reservation message from the second UE on the one or more first sidelink resources. When the RSRP value is relatively high while the RSRQ value is relatively low, the first UE may determine that a collision occurred during the transmission of the first reservation message from the second UE to the first UE on the one or more first sidelink resources. In this example, if the second UE can still decode the first reservation message, the second UE may determine to forward the first reservation message in a reservation forwarding message even when the data packet is not intended for the second UE. For example, the second UE may determine to transmit the reservation forwarding message including the first reservation message in response to detecting the first collision to ensure other UEs can receive and decode the first reservation message.

Similarly, in some aspects, the first UE may identify a potential second collision associated with a second reservation message. For example, the first UE may receive a second reservation message on one or more second sidelink resources from a fourth UE indicating one or more second sidelink resources for transmitting a second data packet. In response to receiving the second reservation message from the fourth UE, the first UE may detect a potential second collision between subsequent transmissions of the data packet and the second data packet. For example, the first UE may determine that the one or more sidelink resources to be utilized for transmission of the data packet overlap in time and/or frequency with the one or more second sidelink resources to be utilized for transmission of the second data packet. In some examples, the first UE may detect whether the potential second collision may occur at the first UE by comparing the RSRP value of the second reservation message with the RSRP value of the first reservation message. In examples where the difference in RSRP values is high (e.g., above a threshold), the first UE may determine that even if a collision occurs, the first UE will still be able to decode the data packet from the second UE. Therefore, the first UE may not consider the potential second collision when forwarding the first reservation message.

At block 1106, the first UE may include an indication of the collision in a reservation forwarding message that includes the first reservation message, and, at block 1108, the first UE may include an identifier (ID) of at least one of the second UE or the fourth UE to request that at least one of the second UE or the fourth UE avoid the collision. For example, the including circuitry 844 as shown and described in connection with FIG. 8 may provide a means for including an indication of the collision in a reservation forwarding message that includes the first reservation message and including an identifier (ID) of at least one of the second UE or the fourth UE to request that at least one of the second UE or the fourth UE avoid the collision. For example, in response to identifying the potential second collision, the first UE may include an indication of the second collision in the reservation forwarding message for reception by at least the third UE. In some aspects, the indication of the second collision may be a single bit included in an SCI-2 or the PSSCH of the reservation forwarding message. In some aspects, the first UE may transmit the reservation forwarding message as a broadcast message reaching a plurality of UEs, including the second UE, the third UE, and the fourth UE. In this example, the reservation forwarding message may further include an identifier (ID) of at least one of the second JE or the fourth UE, requesting that at least one of the second UE or the fourth UE avoid the potential second collision (e.g., by changing the one or more sidelink resources for transmitting their respective data packets).

In addition to the first reservation message, as described herein, the first UE may receive the second reservation message from the fourth UE. As indicated above, the second reservation message may include an indication of the one or more second sidelink resources for a subsequent transmission of a second data packet from the fourth UE. In response to receiving the second reservation message, the first UE may include an indication of the second reservation message in the reservation forwarding message. In some examples, the first UE may include the indication of the second reservation message in the reservation forwarding message in response to detecting a collision, as described above. In other examples, the first UE may include the indication of the second reservation message in the reservation forwarding message for reception by at least the third UE. In some aspects, in response to receiving the first reservation message from the second UE and the second reservation message from the fourth UE, the first UE may include in the reservation forwarding message a first bit indicating that the first UE intends to receive the first data packet and that the first UE does not intend to receive the second data packet.

At block 1110, the first UE may transmit the reservation forwarding message to at least a third UE via one or more forwarding sidelink resources. For example, the transmit circuitry 842 as shown and described in connection with FIG. 8 may provide a means for transmitting the reservation forwarding message to at least a third UE via one or more forwarding sidelink resources. For example, the first UE may transmit the reservation forwarding message to the third UE and/or the fourth UE using one or more forwarding sidelink resources to inform the third UE and/or the fourth UE that the first UE is to receive a data packet on one or more sidelink resources from the second UE. In some aspects, the first UE may transmit the reservation forwarding message to the third UE and one or more other UEs (e.g., the fourth UE) in a MAC-CE through a broadcast transmission on a physical sidelink shared channel (PSSCH). In some aspects, the first UE may transmit the reservation forwarding message to only the third UE in an RRC message through a unicast transmission on a PSSCH. In some aspects, the first UE may transmit the reservation forwarding message to at least the third UE in SCI-2 on a physical sidelink control channel (PSCCH).

In some aspects, the first UE may transmit the reservation forwarding message to at least the third UE using a smaller transmission bandwidth (e.g., 1 MHz to 2 MHz) than the transmission bandwidth (e.g., 10 MHz) that may be used to transmit the data packet. In addition, the first UE may transmit the reservation forwarding message with robust coding. A relatively larger transmission compared to a relatively smaller transmission has a higher modulation order and higher coding and decoding rates, thereby decreasing transmission reliability. In combination with the robust coding, the smaller transmission bandwidth may increase the likelihood of at least the third UE receiving and decoding the reservation forwarding message while minimizing the potential for wasting relatively larger amounts of the bandwidth during the occurrence of a collision. For example, the one or more forwarding sidelink resources used to transmit the reservation forwarding message from the first UE to at least the third UE may include fewer resources than the one or more sidelink resources for transmitting the data packet from the second UE to at least the first UE.

In some aspects, the first UE may transmit the reservation forwarding message to at least the third UE based on whether the first UE receives a reservation forwarding message. For example, the second UE may have transmitted the first reservation message to a plurality of UEs, including the first UE. In response to receiving the first reservation message from the second UE, the first UE may monitor for another reservation forwarding message from another UE of the plurality of UEs, including the indication of the first reservation message. The first UE may initiate a timer in response to receiving the first reservation message from the second UE. If the first UE fails to receive the other reservation forwarding message from another UE of the plurality of UEs before the timer expires, the first UE may determine to transmit the reservation forwarding message to the third UE. Conversely, if the first UE receives the other reservation forwarding message from another UE of the plurality of UEs before the timer expires, the first UE may determine not to transmit the reservation forwarding message to the third UE.

At block 1112, the first UE may receive the data packet from the second UE via the one or more sidelink resources. For example, the receiving circuitry 841, as shown and described in connection with FIG. 8, may provide a means for receiving the data packet from the second UE via the one or more sidelink resources. For example, the second UE may transmit the data packet to the first UE using the one or more sidelink resources, while the third UE abstains from transmitting on the one or more sidelink resources. In some aspects, the second UE may transmit the data packet to the first UE and the third UE using the one or more sidelink resources.

Figure 12:
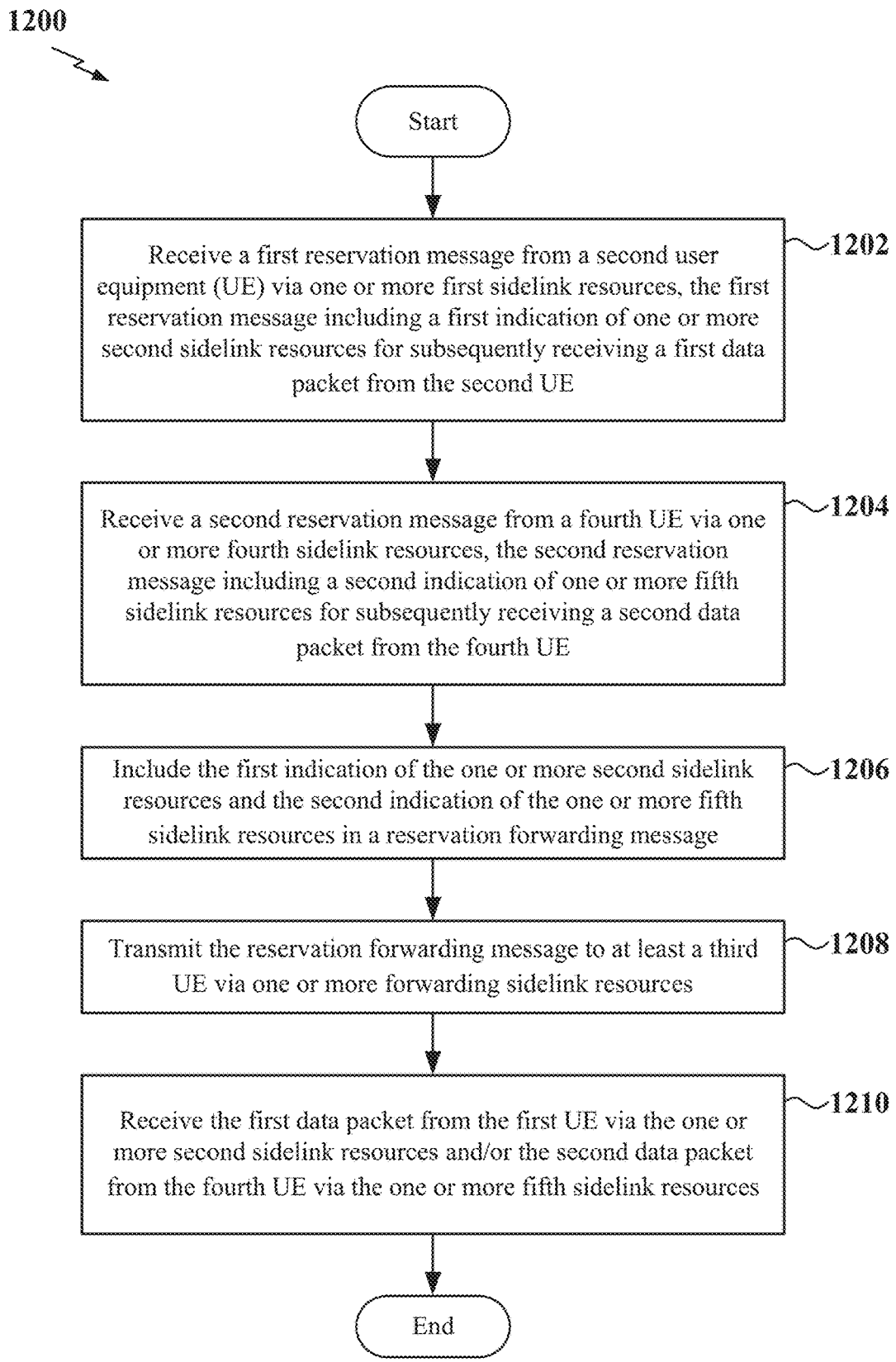
FIG. 12 is a flow chart of a method of forwarding a resource reservation according to some aspects.

FIG. 12 is a flow chart 1200 of a method for forwarding a resource reservation according to some aspects. As described below, some or all illustrated features may be omitted in a particular implementation within the scope of the present disclosure, and some illustrated features may not be required for implementation of all aspects. In some examples, the method may be performed by the first UE, as described above, and illustrated in FIG. 8, by a processor or processing system, or by any suitable means for carrying out the described functions.

At block 1202, the first UE may receive a first reservation message from a second UE via one or more first sidelink resources. The first reservation message may include a first indication of one or more second sidelink resources for subsequently receiving a first data packet from the second UE. For example, the receiving circuitry 841 as shown and described in connection with FIG. 8 may provide a means for receiving a first reservation message from a second user equipment (UE) via one or more first sidelink resources, the first reservation message including the first indication of one or more second sidelink resources for subsequently receiving a first data packet from the second UE. The first reservation message may be included, for example, in a control portion of a sidelink transmission. In some aspects, the first reservation message may be included in a second stage sidelink control information (SCI-2) and included in a control portion of the signal.

At block 1204, the first UE may receive a second reservation message from a fourth UE via one or more fourth sidelink resources. The second reservation message may include a second indication of one or more fifth sidelink resources for subsequently receiving a second data packet from the fourth UE. For example, the receiving circuitry 841 as shown and described in connection with FIG. 8 may provide a means for receiving a second reservation message from a fourth UE via one or more fourth sidelink resources, the second reservation message including an indication of one or more fifth sidelink resources for subsequently receiving a second data packet from the fourth UE.

At block 1206, the first UE may include the first indication of the one or more second sidelink resources and the second indication of the one or more fifth sidelink resources in a reservation forwarding message. For example, the including circuitry 844 as shown and described in connection with FIG. 8 may provide a means for including the indication of the one or more second sidelink resources and the one or more fifth sidelink resources in a reservation forwarding message.

As indicated above, in response to receiving the second reservation message, the first UE may include an indication of the second reservation message in the reservation forwarding message. In some examples, the first UE may include the indication of the second reservation message in the reservation forwarding message in response to detecting a collision, as described above. In other examples, the first UE may include the indication of the second reservation message in the reservation forwarding message for reception by at least the third UE. In some aspects, in response to receiving the first reservation message from the second UE and the second reservation message from the fourth UE, the first UE may include in the reservation forwarding message a first bit indicating that the first UE is an intended recipient of the first data packet and not an intended recipient of the second data packet.

At block 1208, the first UE may transmit the reservation forwarding message to at least a third UE via one or more forwarding sidelink resources (e.g., via one or more third sidelink resources). For example, the first UE may transmit the reservation forwarding message to at least the third UE using a relatively small transmission bandwidth (e.g., 1 MHz to 2 MHz) compared to the relatively larger transmission bandwidth (e.g., 10 MHz) utilized for transmission of the first data packet. In addition, the first UE may transmit the reservation forwarding message with robust coding. A relatively larger transmission bandwidth of the transmission of the data packet (compared to a relatively smaller transmission bandwidth of the reservation message) has a higher modulation order and higher coding and decoding rates, thereby decreasing transmission reliability. In combination with the robust coding, the smaller transmission bandwidth may increase the likelihood of at least the third UE receiving and decoding the reservation forwarding message while minimizing the potential for wasting relatively larger amounts of the bandwidth during the occurrence of a collision. For example, the one or more forwarding sidelink resources used to transmit the reservation forwarding message from the first UE to at least the third UE may include fewer resources than the one or more sidelink resources used to transmit the data packet from the second UE to at least the first UE.

As described herein, in response to the first UE receiving the first reservation message, the first UE may obtain an RSRP value of the first reservation message. For example, the first UE may measure a reference signal received power (RSRP) of the first reservation message. In some aspects, the first UE may include the RSRP of the first reservation message in the reservation forwarding message. In some aspects, in response to obtaining an RSRP value of the first reservation message, the first UE may compare the RSRP value with a threshold value. When the RSRP value is less than a threshold value, the first UE may transmit the reservation forwarding message, including the indication of the first reservation message to the third UE. Conversely, when the RSRP value is greater than a threshold value, the first UE may abstain from transmitting the reservation forwarding message, including the indication of the first reservation message to the third UE.

In some aspects, the first UE may transmit the reservation forwarding message to at least the third UE based on whether the first UE receives a reservation forwarding message. For example, the second UE may have transmitted the first reservation message to a plurality of UEs, including the first UE. In response to receiving the first reservation message from the second UE, the first UE may monitor for another reservation forwarding message from another UE of the plurality of UEs, including the indication of the first reservation message. The first UE may initiate a timer in response to receiving the first reservation message from the second UE. If the first UE fails to receive the other reservation forwarding message from another UE of the plurality of UEs before the timer expires, the first UE may determine to transmit the reservation forwarding message to the third UE. Conversely, if the first UE receives the other reservation forwarding message from another UE of the plurality of UEs before the timer expires, the first UE may determine not to transmit the reservation forwarding message to the third UE.

In some aspects, the first UE may insert the indication of the first reservation message into a bit map and transmit the bit map in the reservation forwarding message to at least the third UE. In some aspects, the bit map may include a plurality of locations, each corresponding to a respective subchannel in a respective slot. The first UE may insert the indication of the first reservation message into the bit map by inserting the indication of the first reservation message in at least one location of the plurality of locations of the bit map corresponding to the one or more sidelink resources. Subsequently, the first UE may transmit the bit map to at least the third UE via the one or more forwarding sidelink resources. In some aspects, a bit of "0" in a location of the plurality of locations of the bit map may indicate that no resource reservation is allocated to the respective subchannel of the respective slot and a bit of "1" in the location of the bit map may indicate that at least one resource reservation is allocated to the respective subchannel in the respective slot.

In some aspects, each location of the plurality of locations of the bit map may include a multi-bit value representing a resource reservation occupation level of the respective subchannel in the respective slot. The resource reservation occupation level may be determined based on a reference signal received power (RSRP) associated with zero or more resource reservations of the respective subchannel in the respective slot. In some aspects, the zero or more resource reservations may include a plurality of resource reservations. The resource reservation occupation level of the respective subchannel in the respective slot may be determined, for example, to be given by at least one of: a sum of each RSRP for each resource reservation of the plurality of resource reservations or a maximum RSRP among the plurality of resource reservations. In some aspects, the bit map may include a width corresponding to a number of subchannels and a length corresponding to a number of slots.

In some aspects, the reservation forwarding message may include a bit map having a plurality of locations, each corresponding to a respective subchannel in a respective slot. The indication of the first reservation message may be included in at least one location of the plurality of locations of the bit map corresponding to the one or more sidelink resources. In some aspects, the indication of the first reservation message may include a respective single bit in each of the at least one location in the bit map. In some aspects, each location of the plurality of locations may include a respective multi-bit value representing a resource reservation occupation level of the respective subchannel in the respective slot. The third UE may convert a multi-bit value of the multi-bit values in the at least one location to a corresponding RSRP value and abstain from transmitting on the one or more sidelink resources based on the corresponding RSRP value. For example, the third UE may abstain from using the one or more sidelink resources when the corresponding multi-bit RSRP value is greater than a threshold value or based on the minimum of the multi-bit RSRP value and the RSRP value of the reservation forwarding message being above a threshold value.

At block 1210, the first UE may receive the first data packet from the second UE via the one or more second sidelink resources and/or the second data packet from the fourth UE via the one or more fifth sidelink resources. For example, the receiving circuitry 841 as shown and described in connection with FIG. 8 may provide a means for receiving the first data packet from the first UE via the one or more second sidelink resources and/or the second data packet from the fourth UE via the one or more fifth sidelink resources.

Figure 13:
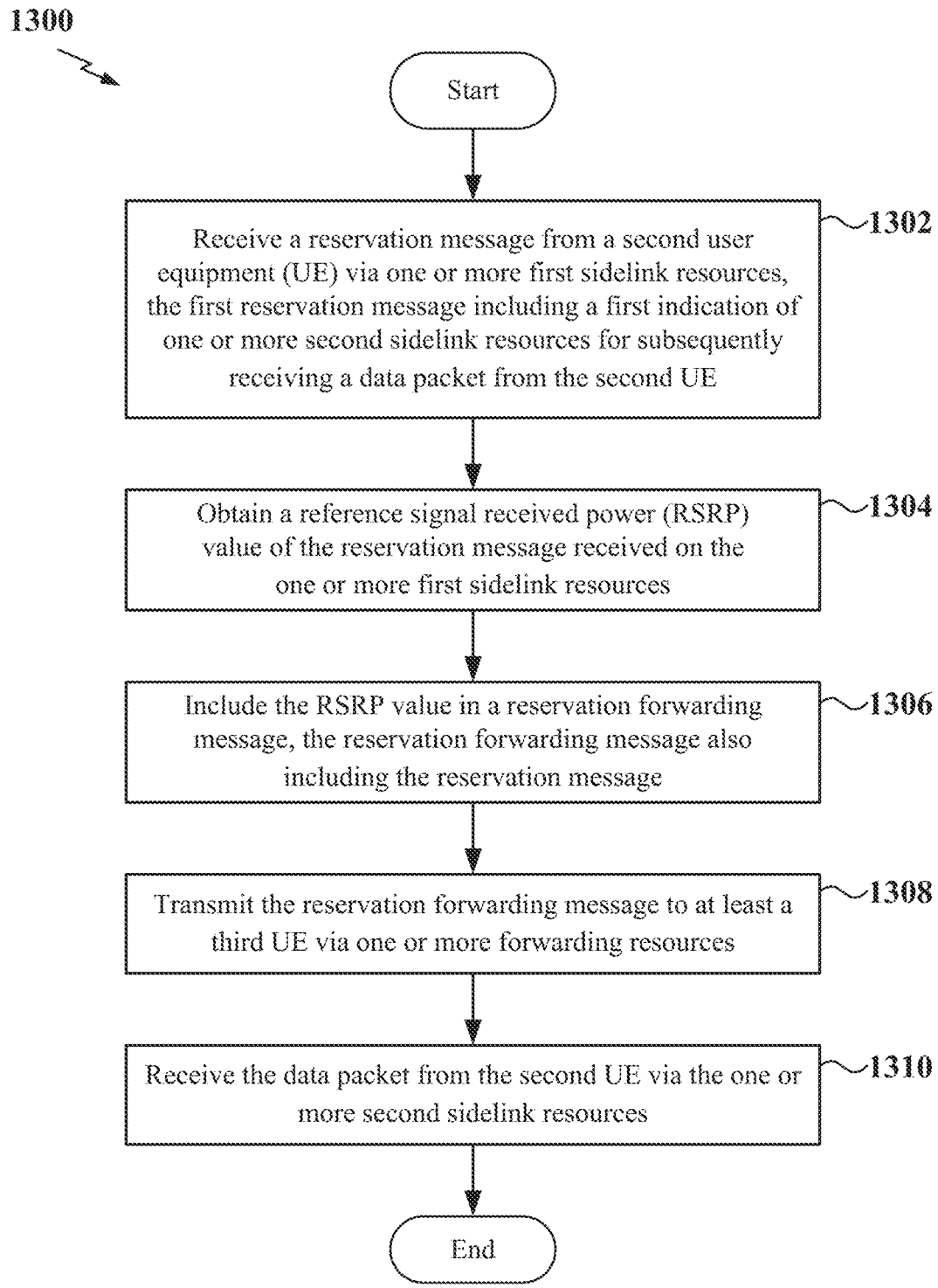
FIG. 13 is a flow chart of a method of forwarding a resource reservation according to some aspects.

FIG. 13 is a flow chart 1300 of a method for forwarding a resource reservation according to some aspects. As described below, some or all illustrated features may be omitted in a particular implementation within the scope of the present disclosure, and some illustrated features may not be required for implementation of all aspects. In some examples, the method may be performed by the first UE, as described above, and illustrated in FIG. 8, by a processor or processing system, or by any suitable means for carrying out the described functions.

At block 1302, the first UE may receive a reservation message from a second UE via one or more first sidelink resources. The reservation message may include an indication of one or more sidelink resources for subsequently receiving a data packet from the second UE. For example, the receiving circuitry 841 as shown and described in connection with FIG. 8 may provide a means for receiving a reservation message from a second user equipment (UE) via one or more first sidelink resources, the first reservation message including a first indication of one or more second sidelink resources for subsequently receiving a data packet from the second UE. For example, the second UE may select one or more second sidelink resources for transmitting the data packet. The first reservation message may be included, for example, in a control portion of a sidelink transmission. In some aspects, the first reservation message may be included in a second stage sidelink control information (SCI-2) and included in a control portion of the signal.

At block 1304, the first UE may obtain a reference signal received power (RSRP) value of the reservation message received on the one or more first sidelink resources. For example, the obtaining circuitry 845 as shown and described in connection with FIG. 8 may provide a means for obtaining a reference signal received power (RSRP) value of the reservation message received on the one or more first sidelink resources.

At block 1306, the first UE may include the RSRP value in a reservation forwarding message that also includes the reservation message. For example, the including circuitry 844 as shown and described in connection with FIG. 8 may provide a means for including the RSRP value in a reservation forwarding message, the reservation forwarding message also including the reservation message. In some aspects, in response to the first UE receiving the first reservation message, the first UE may measure a reference signal received power (RSRP) of the first reservation message. In some aspects, the first UE may include the RSRP of the first reservation message in a reservation forwarding message, described herein. In some aspects, the first UE may further include an identification (identifier) of the second UE in the reservation forwarding message, described herein. The identifier of the second UE may be obtained from SCI (e.g., SCI-2) or a MAC header if data is also received with the first reservation message.

At block 1308, the first UE may transmit (e.g., broadcast) the reservation forwarding message to at least a third UE via one or more forwarding sidelink resources. For example, the transmitting circuitry 842, as shown and described in connection with FIG. 8, may provide a means for transmitting the reservation forwarding message to at least a third UE via one or more forwarding resources. For example, the first UE may transmit the reservation forwarding message, including the indication of the first reservation message, to the third UE to inform the third UE of the subsequent sidelink transmission. In some aspects, the reservation forwarding message may be included a data portion and/or a control portion of a sidelink transmission. In some aspects, the reservation forwarding message may be included in a medium access control (MAC) control element (MAC-CE) and included in the data portion of the sidelink transmission. In some aspects, the reservation forwarding message may be included in a radio resource control (RRC) message and included in the data portion of the sidelink transmission. In some aspects, the reservation forwarding message may be included in a second stage sidelink control information (SCI-2) and included in a control portion of the sidelink transmission. In some aspects, the reservation forwarding message may have a portion transmitted using SCI-2 and another portion transmitted using a MAC-CE.

The first UE may transmit the reservation forwarding message to the third UE and/or the fourth UE using one or more forwarding sidelink resources. For example, the first UE may transmit the reservation forwarding message to the third UE and/or the fourth UE using one or more forwarding sidelink resources to inform the third UE and/or the fourth UE that the first UE is to receive a data packet on one or more sidelink resources from the second UE. In some aspects, the first UE may transmit the reservation forwarding message to the third UE and one or more other UEs (e.g., the fourth UE) in a MAC-CE through a broadcast transmission on a physical sidelink shared channel (PSSCH). In some aspects, the first UE may transmit the reservation forwarding message to only the third UE in an RRC message through a unicast transmission on a PSSCH. In some aspects, the first UE may transmit the reservation forwarding message to at least the third UE in SCI-2 on a physical sidelink control channel (PSCCH).

In some aspects, the first UE may transmit the reservation forwarding message to at least the third UE with a transmission bandwidth (e.g., 1 MHz to 2 MHz) that is less than the transmission bandwidth (e.g., 10 MHz) that may be used to transmit the data packet. In addition, the first UE may transmit the reservation forwarding message with robust coding. A relatively larger transmission compared to a relatively smaller transmission has a higher modulation order and higher coding and decoding rates, thereby decreasing transmission reliability. In combination with the robust coding, the smaller transmission bandwidth may increase the likelihood of at least the third UE receiving and decoding the reservation forwarding message while minimizing the potential for wasting relatively larger amounts of the bandwidth during the occurrence of a collision. For example, the one or more forwarding sidelink resources used to transmit the reservation forwarding message from the first UE to at least the third UE may include fewer resources than the one or more sidelink resources for transmitting the data packet from the second UE to at least the first UE.

In some aspects, the first UE may transmit the reservation forwarding message to at least the third UE based on whether the first UE receives a reservation forwarding message. For example, the second UE may have transmitted the first reservation message to a plurality of UEs, including the first UE. In response to receiving the first reservation message from the second UE, the first UE may monitor for another reservation forwarding message from another UE of the plurality of UEs, including the indication of the first reservation message. The first UE may initiate a timer in response to receiving the first reservation message from the second UE. If the first UE fails to receive the other reservation forwarding message from another UE of the plurality of UEs before the timer expires, the first UE may determine to transmit the reservation forwarding message to the third UE. Conversely, if the first UE receives the other reservation forwarding message from another UE of the plurality of UEs before the timer expires, the first UE may determine not to transmit the reservation forwarding message to the third UE.

At block 1310, the first UE may receive the first data packet from the second UE via the one or more second sidelink resources. For example, the receiving circuitry 841, as shown and described in connection with FIG. 8, may provide a means for receiving the data packet from the second UE via the one or more second sidelink resources.

Figure 14:
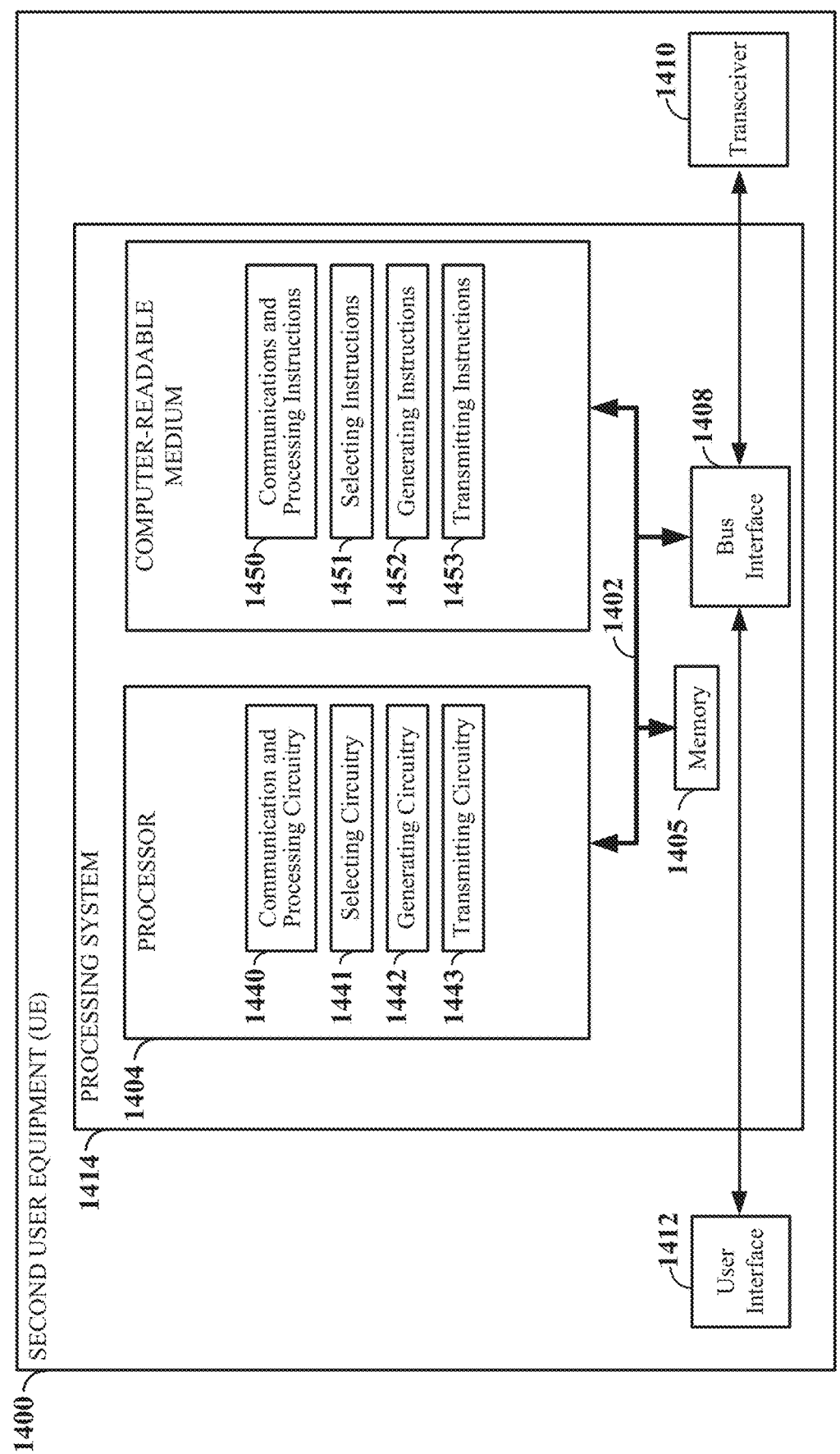
FIG. 14 is a flow chart of a method of forwarding a resource reservation according to some aspects.

FIG. 14 is a block diagram illustrating an example of a hardware implementation of a second user equipment (UE) (e.g., a second wireless communication device) 1400 employing a processing system 1414. For example, the second UE 1400 may be any of the UEs as shown and described in connection with any of FIGS. 1, 3, 6, and/or 7. In particular, the second UE 1400 may be exemplified by the second UE 604 as shown and described in connection with FIG. 6 and/or the second UE 704 as shown ad described in connection with FIG. 7.

In accordance with various aspects of the disclosure, an element, or any portion of an element, or any combination of elements may be implemented with a processing system 1414 that includes one or more processors 1404. The processing system 1414 may be substantially the same as the processing system 814 illustrated in FIG. 8, including a bus interface 1408, a bus 1402, a processor 1404, and a computer-readable medium 1406. Furthermore, the second UE 1400 may include a user interface 1412 and a transceiver 1410 substantially similar to those described herein in FIG. 8. That is, the processor 1404, as utilized in the second UE 1400, may be used to implement any one or more of the processes described herein.

In some aspects of the disclosure, the processor 1404 may include communication and processing circuitry 1440 configured for various functions, including, for example, communicating with a network core (e.g., a 5G core network), one or more scheduling entities, one or more other UEs via sidelink, and/or any other entity, such as, for example, local infrastructure or an entity communicating with the second UE 1400 via the Internet, such as a network provider. According to some aspects, the various functions of the communication and processing circuitry 1440 may implement resource reservation forwarding procedures as described herein.

In some examples, the communication and processing circuitry 1440 may include one or more hardware components that provide the physical structure that performs processes related to wireless communication (e.g., signal reception and/or signal transmission) and signal processing (e.g., processing a received signal and/or processing a signal for transmission), as well as performs processes related to beam-specific timing precompensation processes as described herein. In addition, the communication and processing circuitry 1440 may be configured to receive and process sidelink traffic and sidelink control. The communication and processing circuitry 1440 may further be configured to execute communication and processing software 1450 stored on the computer-readable medium 1406 to implement one or more functions described herein.

The processor 1404 may include circuitry configured for various functions in some aspects of the disclosure. For example, the processor 1404 may include selecting circuitry 1441 configured to select one or more sidelink resources for transmitting a data packet to at least a first UE. The selecting circuitry 1441 may be configured to execute selecting instructions 1451 stored in the computer-readable medium 1406 to implement any of the one or more of the functions described herein.

The processor 1404 may also include generating circuitry 1442 configured to generate a first reservation message, including the indication of the one or more second sidelink resources for transmitting the data packet. The generating circuitry 1442 may be configured to execute generating instructions 1452 stored in the computer-readable medium 1406 to implement any of the one or more of the functions described herein.

The processor 1404 may further include transmitting circuitry 1443 configured to transmit a first reservation message to the first UE (e.g., first UE 602 of FIG. 6, first UE 702 o FIG. 7) via one or more first sidelink resources. The first reservation message may include an indication of the one or more second sidelink resources for subsequently transmitting a first data packet to a first UE. The transmitting circuitry 1443 may also be configured to transmit the first data packet to the first UE. The transmitting circuitry 1443 may be configured to execute transmitting instructions 1453 stored in the computer-readable medium 1406 to implement any of the one or more of the functions described herein.

Figure 15:
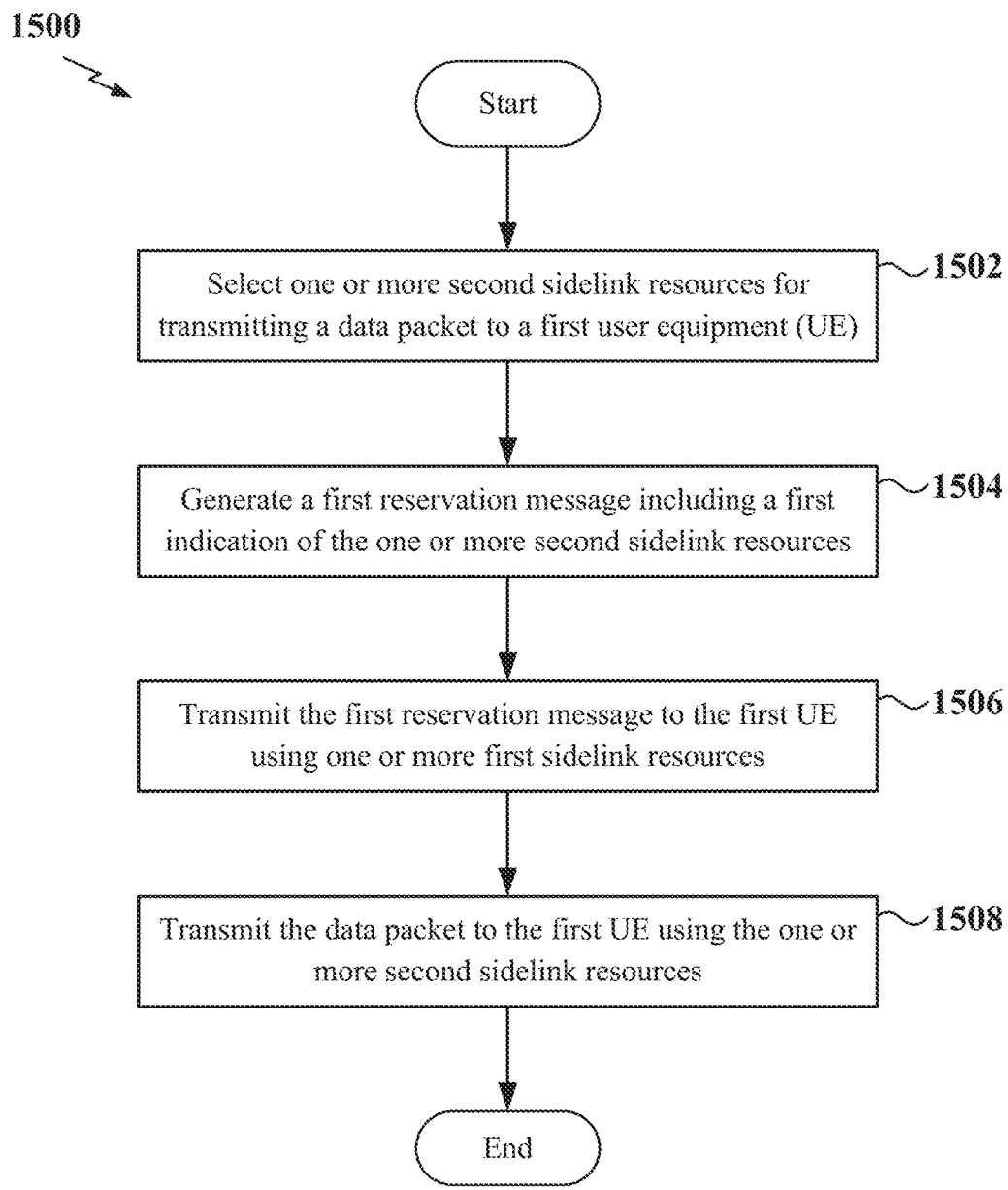
FIG. 15 is a flow chart of a method of forwarding a resource reservation according to some aspects.

FIG. 15 is a flow chart of a method of wireless communication 1500 that may be utilized to forward a resource reservation according to some aspects. In some examples, the method of wireless communication may be employed by a UE, such as the second UE 1400 as shown and described in connection with FIG. 14. The method may be performed in a wireless communication network in some examples. As described below, some or all illustrated features may be omitted in a particular implementation within the scope of the present disclosure, and some illustrated features may not be required for implementation of all aspects. In some examples, the method of wireless communication 1500 may be performed by the second UE 1400, as shown and described in connection with FIG. 14, by a processor or processing system, or by any suitable means for carrying out the described functions.

At block 1502, the second UE may select one or more second sidelink resources for transmitting a data packet to a first user equipment (UE) (e.g., first UE 602 of FIG. 6, first UE 702 of FIG. 7). The second UE may also select one or more first sidelink resources for transmitting a first reservation message to the first UE. For example, the selecting circuitry 1441 as shown and described in connection with FIG. 14 may provide a means for selecting one or more second sidelink resources for transmitting a data packet to a first user equipment (UE) and selecting one or more first sidelink resources for transmitting a first reservation message to the first UE.

At block 1504, the second UE may generate the first reservation message, including an indication of the one or more second sidelink resources. For example, the generating circuitry 1442 as shown and described in connection with FIG. 14 may provide a means for generating the first reservation message, including an indication of the one or more second sidelink resources.

At block 1506, the second UE may transmit the first reservation message to the second UE using the one or more first sidelink resources. For example, the transmitting circuitry 1443 as shown and described in connection with FIG. 14 may provide a means for transmitting the first reservation message to the second UE using the one or more first sidelink resources.

At block 1508, the first UE may transmit the data packet to the first UE using the one or more second sidelink resources. For example, the transmitting circuitry 1443, as shown and described in connection with FIG. 14, may provide a means for transmitting the data packet to the first UE using the one or more second sidelink resources.

Figure 16:
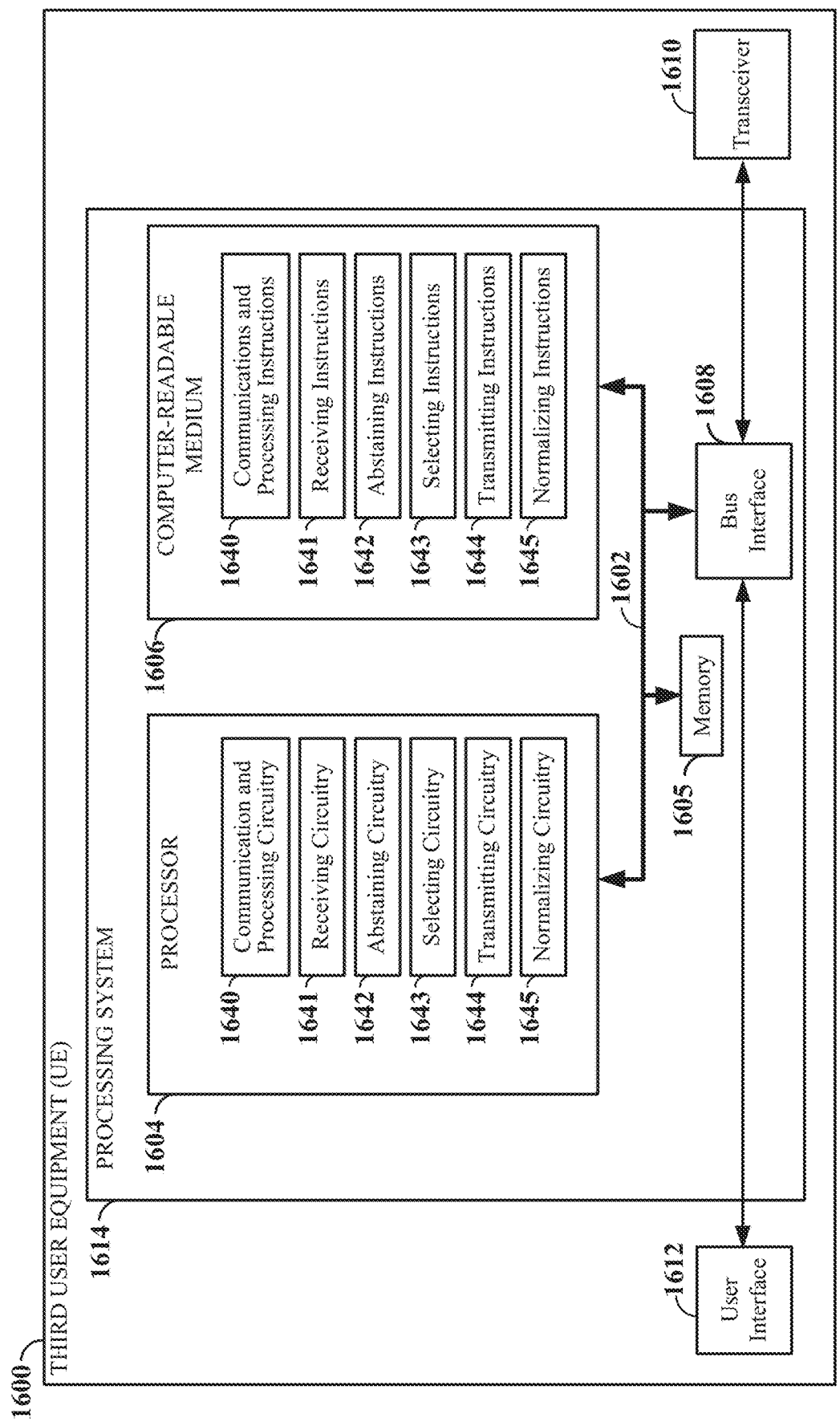
FIG. 16 is a block diagram illustrating an example of a hardware implementation of a third UE employing a processing system according to some aspects.

FIG. 16 is a block diagram illustrating an example of a hardware implementation of a third user equipment (UE) (e.g., a third wireless communication device) 1600 employing a processing system 1614. For example, the third UE 1600 may be any of the UEs as shown and described in connection with FIGS. 1, 3, 6, and/or 7. In particular, the third UE 1600 may be exemplified by the third UE 606 as shown and described in connection with FIG. 6 and/or the third UE 706 as shown ad described in connection with FIG. 7.

In accordance with various aspects of the disclosure, an element, or any portion of an element, or any combination of elements may be implemented with a processing system 1614 that includes one or more processors 1604. The processing system 1614 may be substantially the same as the processing system 814 illustrated in FIG. 8, including a bus interface 1608, a bus 1602, a processor 1604, and a computer-readable medium 1606. Furthermore, the third UE 1600 may include a user interface 1612 and a transceiver 1610 substantially similar to those described herein in FIG. 8. That is, the processor 1604, as utilized in the third UE 1600, may be used to implement any one or more of the processes described herein.

In some aspects of the disclosure, the processor 1604 may include communication and processing circuitry 1640 configured for various functions, including, for example, communicating with a network core (e.g., a 5G core network), one or more scheduling entities, one or more other UEs via sidelink, and/or any other entity, such as, for example, local infrastructure or an entity communicating with the third UE 1600 via the Internet, such as a network provider. According to some aspects, the various functions of the communication and processing circuitry 1640 may implement resource reservation forwarding procedures as described herein.

In some aspects of the disclosure, the processor 1604 may include circuitry configured for various functions. For example, the processor 1604 may include receiving circuitry 1641 configured to receive a reservation forwarding message, including an indication of a first reservation message, from a first UE (e.g., first UE 602 of FIG. 6, first UE 702 of FIG. 7) via one or more forwarding sidelink resources. The first reservation message may have originated at a second UE (e.g., second UE 604 of FIG. 6, second UE 704 of FIG. 7) and may include an indication of one or more sidelink second resources on which the second UE may transmit a data packet (to at least the first UE). The receiving circuitry 1641 may also be configured to receive the data packet from the second UE via the one or more second sidelink resources. The receiving circuitry 1641 may further be configured to receive at least one additional reservation forwarding message, including the indication of the first reservation message (of another reservation message) from at least one additional UE via one or more additional forwarding sidelink resources. The receiving circuitry 1641 may be configured to execute receiving instructions 1651 stored in the computer-readable medium 1606 to implement any of the one or more of the functions described herein.

The processor 1604 may also include abstaining circuitry 1642 configured to cause the third UE 1600 to abstain from using the one or more second sidelink resources for communication thereon. The abstaining circuitry 1642 may be configured to execute abstaining instructions 1652 stored in the computer-readable medium 1606 to implement any of the one or more of the functions described herein.

The processor 1604 may further include selecting circuitry 1643 configured to select one or more different sidelink resources for communication with the first UE and/or one or more other UEs. The selecting circuitry 1643 may also be configured to execute selecting instructions 1653 stored in the computer-readable medium 1606 to implement any of the one or more of the functions described herein.

In addition, the processor 1604 may include transmitting circuitry 1644 configured to transmit a second data packet to at least the first UE via the one or more different sidelink resources. The transmitting circuitry 1644 may be configured to execute transmitting instructions 1654 stored in the computer-readable medium 1606 to implement any of the one or more of the functions described herein.

The processor 1604 may also include normalizing circuitry 1645 configured to normalize an RSRP value based on a difference between a first number of subchannels utilized for the first reservation message and a second number of subchannels associated with the one or more sidelink resources to produce a normalized RSRP value. The normalizing circuitry 1645 may be configured to execute normalizing instructions 1655 stored in the computer-readable medium 1606 to implement any of the one or more of the functions described herein.

Figure 17:
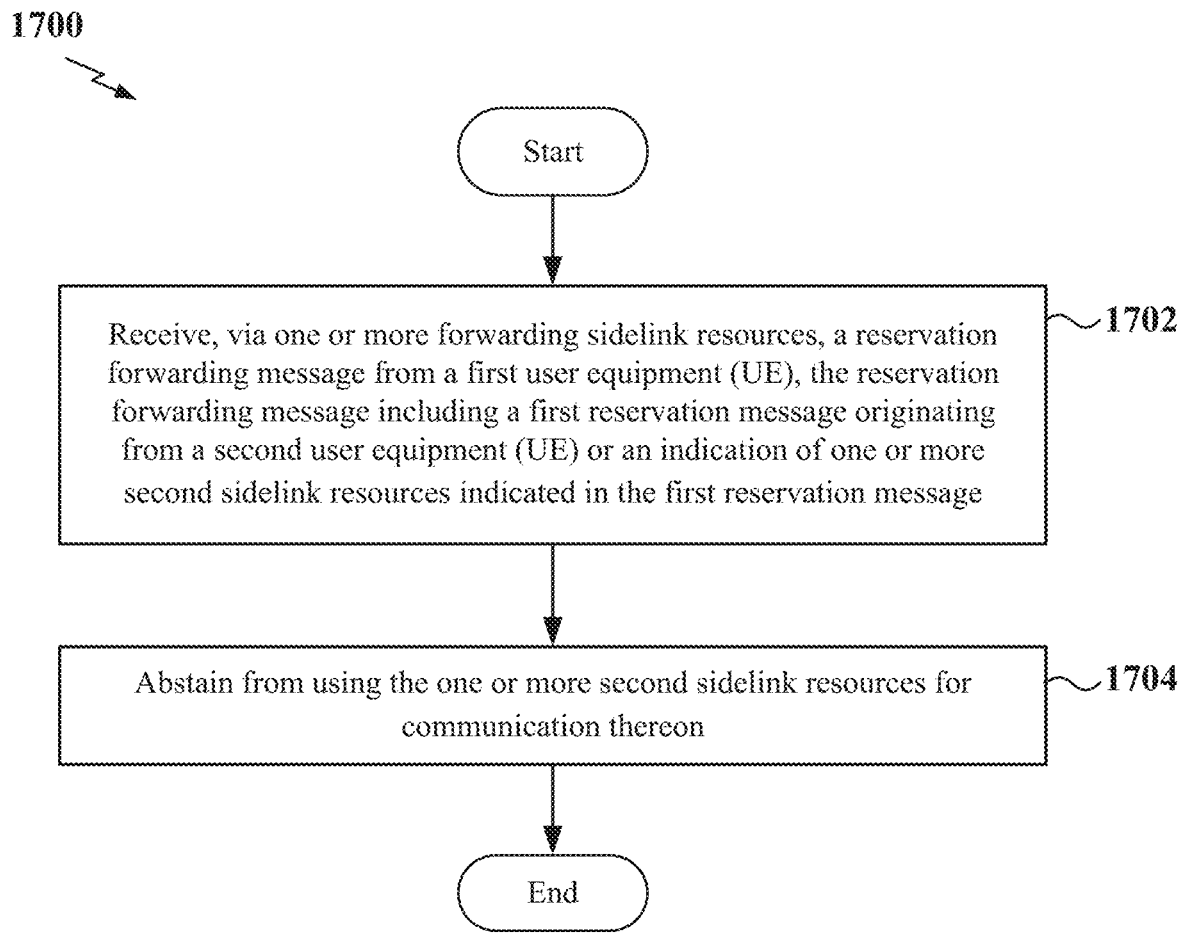
FIG. 17 is a flow chart of a method of forwarding a resource reservation according to some aspects.

FIG. 17 is a flow chart 1700 of a method of forwarding a resource reservation according to some aspects. As described below, some or all illustrated features may be omitted in a particular implementation within the scope of the present disclosure, and some illustrated features may not be required for implementation of all aspects. In some examples, the method may be performed by the third UE 1600, as described above, and illustrated in FIG. 16, by a processor or processing system, or by any suitable means for carrying out the described functions.

At block 1702, the third UE may receive, via one or more forwarding sidelink resources, a reservation forwarding message from a first user equipment (UE), the reservation forwarding message may include a first reservation message originating from a second user equipment (UE) or an indication of one or more second sidelink resources indicated in the first reservation message. The one or more second sidelink resources being different from the one or more forwarding sidelink resources. The second UE may reserve the one or more second sidelink resources for transmission of a packet. In one example, the packet may be intended to be received by the first UE (i.e., the first UE may be the intended recipient of the packet). The second UE may be, for example, the second UE 604 of FIG. 6, the second UE 704 of FIG. 7, or the second UE 1400 of FIG. 14. For example, the receiving circuitry 1641, as shown and described in connection with FIG. 16, may provide a means for receiving, via one or more forwarding sidelink resources, a reservation forwarding message from a first UE, the reservation forwarding message may include a first reservation message originating from a second UE or an indication of one or more second sidelink resources indicated in the first reservation message. The first reservation message may be included, for example, in a control portion of a sidelink transmission. In some aspects, the first reservation message may be included in a second stage sidelink control information (SCI-2) and included in a control portion of the signal.

In some aspects, the reservation forwarding message may be included in a sidelink medium access control (MAC) control element (MAC-CE) and included in the data portion of the sidelink transmission. In some aspects, the reservation forwarding message may be included in a sidelink radio resource control (RRC) message and included in the data portion of the sidelink transmission. In some aspects, the reservation forwarding message may be included in a second stage sidelink control information (SCI-2) and included in a control portion of the sidelink transmission. In some aspects, the first UE may transmit the reservation forwarding message to the third UE through a broadcast transmission on a physical sidelink shared channel (PSSCH). In some aspects, the first UE may transmit the reservation forwarding message to only the third UE in a sidelink RRC message through a unicast transmission on a PSSCH. In some aspects, the first UE may transmit the reservation forwarding message to at least the third UE in SCI-2 on a physical sidelink control channel (PSCCH).

At block 1704, the third UE may abstain from using (e.g., transmitting on) the one or more second sidelink resources for communication thereon. For example, the abstaining circuitry 1642 as shown and described in connection with FIG. 16 may provide a means for abstaining from using the one or more second sidelink resources for communication thereon. In some aspects, the third UE may abstain from using the one or more sidelink resources based on the reservation forwarding message including an indication of a collision between the transmission of the first reservation message and a transmission of a second reservation message. For example, with the third UE abstaining from using the one or more second sidelink resources, the second UE may transmit the data packet to the first UE with a reduced risk of a collision between transmissions from the third UE and the second UE.

In some aspects, the third UE may mark the one or more second sidelink resources as reserved with the corresponding priority of the data packet in response to receiving the reservation forwarding message. In response to receiving the reservation forwarding message from the first UE and abstaining from using the one or more second sidelink resources, the third UE may select one or more different sidelink resources (i.e., different from the one or more second sidelink resources) for transmitting data packets. For example, the third UE may select the one or more different sidelink resources for communication with the first UE and/or one or more other UEs.

In some aspects, the third UE may obtain a reference signal received power (RSRP) value of the reservation forwarding message. In examples in which the reservation forwarding message indicates that the first UE intends to receive the data packet scheduled by the first reservation message (e.g., Rx bit=true), the third UE may abstain from using the one or more second sidelink resources regardless of the RSRP value or abstain from using the one or more second sidelink resources in response to the RSRP value being greater than a predetermined RSRP threshold value. In one example, the third UE may avoid using the one or more second sidelink resources in response to a given RSRP value associated with any one of the reservation forwarding message or any one of at least one additional reservation forwarding message received at the third UE exceeding a RSRP value (e.g., exceeding the predetermined RSRP threshold value).

In some aspects, the third UE may receive the reservation forwarding message that includes an identifier (ID) of the second UE. In response to receiving the reservation forwarding message that includes the ID of the second UE, the third UE may identify a stored reference signal received power (RSRP) value obtained for the second UE from a previous transmission from the second UE and abstain from transmitting on the one or more second sidelink resources in response to the stored RSRP value being greater than a threshold value.

In some aspects, the third UE may receive the reservation forwarding message from the first UE, including a first RSRP value associated with the first reservation message from the second UE. The third UE may normalize the first RSRP value based on a difference between a first number of subchannels utilized for the first reservation message and a second number of subchannels associated with the one or more sidelink resources to produce a normalized RSRP value. In addition, the third UE may further obtain a second RSRP value associated with the reservation forwarding message. In examples in which the reservation forwarding message does not indicate that the first UE intends to receive (e.g., is the intended recipient of) the data packet scheduled by the first reservation message, the third UE may abstain from using the one or more second sidelink resources based on determining that the first UE is a potential receiver of the second UE and abstaining from using the one or more second sidelink resources regardless of the first RSRP value or the second RSRP value or in response to the second RSRP value being greater than the RSRP threshold value. In some aspects, the third UE may further abstain from using the one or more second sidelink resources in response to a maximum RSRP value among the first RSRP value (or normalized RSRP value) and the second RSRP value being greater than the RSRP threshold value regardless of whether the first UE is a potential recipient of the data packet.

In some aspects, the third UE may receive at least one additional reservation forwarding message, including the first reservation message, or the indication of the resources reserved by the first reservation message, from at least one additional UE via one or more additional forwarding sidelink resources. In this example, the third UE may abstain from using the one or more second sidelink resources based on a maximum reference signal received power (RSRP) value in the same or similar way that the third UE 606 of FIG. 6 abstained from using the one or more sidelink resources as described in connection with FIG. 6.

Figure 18:
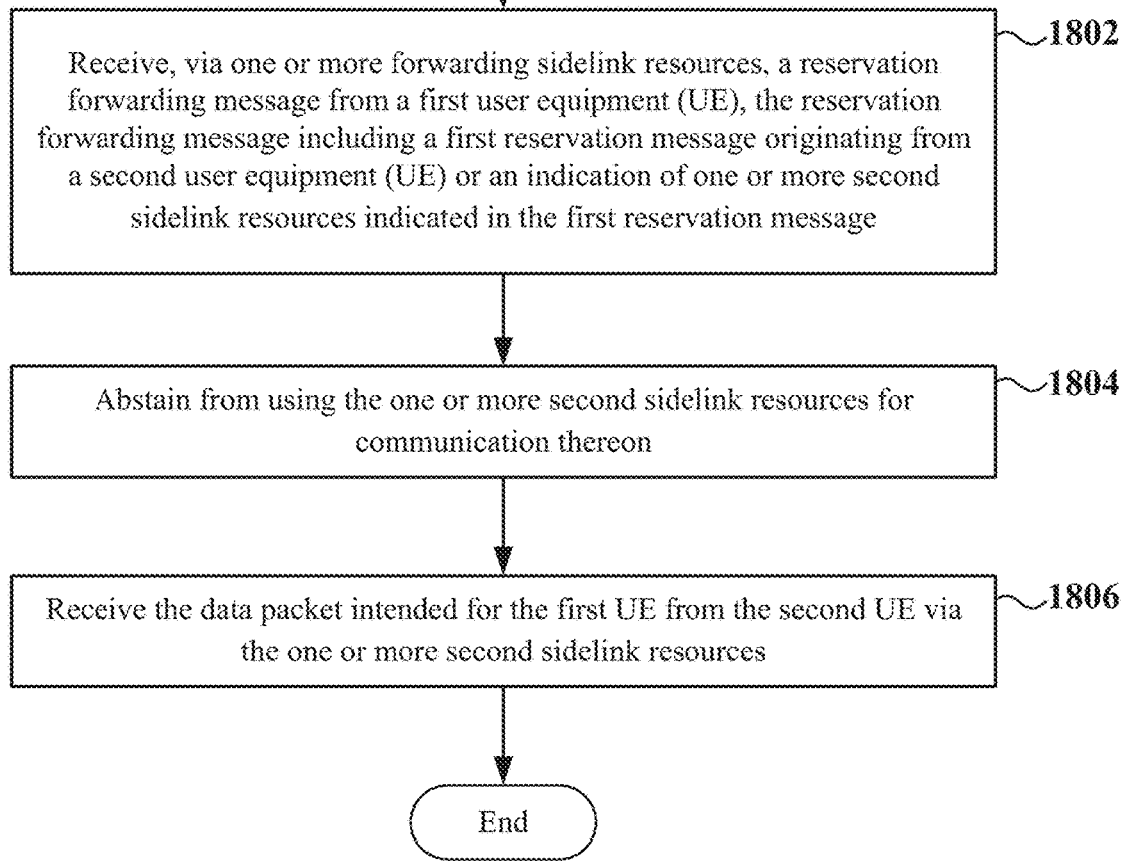
FIG. 18 is a flow chart of a method of forwarding a resource reservation according to some aspects.

FIG. 18 is a flow chart 1800 of a method of forwarding a resource reservation according to some aspects. As described below, some or all illustrated features may be omitted in a particular implementation within the scope of the present disclosure, and some illustrated features may not be required for implementation of all aspects. In some examples, the method may be performed by the third UE 1600, as described above, and illustrated in FIG. 16, by a processor or processing system, or by any suitable means for carrying out the described functions.

At block 1802, the third UE may receive, via one or more forwarding sidelink resources, a reservation forwarding message from a first user equipment (UE), the reservation forwarding message may include a first reservation message originating from a second user equipment (UE) or an indication of one or more second sidelink resources indicated in the first reservation message. The second UE may be, for example, the second UE 604 of FIG. 6, the second UE 704 of FIG. 7, or the second UE 1400 of FIG. 14. For example, the receiving circuitry 1641, as shown and described in connection with FIG. 16, may provide a means for receiving, via one or more forwarding sidelink resources, a reservation forwarding message from a first UE, the reservation forwarding message may include a first reservation message originating from a second UE or an indication of one or more second sidelink resources indicated in the first reservation message. The first reservation message may be included, for example, in a control portion of a sidelink transmission. In some aspects, the first reservation message may be included in a second stage sidelink control information (SCI-2) and included in a control portion of the signal. The description of block 1802 corresponds to and is the same or similar to that of block 1702 as shown and described in connection with FIG. 17. Block 1802 may include one or more of the same or similar features as described herein with respect to block 1702. To ensure conciseness of the application, the description will not be repeated.

At block 1804, the third UE may abstain from using the one or more second sidelink resources for communication thereon. For example, the abstaining circuitry 1642, as shown and described in connection with FIG. 16, may provide a means for abstaining from using the one or more second sidelink resources for communication thereon. The description of block 1804 corresponds to and is the same or similar to that of block 1704 as shown and described in connection with FIG. 17. Block 1804 may include one or more of the same or similar features as described herein with respect to block 1704. To ensure conciseness of the application, the description will not be repeated.

At block 1806, the third UE may receive the data packet intended for the first UE from the second UE via the one or more second sidelink resources. Because the data packet is intended for the first UE, the third UE may not decode the data packet. For example, the receiving circuitry 1641, as shown and described in connection with FIG. 16, may provide a means for receiving the data packet intended for the first UE from the second UE via the one or more second sidelink resources.

Figure 19:
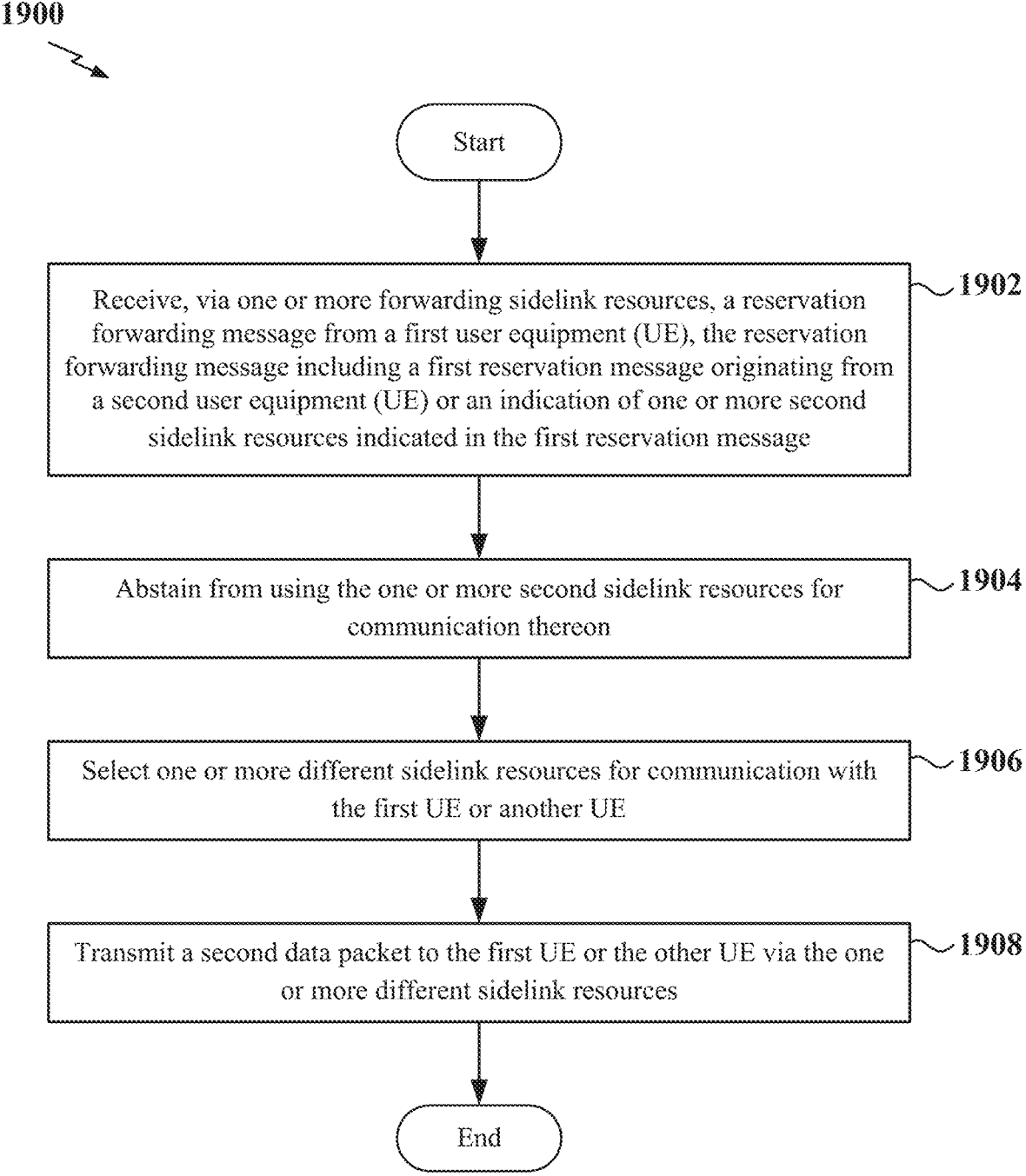
FIG. 19 is a flow chart of a method of forwarding a resource reservation according to some aspects.

FIG. 19 is a flow chart 1900 of a method of forwarding a resource reservation according to some aspects. As described below, some or all illustrated features may be omitted in a particular implementation within the scope of the present disclosure, and some illustrated features may not be required for implementation of all aspects. In some examples, the method may be performed by the third UE 1600, as described above, and illustrated in FIG. 16, by a processor or processing system, or by any suitable means for carrying out the described functions.

At block 1902, the third UE may receive, via one or more forwarding sidelink resources, a reservation forwarding message from a first user equipment (UE), the reservation forwarding message may include a first reservation message originating from a second user equipment (UE) or an indication of one or more second sidelink resources indicated in the first reservation message. The second UE may be, for example, the second UE 604 of FIG. 6, the second UE 704 of FIG. 7, or the second UE 1400 of FIG. 14. For example, the receiving circuitry 1641, as shown and described in connection with FIG. 16, may provide a means for receiving, via one or more forwarding sidelink resources, a reservation forwarding message from a first UE, the reservation forwarding message may include a first reservation message originating from a second UE or an indication of one or more second sidelink resources indicated in the first reservation message. The first reservation message may be included, for example, in a control portion of a sidelink transmission. In some aspects, the first reservation message may be included in a second stage sidelink control information (SCI-2) and included in a control portion of the signal. The description of block 1902 corresponds to and is the same or similar to that of block 1702 as shown and described in connection with FIG. 17. Block 1902 may include one or more of the same or similar features as described herein with respect to block 1702. To ensure conciseness of the application, the description will not be repeated.

At block 1904, the third UE may abstain from using the one or more second sidelink resources for communication thereon. For example, the abstaining circuitry 1642, as shown and described in connection with FIG. 16, may provide a means for abstaining from using the one or more second sidelink resources for communication thereon. The description of block 1904 corresponds to and is the same or similar to that of block 1704 as shown and described in connection with FIG. 17. Block 1904 may include one or more of the same or similar features as described herein with respect to block 1704. To ensure conciseness of the application, the description will not be repeated.

At block 1906, the third UE may select one or more different sidelink resources (i.e., different from the one or more second sidelink resources) for communication with the first UE and/or one or more other UEs. For example, the selecting circuitry 1643, as shown and described in connection with FIG. 16, may provide a means for selecting one or more different sidelink resources for communication with the first UE and/or one or more other UEs. For example, the third UE may mark the one or more second sidelink resources as reserved with the corresponding priority of the data packet in response to receiving the reservation forwarding message.

At block 1908, the third UE may transmit a second data packet to the first UE and/or the one or more other UEs via the one or more different sidelink resources. For example, the transmitting circuitry 1644, as shown and described in connection with FIG. 16, may provide a means for transmitting a second data packet to the first UE and/or the one or more other UEs via the one or more different sidelink resources.

Figure 20:
FIG. 20 is a flow chart of a method of forwarding a resource reservation according to some aspects.

FIG. 20 is a flow chart 2000 of a method of forwarding a resource reservation according to some aspects. As described below, some or all illustrated features may be omitted in a particular implementation within the scope of the present disclosure, and some illustrated features may not be required for implementation of all aspects. In some examples, the method may be performed by the third UE 1600, as described above, and illustrated in FIG. 16, by a processor or processing system, or by any suitable means for carrying out the described functions.

At block 2002, the third UE may receive, via one or more forwarding sidelink resources, a reservation forwarding message from a first user equipment (UE), the reservation forwarding message may include a first reservation message originating from a second user equipment (UE) or an indication of one or more second sidelink resources indicated in the first reservation message. The second UE may be, for example, the second UE 604 of FIG. 6, the second UE 704 of FIG. 7, or the second UE 1400 of FIG. 14. For example, the receiving circuitry 1641, as shown and described in connection with FIG. 16, may provide a means for receiving, via one or more forwarding sidelink resources, a reservation forwarding message from a first UE, the reservation forwarding message may include a first reservation message originating from a second UE or an indication of one or more second sidelink resources indicated in the first reservation message. The first reservation message may be included, for example, in a control portion of a sidelink transmission. In some aspects, the first reservation message may be included in a second stage sidelink control information (SCI-2) and included in a control portion of the signal. The description of block 2002 corresponds to and is the same or similar to that of block 1702 as shown and described in connection with FIG. 17. Block 2002 may include one or more of the same or similar features as described herein with respect to block 1702. To ensure conciseness of the application, the description will not be repeated.

At block 2004, the third UE may receive an additional reservation forwarding message, including the first reservation message or an indication of the one or more second sidelink resources indicated in the first reservation message, from at least one additional UE, different from the first UE and the second UE, via one or more additional forwarding sidelink resources. For example, the receiving circuitry 1641, as shown and described in connection with FIG. 16, may provide a means for receiving an additional reservation forwarding message, including the first reservation message, or an indication of the one or more second sidelink resources indicated in the first reservation message, from at least one additional UE, different from the first UE and the second UE, via one or more additional forwarding sidelink resources.

At block 2006, the third UE may abstain from using the one or more second sidelink resources for communication thereon. For example, the abstaining circuitry 1642, as shown and described in connection with FIG. 16, may provide a means for abstaining from using the one or more second sidelink resources for communication thereon. The description of block 2006 corresponds to and is the same or similar to that of block 1704 as shown and described in connection with FIG. 17. Block 2006 may include one or more of the same or similar features as described herein with respect to block 1704. To ensure conciseness of the application, the description will not be repeated.

At block 2008, the third UE may select one or more different sidelink resources, different from the one or more second sidelink resources, for communication with the first UE and/or one or more other UEs. For example, the selecting circuitry 1643, as shown and described in connection with FIG. 16, may provide a means for selecting one or more different sidelink resources for communication with the first UE and/or one or more other UEs. The description of block 2008 corresponds to and is the same or similar to that of block 1906 as shown and described in connection with FIG. 19. Block 2008 may include one or more of the same or similar features as described herein with respect to block 1906. To ensure conciseness of the application, the description will not be repeated.

At block 2010, the third UE may transmit a second data packet to the first UE and/or the one or more other UEs via the one or more different sidelink resources. For example, the transmitting circuitry 1644, as shown and described in connection with FIG. 16, may provide a means for transmitting a second data packet to the first UE and/or one or more other UEs via the one or more different sidelink resources. The description of block 2010 corresponds to and is the same or similar to that of block 1908 as shown and described in connection with FIG. 19. Block 2010 may include one or more of the same or similar features as described herein with respect to block 1908. To ensure conciseness of the application, the description will not be repeated.

Of course, in the above examples, the circuitry included in the processors 804, 1404, and/or 1604 is merely provided as an example, and other means for carrying out the described functions may be included within various aspects of the present disclosure, including but not limited to the instructions stored in the computer-readable medium 806, 1406, and/or 1606, or any other suitable apparatus or means described in any one of the FIGS. 1, 3, 6, 7, 8, 14, and/or 16, and utilizing, for example, the processes and/or algorithms described herein in relation to FIGS. 6, 7, 9-13, 15, and/or 17-20.

The following provides an overview of aspects of the present disclosure:

Aspect 1: A first user equipment (UE), comprising: a transceiver for wireless communication, a memory, and a processor coupled to the transceiver and the memory, the processor and the memory being configured to: receive a first reservation message from a second UE via one or more first sidelink resources, the first reservation message comprising a first indication of one or more second sidelink resources for subsequently receiving a first data packet from the second UE, transmit a first reservation forwarding message comprising at least the first indication of the one or more second sidelink resources to at least a third UE via one or more third sidelink resources, and receive a transmission of the first data packet from the second UE via the one or more second sidelink resources.

Aspect 2: The first UE of aspect 1, wherein the processor and the memory are further configured to: transmit the first reservation forwarding message in response to the first UE being an intended recipient of the first data packet.

Aspect 3: The first UE of aspect 1 or 2, wherein the first reservation message comprises at least one reservation of one or more other sidelink resources for at least one retransmission of the first data packet, and the processor and the memory are further configured to: receive the at least one retransmission of the first data packet via the one or more other sidelink resources.

Aspect 4: The first UE of any of aspects 1 through 3, wherein the processor and the memory are further configured to: receive a second reservation message from a fourth UE, wherein the second reservation message comprises a second indication of one or more fifth sidelink resources reserved by the fourth UE for receiving a second data packet from the fourth UE, and include the second reservation message or the second indication of the one or more fifth sidelink resources reserved in the second reservation message in the first reservation forwarding message.

Aspect 5: The first UE of any of aspects 1 through 4, wherein the processor and the memory are further configured to: obtain a reference signal received power (RSRP) value of the first reservation message received on the one or more first sidelink resources, and include the RSRP value in the first reservation forwarding message.

Aspect 6: The first UE of any of aspects 1 through 5, wherein the processor and the memory are further configured to: monitor, for a predetermined period of time following the receiving of the first reservation message, for at least one of: a second reservation message or a second reservation forwarding message comprising a second indication of a reservation by another UE, different from the second UE, and transmit the first reservation forwarding message in response to expiry of the predetermined period of time in an absence of receiving the at least one of: the second reservation message or the second reservation forwarding message.

Aspect 7: The first UE of any of aspects 1 through 6, wherein to transmit the first reservation forwarding message to the at least the third UE via the one or more third sidelink resources, the processor and the memory are further configured to: represent the first indication of the one or more second sidelink resources in a bit map, and transmit the bit map to the at least the third UE via the one or more third sidelink resources.

Aspect 8: The first UE of any of aspects 1 through 7, wherein the bit map comprises a plurality of locations, each corresponding to a respective subchannel in a respective slot, and wherein the processor and the memory are further configured to: represent the first indication of the one or more second sidelink resources in at least one location of the plurality of locations corresponding to the one or more second sidelink resources.

Aspect 9: The first UE of any of aspects 1 through 8, wherein each location of the plurality of locations comprises a multi-bit value representing a resource reservation occupation level of the respective subchannel in the respective slot.

Aspect 10. The first UE of any of aspects 1 through 9, wherein the first reservation forwarding message comprises at least one bit indicating that the first UE is an intended recipient of the transmission of the first data packet.

Aspect 11. The first UE of any of aspects 1 through 10, wherein the processor and the memory are further configured to: obtain a reference signal received power (RSRP) value of the first reservation message received on the one or more first sidelink resources, and include the RSRP value in the first reservation forwarding message.

Aspect 12. The first UE of any of aspects 1 through 11, wherein the processor and the memory are further configured to at least one of: determine if the first UE is an intended recipient of the first data packet, or compare a reference signal received power (RSRP) value of the first reservation message received on the one or more first sidelink resources to a threshold value, and transmit the first reservation forwarding message in response to at least one of: determining that the first UE is the intended recipient of the first data packet, or determining that the RSRP value is less than the threshold value.

Aspect 13: The first UE of any of aspects 1 through 12, wherein to transmit the first reservation forwarding message to at least the third UE via the one or more third sidelink resources, the processor and the memory are further configured to: transmit the first reservation forwarding message via a second stage sidelink control information (SCI-2), sidelink medium access control-control element (MAC-CE), or sidelink radio resource control (RRC) message, to at least the third UE via the one or more third sidelink resources.

Aspect 14: A method of wireless communication at a first user equipment (UE), comprising: receiving a first reservation message from a second UE via one or more first sidelink resources, the first reservation message comprising a first indication of one or more second sidelink resources for subsequently receiving a first data packet from the second UE, transmitting a first reservation forwarding message comprising at least the first indication of the one or more second sidelink resources to at least a third UE via one or more third sidelink resources, and receiving a transmission of the first data packet from the second UE via the one or more second sidelink resources.

Aspect 15: The method of aspect 14, wherein the transmitting the first reservation forwarding message further comprises: transmitting the first reservation forwarding message in response to the first UE being an intended recipient of the first data packet.

Aspect 16: The method of aspect 14 or 15, wherein the first reservation forwarding message comprises a single bit having a value indicating that the first UE is an intended recipient of the first data packet.

Aspect 17: The method of any of aspects 14 through 16, wherein the one or more second sidelink resources are selected by the second UE, and the method further comprises: transmitting the first reservation message via sidelink control information (SCD).

Aspect 18: The method of any of aspects 14 through 17, wherein the one or more first sidelink resources and the one or more third sidelink resources are fewer than the one or more second sidelink resources.

Aspect 19: The method of any of aspects 14 through 18, wherein the first reservation message comprises at least one reservation of one or more other sidelink resources for at least one retransmission of the first data packet, wherein the receiving the first data packet further comprises: receiving the at least one retransmission of the first data packet via the one or more other sidelink resources.

Aspect 20: The method of any of aspects 14 through 19, further comprising: receiving a second reservation message from a fourth UE, wherein the second reservation message comprises a second indication of one or more fifth sidelink resources reserved by the fourth UE for receiving a second data packet from the fourth UE, and including the second reservation message or the second indication of the one or more fifth sidelink resources reserved in the second reservation message in the first reservation forwarding message.

Aspect 21: The method of any of aspects 14 through 20, wherein the first reservation forwarding message comprises at least one bit indicating that the first UE is an intended recipient of the transmission of the first data packet.

Aspect 22: The method of any of aspects 14 through 21, further comprising: obtaining a reference signal received power (RSRP) value of the first reservation message received on the one or more first sidelink resources, and including the RSRP value in the first reservation forwarding message.

Aspect 23: The method of any of aspects 14 through 22, wherein the transmitting the first reservation forwarding message further comprises: at least one of: determining if the first UE is an intended recipient of the first data packet, or comparing a reference signal received power (RSRP) value of the first reservation message received on the one or more first sidelink resources to a threshold value, and transmitting the first reservation forwarding message in response to at least one of: determining that the first UE is the intended recipient of the first data packet, or determining that the RSRP value is less than the threshold value.

Aspect 24: The method of any of aspects 14 through 23, wherein the transmitting the first reservation forwarding message further comprises: monitoring, for a predetermined period of time following the receiving of the first reservation message, for at least one of: a second reservation message or a second reservation forwarding message comprising a second indication of a reservation by another UE, different from the second UE, and transmitting the first reservation forwarding message in response to expiry of the predetermined period of time in an absence of receiving the at least one of: the second reservation message or the second reservation forwarding message.

Aspect 25: The method of any of aspects 14 through 24, wherein the transmitting the first reservation forwarding message to the at least the third UE via the one or more third sidelink resources further comprises: representing the first indication of the one or more second sidelink resources in a bit map, and transmitting the bit map to the at least the third UE via the one or more third sidelink resources.

Aspect 26: The method of any of aspects 14 through 25, wherein the bit map comprises a plurality of locations, each corresponding to a respective subchannel in a respective slot, and wherein the representing the first indication of the one or more second sidelink resources in the bit map further comprises: representing the first indication of the one or more second sidelink resources in at least one location of the plurality of locations corresponding to the one or more second sidelink resources.

Aspect 27: The method of any of aspects 14 through 26, wherein each location of the plurality of locations comprises a multi-bit value representing a resource reservation occupation level of the respective subchannel in the respective slot.

Aspect 28: The method of any of aspects 14 through 27, wherein the resource reservation occupation level of the respective subchannel in the respective slot is determined based on a reference signal received power (RSRP) obtained from the respective subchannel in the respective slot.

Aspect 29: The method of any of aspects 14 through 28, wherein the bit map comprises a width corresponding to a quantity of subchannels and a length corresponding to a quantity of slots.

Aspect 30: The method of any of aspects 14 through 29, wherein the transmitting the first reservation forwarding message to at least the third UE via the one or more third sidelink resources further comprises: transmitting the first reservation forwarding message via a second stage sidelink control information (SCI-2), sidelink medium access control-control element (MAC-CE), or sidelink radio resource control (RRC) message, to at least the third UE via the one or more third sidelink resources.

Aspect 31: An apparatus configured for wireless communication comprising at least one means for performing a method of any one of aspects 14 through 30.

Aspect 32: A non-transitory computer-readable medium storing computer-executable code, comprising code for causing an apparatus to perform a method of any one of aspects 14 through 30.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 3, 6, 7, 8, 14, and/or 16 may be configured to perform one or more of the methods, features, or steps described herein and illustrated in FIGS. 6, 7, 9-13, 15, and/or 17-20. The novel algorithms described herein may also be efficiently implemented in software and/or embedded in hardware.

It is to be understood that the specific order or hierarchy of steps in the methods disclosed is an illustration of exemplary processes. Based on design preferences, it is understood that the specific order or hierarchy of steps in the methods may be rearranged. The accompanying method claims present stages of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to a stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. The construct A and/or B is intended to cover A, B, and A and B. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A first user equipment (UE), comprising:
a memory; and
one or more processors coupled to the memory, the one or more processors being configured to:
receive a first reservation message from a second UE via one or more first sidelink resources, the first reservation message comprising a first indication of one or more second sidelink resources for subsequently receiving a first data packet from the second UE;
transmit a first reservation forwarding message comprising at least the first indication of the one or more second sidelink resources to at least a third UE via one or more third sidelink resources;
receive a transmission of the first data packet from the second UE via the one or more second sidelink resources;
determine if the first UE is an intended recipient of the first data packet;
compare a reference signal received power (RSRP) value of the first reservation message received on the one or more first sidelink resources to a threshold value; and
transmit the first reservation forwarding message in response to determining that the first UE is the intended recipient of the first data packet and determining that the RSRP value is less than the threshold value.

2. The first UE of claim 1, wherein the first reservation message comprises at least one reservation of one or more other sidelink resources for at least one retransmission of the first data packet, and the one or more processors are further configured to:
receive the at least one retransmission of the first data packet via the one or more other sidelink resources.

3. The first UE of claim 1, wherein the one or more processors are further configured to:
receive a second reservation message from a fourth UE, wherein the second reservation message comprises a second indication of one or more fifth sidelink resources reserved by the fourth UE for receiving a second data packet from the fourth UE; and
include the second reservation message or the second indication of the one or more fifth sidelink resources reserved in the second reservation message in the first reservation forwarding message.

4. The first UE of claim 1, wherein the one or more processors are further configured to:
include the RSRP value in the first reservation forwarding message.

5. The first UE of claim 1, wherein the one or more processors are further configured to:
monitor, for a predetermined period of time following the receiving of the first reservation message, for at least one of: a second reservation message or a second reservation forwarding message comprising a second indication of a reservation by another UE, different from the second UE; and
transmit the first reservation forwarding message in response to expiry of the predetermined period of time in an absence of receiving the at least one of: the second reservation message or the second reservation forwarding message.

6. The first UE of claim 1, wherein to transmit the first reservation forwarding message to the at least the third UE via the one or more third sidelink resources, the one or more processors are further configured to:
represent the first indication of the one or more second sidelink resources in a bit map; and
transmit the bit map to the at least the third UE via the one or more third sidelink resources.

7. The first UE of claim 6, wherein the bit map comprises a plurality of locations, each corresponding to a respective subchannel in a respective slot, and wherein the one or more processors are further configured to:
represent the first indication of the one or more second sidelink resources in at least one location of the plurality of locations corresponding to the one or more second sidelink resources.

8. The first UE of claim 7, wherein each location of the plurality of locations comprises a multi-bit value representing a resource reservation occupation level of the respective subchannel in the respective slot.

9. The first UE of claim 1, wherein the first reservation forwarding message comprises at least one bit indicating that the first UE is the intended recipient of the transmission of the first data packet.

10. The first UE of claim 1, wherein to transmit the first reservation forwarding message to at least the third UE via the one or more third sidelink resources, the one or more processors are further configured to:
transmit the first reservation forwarding message via a second stage sidelink control information (SCI-2), sidelink medium access control-control element (MAC-CE), or sidelink radio resource control (RRC) message, to at least the third UE via the one or more third sidelink resources.

11. The first UE of claim 1, wherein the first reservation forwarding message comprises a single bit having a value indicating that the first UE is the intended recipient of the first data packet.

12. The first UE of claim 1, wherein the one or more second sidelink resources are selected by the second UE, and the one or more processors are further configured to:
transmit the first reservation message via sidelink control information (SCI).

13. The first UE of claim 1, wherein the one or more first sidelink resources and the one or more third sidelink resources are fewer than the one or more second sidelink resources.

14. The first UE of claim 8, wherein the resource reservation occupation level of the respective subchannel in the respective slot is determined based on a reference signal received power (RSRP) obtained from the respective subchannel in the respective slot.

15. The first UE of claim 6 wherein the bit map comprises a width corresponding to a quantity of subchannels and a length corresponding to a quantity of slots.

16. A method of wireless communication at a first user equipment (UE), comprising:
receiving a first reservation message from a second UE via one or more first sidelink resources, the first reservation message comprising a first indication of one or more second sidelink resources for subsequently receiving a first data packet from the second UE;
transmitting a first reservation forwarding message comprising at least the first indication of the one or more second sidelink resources to at least a third UE via one or more third sidelink resources;
receiving a transmission of the first data packet from the second UE via the one or more second sidelink resources;
determining if the first UE is an intended recipient of the first data packet;
comparing a reference signal received power (RSRP) value of the first reservation message received on the one or more first sidelink resources to a threshold value; and
transmitting the first reservation forwarding message in response to determining that the first UE is the intended recipient of the first data packet and determining that the RSRP value is less than the threshold value.

17. The method of claim 16, wherein the first reservation forwarding message comprises a single bit having a value indicating that the first UE is the intended recipient of the first data packet.

18. The method of claim 16, wherein the one or more second sidelink resources are selected by the second UE, and the method further comprises:
transmitting the first reservation message via sidelink control information (SCI).

19. The method of claim 16, wherein the one or more first sidelink resources and the one or more third sidelink resources are fewer than the one or more second sidelink resources.

20. The method of claim 16, wherein the first reservation message comprises at least one reservation of one or more other sidelink resources for at least one retransmission of the first data packet, and the method further comprises:
receiving the at least one retransmission of the first data packet via the one or more other sidelink resources.

21. The method of claim 16, further comprising:
receiving a second reservation message from a fourth UE, wherein the second reservation message comprises a second indication of one or more fifth sidelink resources reserved by the fourth UE for receiving a second data packet from the fourth UE; and
including the second reservation message or the second indication of the one or more fifth sidelink resources reserved in the second reservation message in the first reservation forwarding message.

22. The method of claim 16, wherein the first reservation forwarding message comprises at least one bit indicating that the first UE is the intended recipient of the transmission of the first data packet.

23. The method of claim 16, further comprising:
including the RSRP value in the first reservation forwarding message.

24. The method of claim 16, further comprising:
monitoring, for a predetermined period of time following the receiving of the first reservation message, for at least one of: a second reservation message or a second reservation forwarding message comprising a second indication of a reservation by another UE, different from the second UE; and
transmitting the first reservation forwarding message in response to expiry of the predetermined period of time in an absence of receiving the at least one of: the second reservation message or the second reservation forwarding message.

25. The method of claim 16, wherein the transmitting the first reservation forwarding message to the at least the third UE via the one or more third sidelink resources further comprises:
representing the first indication of the one or more second sidelink resources in a bit map; and
transmitting the bit map to the at least the third UE via the one or more third sidelink resources.

26. The method of claim 25, wherein the bit map comprises a plurality of locations, each corresponding to a respective subchannel in a respective slot, and the method further comprises:
representing the first indication of the one or more second sidelink resources in at least one location of the plurality of locations corresponding to the one or more second sidelink resources.

27. The method of claim 26, wherein each location of the plurality of locations comprises a multi-bit value representing a resource reservation occupation level of the respective subchannel in the respective slot.

28. The method of claim 27, wherein the resource reservation occupation level of the respective subchannel in the respective slot is determined based on a reference signal received power (RSRP) obtained from the respective subchannel in the respective slot.

29. The method of claim 25, wherein the bit map comprises a width corresponding to a quantity of subchannels and a length corresponding to a quantity of slots.

30. The method of claim 16, wherein the transmitting the first reservation forwarding message to at least the third UE via the one or more third sidelink resources further comprises:
transmitting the first reservation forwarding message via a second stage sidelink control information (SCI-2), sidelink medium access control-control element (MAC-CE), or sidelink radio resource control (RRC) message, to at least the third UE via the one or more third sidelink resources.

* * * * *